United States Patent [19]

Nakamura et al.

[11] Patent Number: 5,691,791
[45] Date of Patent: Nov. 25, 1997

[54] REFLECTIVE LIQUID CRYSTAL DISPLAY DEVICE AND REFLECTOR

[75] Inventors: Kozo Nakamura, Tenri; Hisakazu Nakamura, Yamatokoriyama; Seiichi Mitsui, Kashiwa; Naofumi Kimura, Nabari; Kazuhiko Tsuda, Tenri, all of Japan

[73] Assignee: Sharp Kabushiki Kaisha, Osaka, Japan

[21] Appl. No.: 645,493

[22] Filed: May 13, 1996

Related U.S. Application Data

[63] Continuation-in-part of Ser. No. 281,004, Jul. 27, 1994, Pat. No. 5,559,617.

[30] Foreign Application Priority Data

| Jul. 30, 1993 | [JP] | Japan | 5-190500 |
| Mar. 26, 1996 | [JP] | Japan | 8-070789 |

[51] Int. Cl.$^6$ .................... G02F 1/1335; G02F 1/1347
[52] U.S. Cl. .................... 349/113; 349/117; 349/75
[58] Field of Search .................... 349/113, 119, 349/75, 117

[56] References Cited

U.S. PATENT DOCUMENTS

| 4,431,272 | 2/1984 | Yazawa et al. | 349/113 |
| 4,456,336 | 6/1984 | Chung et al. | 349/113 |
| 4,917,465 | 4/1990 | Conner et al. | 349/5 |
| 4,984,874 | 1/1991 | Yamamoto et al. | 349/119 |
| 5,126,868 | 6/1992 | Kizaki et al. | 349/76 |
| 5,157,529 | 10/1992 | Koopman et al. | 349/117 |
| 5,179,457 | 1/1993 | Hirataka et al. | 349/119 |
| 5,182,665 | 1/1993 | O'Callaghan et al. | 349/201 |
| 5,184,237 | 2/1993 | Iimura et al. | 349/117 |
| 5,193,020 | 3/1993 | Shiozaki et al. | 349/117 |
| 5,204,765 | 4/1993 | Mitsui et al. | 349/113 |
| 5,237,438 | 8/1993 | Miyashita et al. | 349/119 |
| 5,245,454 | 9/1993 | Blonder et al. | 349/113 |
| 5,311,339 | 5/1994 | Fertig et al. | 349/76 |
| 5,408,345 | 4/1995 | Mitsui et al. | 349/113 |
| 5,499,126 | 3/1996 | Abileah et al. | 349/106 |
| 5,500,750 | 3/1996 | Kanbe et al. | 349/113 |
| 5,526,149 | 6/1996 | Kanbe et al. | 349/113 |

FOREIGN PATENT DOCUMENTS

| 0557110 | 8/1993 | European Pat. Off. . |

OTHER PUBLICATIONS

"Kogaku", T. Motohiro et al., vol. 19, p. 93, 1990.

"Handbook of Liquid Crystal Device", 142nd Committee of Japan Society for the Promotion of Science, pp. 329–352 (1989).

"640×400 Pixels Multicolor STN–LCD Using Birefringence Effect", Iijima et al., Japan Display '89, pp. 300–302.

*Primary Examiner*—William L. Sikes
*Assistant Examiner*—Toan Ton

[57] ABSTRACT

A reflective liquid crystal display device including a first substrate and a second substrate, a liquid crystal layer interposed between the first and second substrates, a polarizing plate, and a reflection layer; wherein the polarizing plate and the reflection layer are located on opposite sides of the liquid crystal layer. A surface of the reflection layer reflecting light has projections, and an occupation of an area of portions where a tilt angle of a tangent line drawn against a profile of the surface with the projections is less than 2° in a total area of the surface is in a range of 20% to 60%.

15 Claims, 43 Drawing Sheets

FIG.18A
Dark state
FIG.18B
Bright state
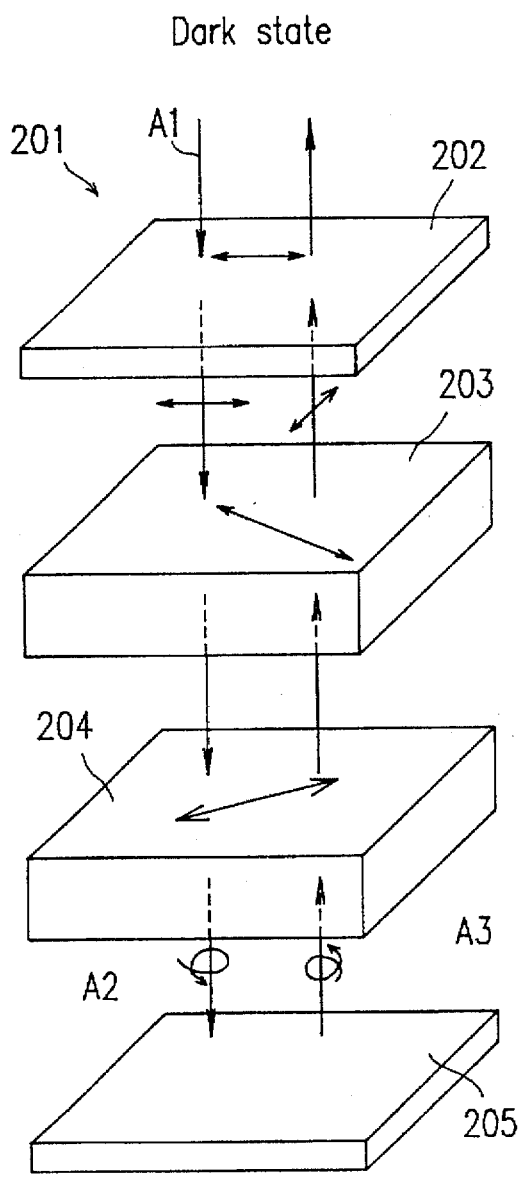
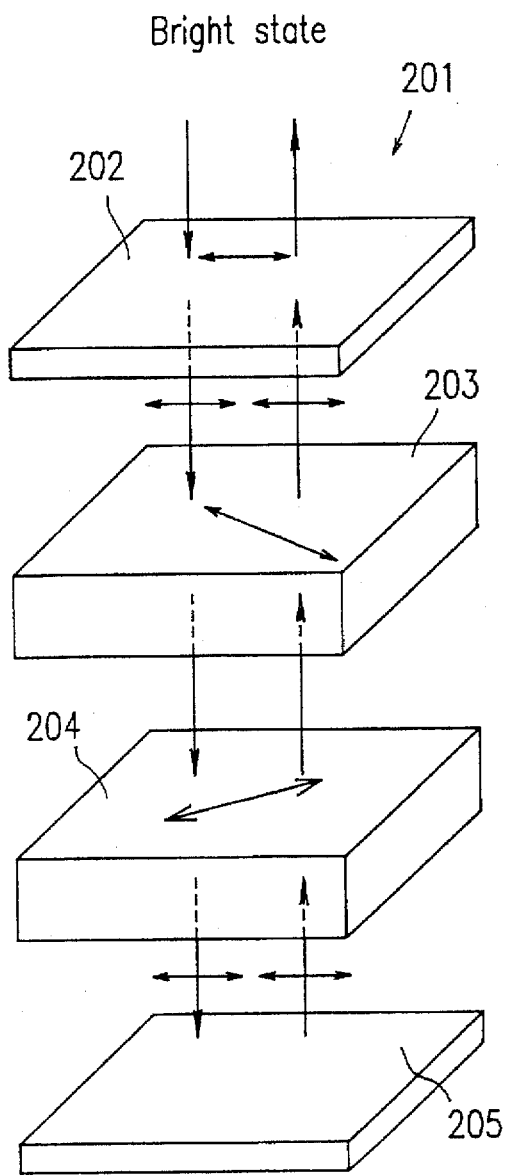

360

370

| | $\Delta nd_E$ | $\Delta n(d_T-d_B)$ |
|---|---|---|
| —□— | 330nm | 0nm |
| —◆— | 330nm | 30nm |
| —□— | 330nm | 50nm |
| —— | 330nm | 40nm |

REFLECTIVE LIQUID CRYSTAL DISPLAY DEVICE AND REFLECTOR

This is a continuation-in-part application of application Ser. No. 08/281,004 now U.S. Pat. No. 5,559,617 filed on Jul. 27, 1994

BACKGROUND OF THE INVENTION

1. Field of the Invention

The present invention relates to a liquid crystal display device, and more particularly to a reflective liquid crystal display device and a reflector suitable for the reflective liquid crystal display device.

2. Description of the Related Art

Recently, applications of a liquid crystal display device to a word processor, a note-type personal computer, a portable television receiver called a pocket TV, or the like, have rapidly been increased.

In a liquid crystal display device, conventionally a TN (twisted nematic) mode, or an STN (super twisted nematic) mode has been used. When the former, or the TN mode is employed, a liquid crystal display element is disposed between one set of polarizers, and a monochromatic display is conducted by using optical characteristics of the liquid crystal display element, i.e., the optical rotary characteristics appearing when no voltage is applied, and the polarization dissolution characteristics appearing when a voltage is applied.

In contrast, the latter, or the STN mode is a liquid crystal display structure which is similar to the TN mode and widely used in a display device for a word processor. In the STN mode, the twist angle of a liquid crystal layer of the liquid crystal display is set between 180 to 270 deg. The STN mode is characterized in that the twist angle of the liquid crystal layer is increased by 90 deg. or more, and the angle of polarization axes of the polarizers are optimized, so that a sudden change in molecular orientation due to a voltage application influences the change in birefringence of the liquid crystal layer, thereby realizing electro-optical characteristics having a sharp threshold. Accordingly, the STN mode is suitable for a simple matrix driving system. On the other hand, the STN mode has a drawback that the background of a display is colored in yellow-green or dark blue because of the birefringence of the liquid crystal. In order to eliminate this drawback, a liquid crystal display element has been proposed in which color compensation is made by stacking an STN display panel with an optical phase compensation plate, or a phase difference panel made of a polymer such as polycarbonate, thereby attaining a monochromatic display. At present, a liquid crystal display element of this structure is commercially available as a so-called paper-white LCD.

When a color display is to be done, microcolor filters of, for example, red, blue, and green are disposed for each pixel of a liquid crystal display element of the TN mode which can conduct a monochromatic display as described above, or that of the STN mode in which color compensation is made, and a multicolor or full color display is conducted in accordance with the additive color mixing by using the optical switching characteristics. At present, a liquid crystal display device which can conduct such a color display is used as a display device for a portable apparatus such as a so-called liquid crystal television receiver or a laptop computer in which an active matrix driving system or a simple matrix driving system is employed.

As a coloring system for a liquid crystal display device of the STN mode, a multicolor display method in which a multicolor display is conducted by applying a voltage to a compensation layer of Double Layer Super Twisted Nematic (DSTN) to control compensation conditions has been proposed (C. Iijima et al., JAPAN DISPLAY '89, p. 300).

Other color display methods are those according to the interference color method and including a so-called ECB (electrically controlled birefringence) mode, a DAP (deformation of vertical aligned phase) mode, and a HAN (hybrid-aligned nematic) mode. These modes use the birefringence of a liquid crystal molecule. A liquid crystal display device of such a mode is so structured that polarizers are respectively disposed on both sides of a liquid crystal cell having a liquid crystal layer in which nematic liquid crystal molecules are aligned in a specified direction with respect to a substrate. When a voltage is applied to the liquid crystal layer, the initial orientation of the molecules is changed to cause a change in anisotropy of refractive index, and therefore the color of light passing through the liquid crystal layer is changed to conduct a color display.

The display modes of TN, STN, ECB, DAP and HAN are well known techniques and their operation principles are described in the "Handbook Of Liquid Crystal Device", the 142nd committee of Japan Society for the Promotion of Science, 1989, pp. 329–352.

When a color display is to be conducted in a liquid crystal display device of the TN mode or the STN mode, it is required to use a color filter as described above. This causes a problem as follows. When color filters of three colors are used, for example, at least ⅔ of light of the visible region is absorbed, about half being is absorbed by polarizers which are disposed in the vicinity of the liquid crystal panel, resulting in reduction of the total reflectance of the whole of the panel to 15% or less, thereby causing a problem that the display is very dark.

In a color liquid crystal display device such as ECB, or DAP using the interference color, colors to be shown can be changed depending on an applied voltage. However, the range of an applied voltage is very narrow so that even a small variation in the applied voltage causes the hue to be changed. Furthermore, the number of colors which can be used in the display is limited.

An ECB mode using only one polarizing plate has been proposed as a reflective display mode capable of providing gray-scale display as well as bright display. However, the reflective liquid crystal display device using one polarizing plate suffers from low contrast. Moreover, the reflective liquid crystal display using one polarizing plate which has a sufficient paper-white property is not known. That is, a reflective liquid crystal display using one polarizing plate, which is suitable for a color display such as an ECB mode liquid crystal display, or a DAP mode liquid crystal display using the interference color, is not known.

SUMMARY OF THE INVENTION

The reflective liquid crystal display device of the present invention includes a first substrate and a second substrate, a liquid crystal layer interposed between the first and second substrates, a polarizing plate, and a reflection layer; wherein the polarizing plate and the reflection layer are located on opposite sides of the liquid crystal layer, and a surface of the reflection layer reflecting light has projections, and an occupation of an area of portions where a tilt angle of a tangent line drawn against a profile of the surface with the projections is less than 2° in a total area of the surface is in a range of 20% to 60%.

In one embodiment of the invention, the liquid crystal layer is driven in an ECB mode.

In another embodiment of the invention, a retardation variation of the liquid crystal layer due to the projections is 40 nm or less.

In still another embodiment of the invention, the difference in the thickness of the liquid crystal layer due to the projections is 1 μm or less.

In still another embodiment of the invention, the light reflection layer is selected so that a degree of polarization V of light reflected from the light reflection layer, represented by:

$$V = \frac{\sqrt{S_1^2 + S_2^2 + S_3^2}}{S_0}$$

where $S_0$, $S_1$, $S_2$, and $S_3$ are Stokes parameters referring respectively to a total light intensity, an excess in intensity of horizontal linearly polarized light, an excess in intensity of 45° linearly polarized light, and an excess in intensity of right-handed circularly polarized light, is at least 50% or more.

In still another embodiment of the invention, the device further includes electrodes attached to the first and second substrates for applying an electric field to the liquid crystal layer to control a retardation of the liquid crystal layer, wherein the first substrate positioned between the polarizer and the liquid crystal layer comprises an optical phase compensation means which includes a first region having a first retardation and a second region having a second retardation different from the first retardation, whereby a color of emitted light from each of the first and the second regions is selected to be a specific one, in accordance with the retardations of the optical phase compensation means and the retardation of the liquid crystal layer.

In still another embodiment of the invention, each of a plurality of pixels, which is a smallest area of the device for conducting a color display, includes a portion of one of the first and the second regions.

In still another embodiment of the invention, each of a plurality of pixels, which is a smallest area of the device for conducting a color display, includes each portion of the first and the second regions.

In still another embodiment of the invention, the optical phase compensation means further comprises a third region having a third retardation, and each of the plurality of pixels includes a portion of at least one of the first, the second and the third regions.

In still another embodiment of the invention, the optical phase compensation means includes at least two optical phase compensation members, at least one of the optical phase compensation members overlapping another of the optical compensation members so as to form the first and the second regions.

In still another embodiment of the invention, the retardation of the liquid crystal layer is equal to or less than 1.0 μm.

In still another embodiment of the invention, the reflecting means functions as one of the electrodes for applying an electric field to the liquid crystal layer.

According to the another aspect of the invention, a reflector for reflecting light is provided. The surface of the reflector reflecting light has projections, and an occupation of an area of portions where a tilt angle of a tangent line drawn against a profile of the surface with the projections is less than 2° in a total area of the surface is in a range of 20% to 60%.

In one embodiment of the invention, the difference in the height of the projections is 1 μm or less.

In another embodiment of the invention, the light reflection layer is selected so that a degree of polarization V of light reflected from the light reflection layer, represented by:

$$V = \frac{\sqrt{S_1^2 + S_2^2 + S_3^2}}{S_0}$$

where $S_0$, $S_1$, $S_2$, and $S_3$ are Stokes parameters referring respectively to a total light intensity, an excess in intensity of horizontal linearly polarized light, an excess in intensity of 45° linearly polarized light, and an excess in intensity of right-handed circularly polarized light, is at least 50% or more.

Thus, the invention described herein makes possible at least one of the advantages of (1) providing a reflective liquid crystal display device with an improved contrast using a single polarizing plate, (2) providing a reflective liquid crystal display device with an excellent paper-white property as well as an improved contrast, and (3) providing a reflector suitable for the reflective liquid crystal display devices.

These and other advantages of the present invention will become apparent to those skilled in the art upon reading and understanding the following detailed description with reference to the accompanying figures.

BRIEF DESCRIPTION OF THE DRAWINGS

FIGS. 18A and 18B show the operation principle of a reflective liquid crystal display device according to the present invention.

FIG. 33B shows tilt angles obtained from a surface profile of the reflection substrate.

DESCRIPTION OF THE PREFERRED EMBODIMENTS

Figure 1:
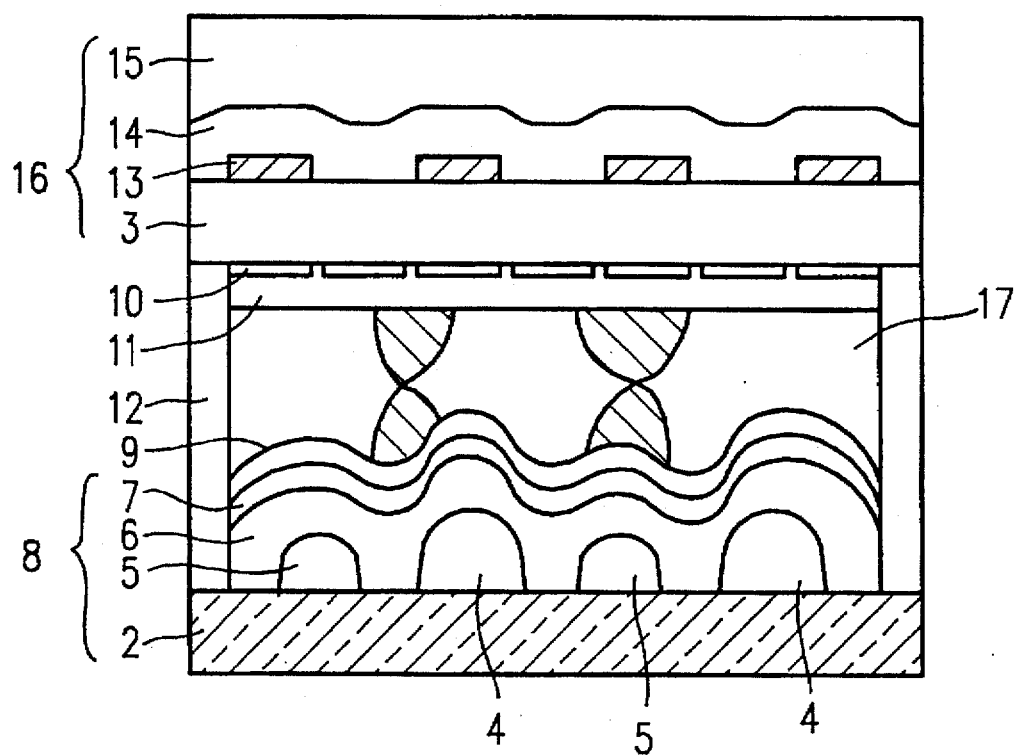
FIG. 1 is a section view of a liquid crystal display device of Example 1.

Hereinafter, the display principle of the liquid crystal display device of the invention will be described by illustrative examples.

For example, a homogeneous cell which uses a liquid crystal with an anisotropy of refractive index of $\Delta n_1$ and has a thickness of $d_1$, and an optical phase compensation member (anisotropy of refractive index: $\Delta n_2$, and thickness: $d_2$) are disposed between two polarizers in such a manner that the slower optic axis of a liquid crystal molecule is perpendicular to that of the optical phase compensation member. In this arrangement, when linearly polarized light which has passed through one of the polarizers passes through the optical phase compensation member and the liquid crystal layer, the phase difference $\delta$ is expressed as:

$$\delta = (2\pi/\lambda)(\Delta n_1 d_1 - \Delta n_2 d_2) \qquad (1)$$

where $\lambda$ indicates a wavelength, $\Delta n_1 d_1$ the retardation of the liquid crystal layer, $\Delta n_2 d_2$ the retardation of the optical phase compensation plate, $\Delta n_1$ and $\Delta n_2$ the refractive indices of the layer and the plate, and $d_1$ and $d_2$ the thicknesses of the layer and the plate.

When the angle formed by the director (the direction of the major axis) of a liquid crystal molecule and the polarization axis of the polarizer is set to 45 deg., and the polarization axes of the two polarizers are perpendicular to each other, the transmitted light intensity $I\perp$ is expressed as:

$$\begin{aligned} I\perp &= A^2 \sin^2(\delta/2) \qquad (2) \\ &= A^2 \sin^2\{(\pi/\lambda)(\Delta n_1 d_1 - \Delta n_2 d_2)\}. \end{aligned}$$

From the above, it will be noted that, when white monochromatic light is used, the transmitted light intensity depends on the retardation and various hues which are shown. When a voltage is applied to the liquid crystal cell, the effective anisotropy of refractive index of the cell changes together with the orientation of liquid crystal molecules.

In contrast, when the polarization axes of the two polarizers are parallel to each other, the transmitted light intensity $I_{//}$ is expressed as:

$$\begin{aligned} I_{//} &= A^2 \cos^2(\delta/2) \qquad (3) \\ &= A^2 \cos^2\{(\pi/\lambda)(\Delta n_1 d_1 - \Delta n_2 d_2)\}. \end{aligned}$$

From Eqs. (2) and (3), it will be noted that a color shown in the crossed Nicols state and that shown in the parallel Nicols state are complementary to each other.

When the polarizer at the back of the cell is replaced with a reflection plate so as to constitute a reflective liquid crystal cell, the reflected light intensity R is indicated as:

$$R = A^2\{(\cos\delta/2)^2 - (\sin\delta/2)^2\}^2 \quad (4)$$
$$= A^2\{(\cos\pi(\Delta n_1 d_1 - \Delta n_2 d_2)/\lambda)^2 -$$
$$(\sin\pi(\Delta n_1 d_1 - \Delta n_2 d_2)/\lambda)^2\}^2.$$

In Eq. (4), it is assumed that the reflection plate conducts perfect reflection. The wavelength dependence of the reflected light intensity R was obtained from Eq. (4) in the cases where, for example, $\Delta n_1 d_1 - \Delta n_2 d_2$ is 330 nm, 360 nm, 470 nm and 530 nm. Results are shown in FIGS. 12 to 15. In these calculations, it was assumed that the value of $\Delta n_1 d_1 - \Delta n_2 d_2$ does not depend on the wavelength.

As seen from FIGS. 12 to 15, red is shown in the case of 330 nm, purple in the case of 360 nm, blue in the case of 470 nm, and green in the case of 530 nm. From this, it will be noted that, when a light source of white light is used, the reflected light intensity depends on the retardation based on the same principle as that of a transmissive liquid crystal display device. Therefore, various hues are display by a reflective liquid crystal display. When a voltage is applied, the retardation of the liquid crystal layer changes. Consequently, the color of reflected light can be controlled by a voltage.

When one display pixel is divided into two or three regions having different phase differences of the above Eq. (1), by additively mixing interference colors based on the display principles expressed by the above Eqs. (2) to (4), more kinds of colors can be displayed.

Hereinafter, examples of the invention will be described specifically.

EXAMPLE 1

Figure 2:
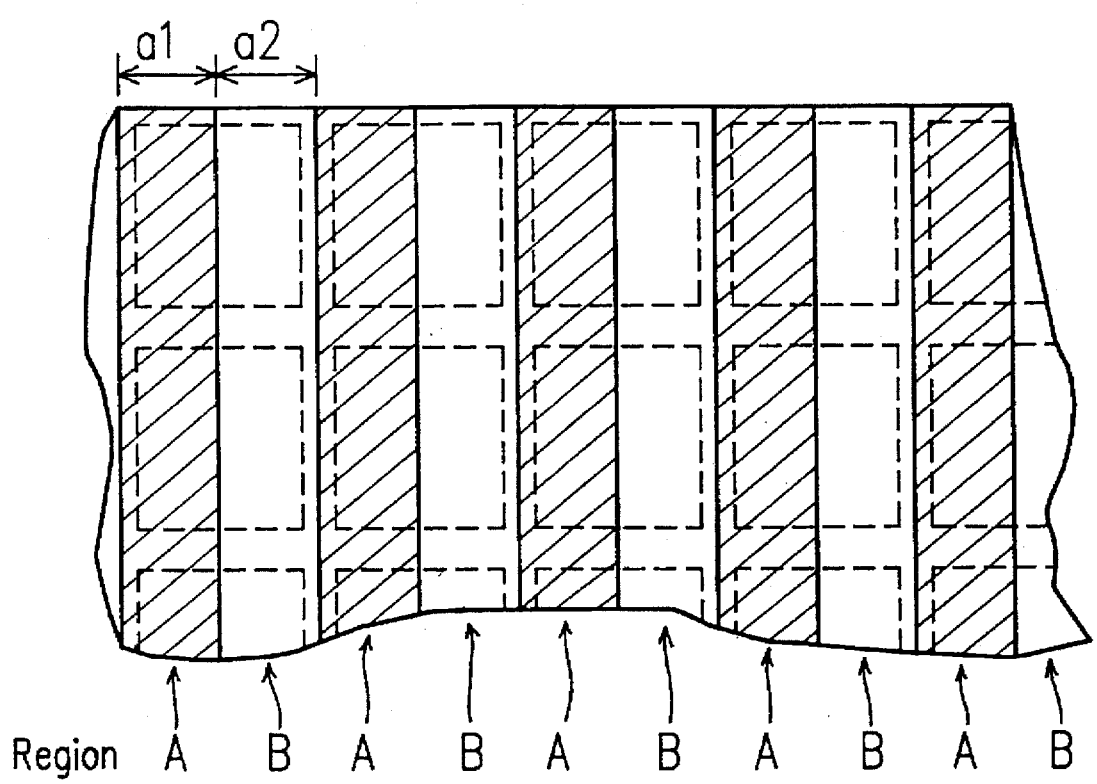
FIG. 2 is a plan view of an upper substrate of the liquid crystal display device shown in FIG. 1.
Figure 3:
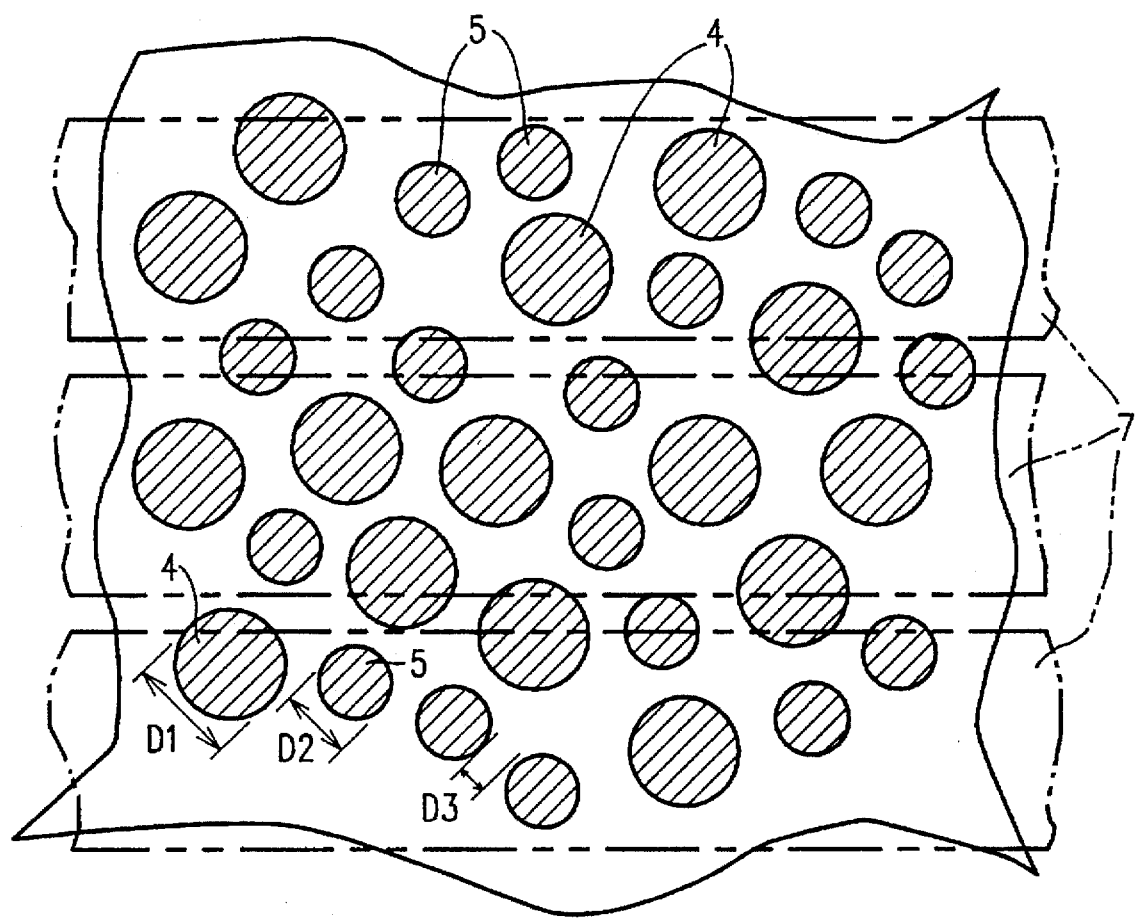
FIG. 3 is a plan view of a reflection substrate of the liquid crystal display device shown in FIG. 1.

FIG. 1 is a section view of a liquid crystal display device of Example 1, FIG. 2 is a plan view of an upper substrate, and FIG. 3 is a plan view of a lower substrate of the liquid crystal display. The liquid crystal display device includes a pair substrates formed of the lower substrate 8 and the upper substrate 16 which are opposed to each other with a liquid crystal layer 17 therebetween. In the lower substrate 8, a number of large projections 4 and small projections 5 made of a synthetic resin material described later are formed on a glass substrate 2. As shown in FIG. 3, the diameters D1 and D2 of the bottoms of the large projections 4 and small projections 5 are set to, for example, 10 μm and 5 μm, respectively. Spaces D3 between these projections are set to, for example, at least 2 μm or more. A planarization layer (polymer resin layer) 6 is formed so as to cover the projections 4 and 5 and fill recesses between the projections 4 and 5. Reflection layers 7 made of a metal material such as aluminum, nickel, chromium, silver, gold or the like are formed on the planarization layer 6. The reflection layers 7 function also as reflection pixel electrodes. As shown in FIG. 3, the reflection layers 7 are formed into parallel plural strips which elongate in the lateral direction in FIG. 3. The projections 4 and 5, the planarization layer 6, and the reflection layers 7 which are formed on the glass substrate 2 constitute a reflection plate functioning as the light reflection member. An alignment layer 9 is formed on the reflection layers 7.

The upper substrate 16 includes a glass substrate 3 which opposes the glass substrate 2. Plural transparent electrodes 10 which are made of ITO (indium tin oxide) or the like, are formed on the surface of the glass substrate 3 on the side of the liquid crystal layer 17 so as to be formed into plural strips which elongate in a direction perpendicular to the longitudinal direction of the reflection layers 7. An alignment layer 11 covers the glass substrate 3 on which the transparent electrodes 10 are formed. As shown in FIG. 1, first and second optical phase compensation members 13 and 14 are formed on the surface of the glass substrate 3 which is opposite the surface in contact with the liquid crystal layer 17. By the first and second optical phase compensation members 13 and 14, at least two kinds of regions A and B having different retardations are formed as shown in FIG. 2. The regions A and B are arranged in a regularly repeating manner so as to form pixels. The size of each region corresponds to the pixel electrode or the reflection layer 7. As an example, portions of the stripe-like regions A and B are included within one pixel. Areas indicated by broken lines in FIG. 2 correspond to pixels, respectively. Furthermore, a polarizer 15 is disposed on the thus configured upper substrate 16.

A sealant 12 which will be described later is applied at the peripheral portions of the glass substrates 2 and 3 which oppose to each other as described above, thereby sealing the space between the substrates. As the liquid crystal layer 17 sealed between the alignment layers 9 and 11, for example, ZLI4427 (trade name) produced by Merck & Co., Inc. is used. The thus configured liquid crystal display device of the example is subjected to a multiplex driving.

FIGS. 4A to 4F are section views illustrating a method of producing the upper substrate 16 shown in FIG. 1.

Figure 4A:
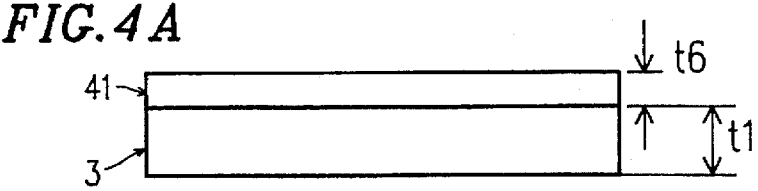
FIGS. 4A to 4F are section views illustrating the processes of producing the upper substrate of the liquid crystal display device shown in FIG. 1.

In the example, as shown in FIG. 4A, a glass substrate (trade name: 7059) which is produced by Corning Inc., and has a thickness $t_1$ of 1.1 mm, was used as the glass substrate 3. A photosensitive material (such as OFPR800 (trade name) produced by Tokyo Ohka Kogyo Co., Ltd.) is spin-coated onto the glass substrate 3 at 500 to 3,000 r.p.m., to form a resin layer 41. In the example, the process of spin-coating the photosensitive material is conducted at 2,500 r.p.m. for 30 sec., thereby forming the resin layer 41 of a thickness $t_6$ of, for example, 1.5 μm.

Figure 4B:
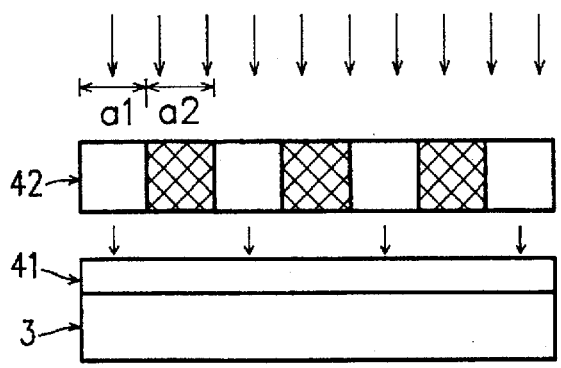
Figure 4C:
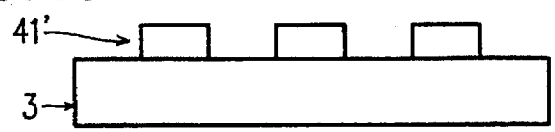

Next, the substrate on which the resin layer 41 is formed is baked in an atmosphere of 90° C. for 30 min. Then, as shown in FIG. 4B, a photomask 42 in which a number of stripe-like patterns, corresponding to the size of pixels described later, are formed is placed above the resin layer 41 and an exposure process is conducted. Thereafter, development is conducted by using a developer consisting of, for example, a 2.38% solution of NMD-3 (trade name) produced by Tokyo Ohka Kogyo Co., Ltd., to form a stripe-like resin layer (resist layer) 41' on the surface of the glass substrate 3 as shown in FIG. 4C. The photomask 42 has transparent portions of a width $a_1$ and light shielding portions of a width $a_2$. The transparent portions are used for forming the regions A which are arranged as shown in FIG. 2, and the light shielding portions are used for forming the regions B. Preferably, the patterns of the photomask 42 may be changed in accordance with the size of pixels, and are not limited to those described above. In the example, the widths $a_1$ and $a_2$ are set to 105 μm, but are not limited to that value.

Figure 4D:
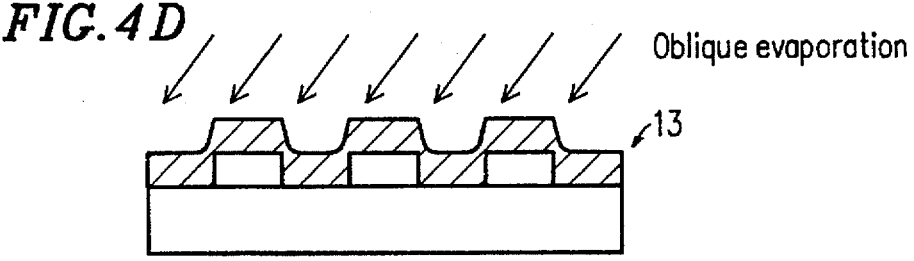

Then, as shown in FIG. 4D, vapor deposition is obliquely conducted onto the resin layer 41'. In the example, for example, tantalum oxide ($Ta_2O_5$) was deposited by an oblique evaporation in accordance with the method described in "Kogaku" vol. 19, p. 93 (1990) and under conditions listed in Table 1 below. Tantalum oxide $Ta_2O_5$ was deposited in the example. Alternatively, another oxide such as tin oxide, cerium oxide, zirconium oxide, bismuth oxide, titanium oxide, silicon oxide, or molybdenum oxide may be used.

TABLE 1

| Material | Ta$_2$O$_5$ |
| --- | --- |
| Evaporation Angle | 70 deg. |
| And | 140 nm |
| Thickness | 2 μm |

Figure 4E:
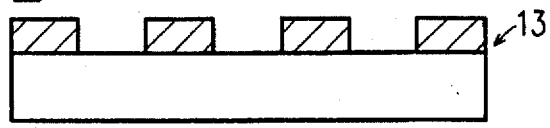

Next, as shown in FIG. 4E, the resin layer 41' functioning as a resist layer was peeled off to form the first optical phase compensation member 13 into a stripe-like shape. In this formation, a so-called lift-off method was employed.

Figure 4F:
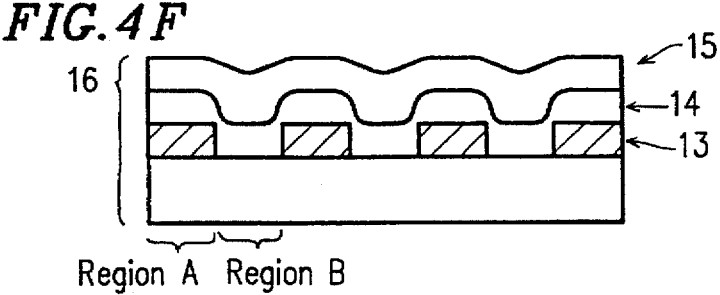

Next, as shown in FIG. 4F, the second optical phase compensation member 14 consisting of a stretched film made of polycarbonate and functioning as an optical phase compensation plate is disposed on the substrate. Then, the polarizer 15 having a transmittance of, for example, 48% which is measured when the polarizer is singly used is disposed on the substrate. In this way, the upper substrate 16 is produced.

FIGS. 5A to 5E are section views illustrating the processes of producing the lower substrate 8 shown in FIG. 1.

Figure 5A:
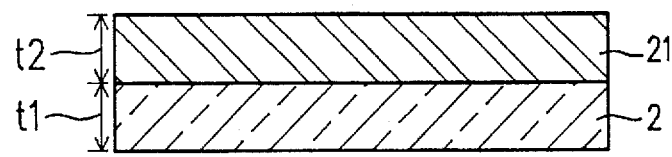
FIGS. 5A to 5E are section views illustrating the processes of producing a reflection plate of the liquid crystal display device shown in FIG. 1.

In the example, as shown in FIG. 5A, a glass substrate (trade name: 7059 produced by Corning Inc.) which has a thickness $t_1$ of, for example, 1.1 mm and was used as the glass substrate 2. A photosensitive material (such as OFPR800 (trade name) produced by Tokyo Ohka Kogyo Co., Ltd.) is spin-coated onto the glass substrate 2 at 500 to 3,000 r.p.m., to form a resin layer 21. In the example, the process of spin-coating the photosensitive material is conducted at 2,500 r.p.m. for 30 sec., thereby forming the resin layer 21 of a thickness $t_2$ of, for example, 1.5 μm.

Figure 5B:
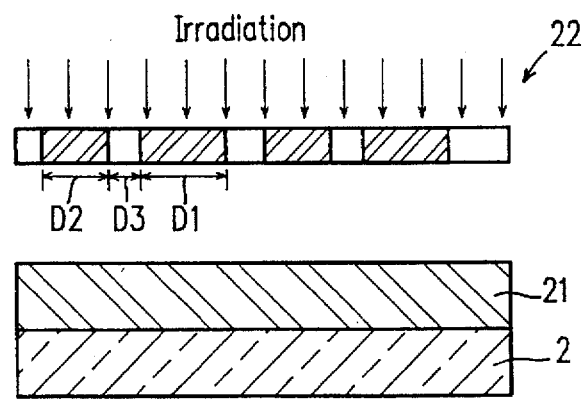
Figure 5C:
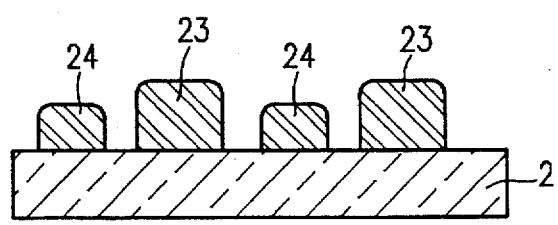

Next, the substrate on which the resin layer 21 is formed is baked at a temperature of 90° C. for 30 min. Then, as shown in FIG. 5B, a photomask 22 in which a number of circular patterns of two kinds, large and small circular patterns described later are formed is placed and an exposure process is conducted. Thereafter, development is conducted by using a developer consisting of, for example, a 2.38% solution of NMD-3 (trade name) produced by Tokyo Ohka Kogyo Co., Ltd. to form large and small projections 23 and 24 having different heights on the surface of the glass substrate 2. The large and small projections 23 and 24 having different heights can be realized by controlling the exposure time and the developing time. The photomask 22 has a configuration in which circular light shielding portions are formed at random so as to obtain the arrangement of large and small projections 23 and 24 shown in FIG. 3. The diameter D1 of the light shielding portions for forming the large projections 23 is selected as, for example, 10 μm, the diameter D2 of the light shielding portions for forming the small projections 24 as, for example, 5 μm, and spaces D3 between the circles as at least 2 μm or longer.

Figure 5D:
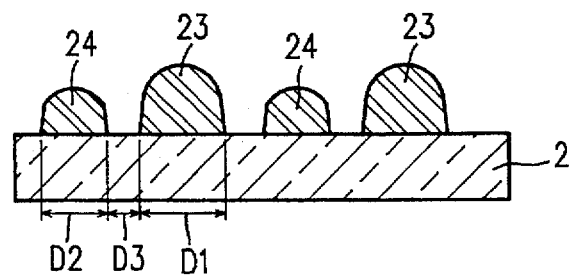

Next, the glass substrate 2 on which the large and small projections 23 and 24 are formed is heated at 200° C. for one hour so that the tops of the projections 23 and 24 are melted to some extent to be formed into an arcuate shape as shown in FIG. 5D, thereby forming the large and small projections 23 and 24.

Figure 5E:
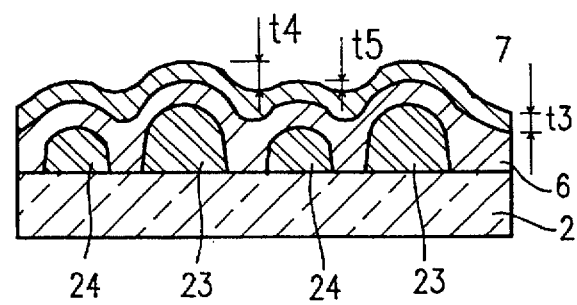

Then, as shown in FIG. 5E, a material which is the same as the above-mentioned photosensitive material is spin-coated onto the glass substrate 2 at 1,000 to 3,000 r.p.m. In the example, the spin coating is preferably conducted at 2,000 r.p.m. This causes the planarization layer (polymer resin layer) 6 to fill recesses formed between the projections 23 and 24 and be formed into a surface shape which is curved in a relatively gentle and smooth manner. In the example, the same resin as the above-mentioned photosensitive material is applied. Alternatively, a resin of another kind may be applied. The thickness $t_4$ of large smooth projections which are formed by the large projections 23 on the surface of the planarization layer 6 was 0.7 μm, and the thickness $t_5$ of small smooth projections which are formed by the small projections 24 was 0.5 μm.

Next, a thin layer of a metal such as aluminum, nickel, chromium, silver or gold is formed on the planarization layer 6 so as to have a thickness $t_3$ of, for example, about 0.01 to 1.0 μm. In the example, aluminum is sputtered to form the reflection layer 7. The reason why large and small projections 23 and 24 are formed under the reflection layer 7 as described above is as follows: When the large and small projections 23 and 24 are formed at random in a plane and the heights of the projections 23 and 24 are changed, the surface of the reflection layer 7 can be formed without any flat portions. This structure prevents light reflected from the reflection layer 7 from causing an interference color, resulting in that an excellent white display is obtained. The pattern of the photomask 22 is not limited to the above.

The thus produced upper and lower substrates 16 and 8 are subjected to the following processes: First, alignment layers 9 and 11 made of a polyimide resin layer are coated on the upper and lower substrates 16 and 8, respectively, and the substrates are then baked at 220° C. for one hour. In the example, SUNEVER 150 (trade name) produced by Nissan Kagaku Kogyo was used as the material for the polyimide resin layers.

Next, a rubbing process was conducted to align liquid crystal molecules of the liquid crystal layer 17, thereby completing the formation of the alignment layers 9 and 11.

Thereafter, as the sealant 12 for sealing the space between the glass substrates 2 and 3 is applied by screen-printing, for example, an adhesive sealant into which spacers of a diameter of about 6 μm are dispersed.

When the thus formed lower and upper substrates 8 and 16 are to be stuck to each other, spacers of a diameter of 5.5 μm are sprayed on the glass substrate 2 so as to regulate the thickness of the liquid crystal layer. Then, the lower and upper substrates 8 and 16 are opposed to each other and attached to each other by the sealant 12. The liquid crystal is injected into the space between the lower and upper substrates 8 and 16 under vacuum and sealed to obtain the liquid crystal layer 17. In the example, a nematic liquid crystal (for example, ZLI4427 (trade name) produced by Merck & Co., Inc.) which is twisted by 240 deg. between the glass substrates 2 and 3 was used as the liquid crystal layer 17.

Figure 6:
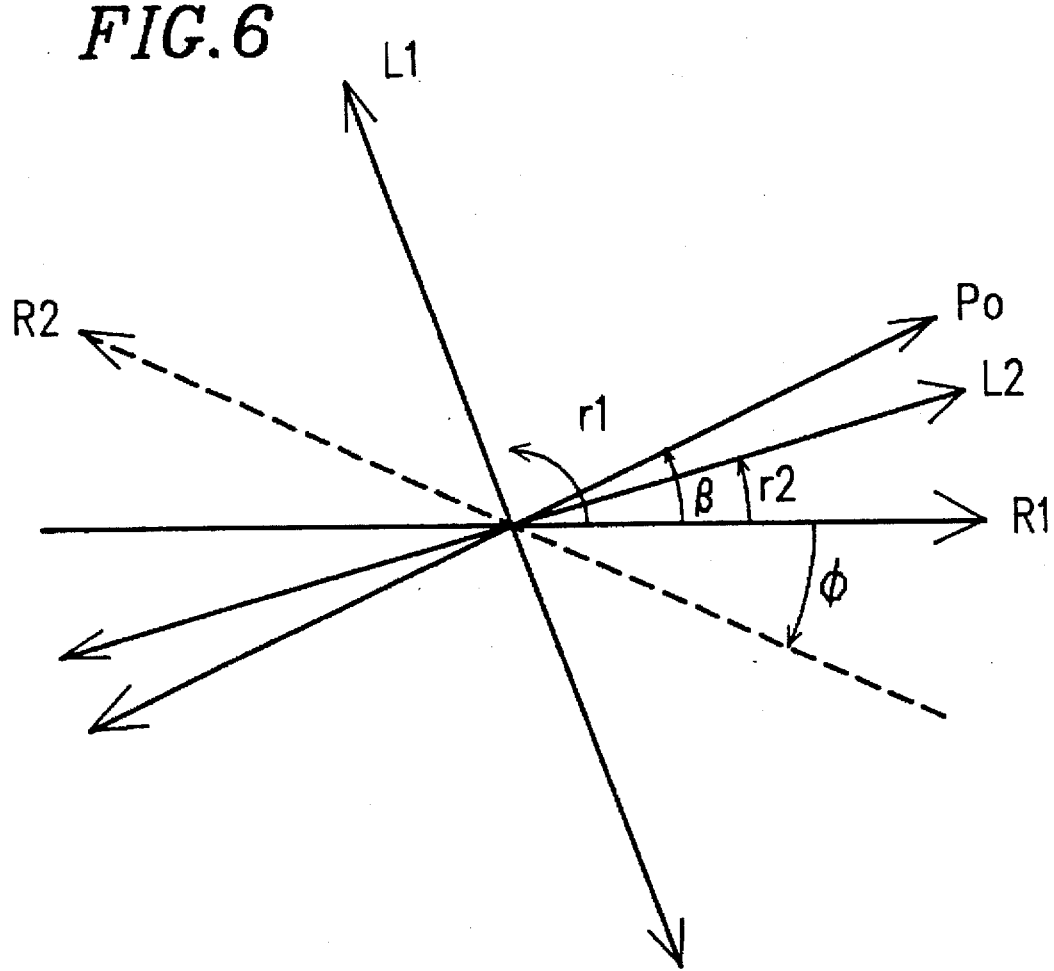
FIG. 6 is a diagram illustrating an optical configuration of the liquid crystal display device.

FIG. 6 is a diagram showing the optical configurations of the polarizer 15, the first and second optical phase compensation members 13 and 14, and the liquid crystal layer 17 of the thus produced liquid crystal display device. The alignment direction of liquid crystal molecules in the liquid crystal layer 17 in the side of the upper substrate 16 is indicated by R1. The angle in a counterclockwise direction which the direction PO of the absorption axis or transmission axis of the polarizer 15 forms with the alignment direction is indicated by β, that in a counterclockwise direction which the direction L1 of the slower optic axis of the first optical phase compensation member 13 forms with the alignment direction is indicated by γ1, and that in a counterclockwise direction which the direction L2 of the slower optic axis of the second optical phase compensation member 14 forms with the alignment direction is indicated by γ2. The twist angle between liquid crystal molecule R1 of the upper substrate 16 and liquid crystal molecules R2 of the lower substrate 8 is indicated by φ by setting the clockwise direction as positive.

The upper substrate 16 was produced while setting the retardation of the first optical phase compensation member 13 due to the oblique evaporation to 140 nm, and that of the second optical phase compensation member 14 due to the optical phase compensation plate to 500 nm. These angles were set as follows: β=−30°, γ1=−75°, and β2=15°. As a result, different regions of Δnd wherein Δnd of the region A is 360 nm and Δnd of the region B is 500 nm was produced. The angle φ was set to 240 deg.

Figure 7:
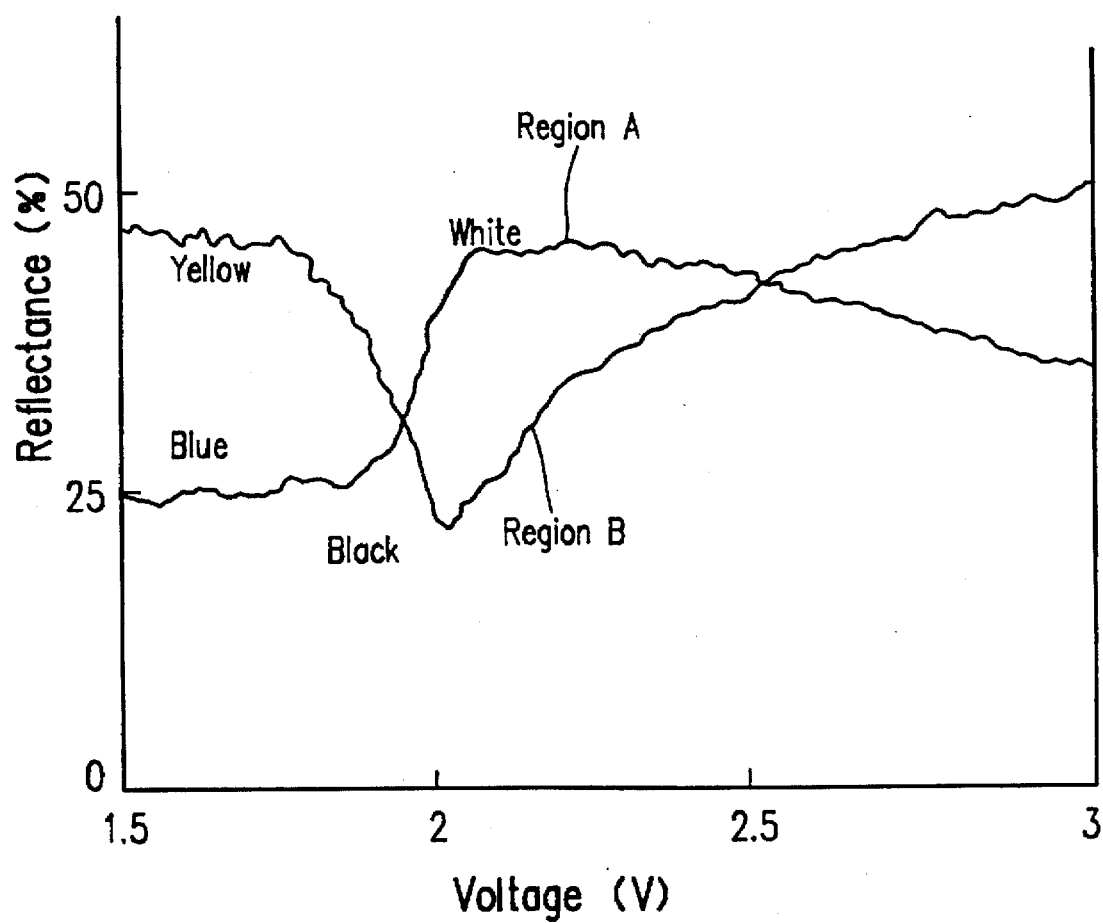
FIG. 7 is a graph showing the voltage-reflectance characteristics of the liquid crystal display device of Example 1.

FIG. 7 is a graph showing the voltage-reflectance characteristics of the liquid crystal display device of the example. As seen from the figure, according to the liquid crystal display device configured as described above, blue is satisfactorily shown in the region A, and yellow is satisfactorily shown in the region B. According to experiments conducted by the inventors, a satisfactory four-color display of blue, yellow, white and black was attained without parallax. Moreover, it was confirmed that a satisfactory display is attained also in other combinations of two colors, i.e., magenta and green, and cyan and red. In the other combinations, however, the retardations of the first and second optical phase compensation members 13 and 14, and the set angles β, γ1, and γ2 must be optimized. Furthermore, it was confirmed that, when three kinds of regions having different retardations are formed and the regions are set so as to respectively show colors of RGB, a multicolor display can be attained. When the optical phase compensation members are modified so as to have various retardations, moreover, it is possible to show various colors.

According to the experiments conducted on the liquid crystal display device of the example by the inventors, with respect to light entering at an angle inclined by 30° from the direction normal to the liquid crystal display device, the reflectance of white in the normal direction was about 45%. In the experiments, a standard white board of magnesium oxide (MgO) is used as a member which is the standard for measuring the reflectance.

In the example, a cell having a twist angle of 240 deg. was used as the liquid crystal layer 17. The invention is not limited to this, and a liquid crystal layer of any twist angle or of no-twist may be used in the invention as far as the retardation can be controlled by an electric field.

In the example, as shown in FIG. 4, the upper substrate 16 was subjected to the resist patterning and then to the oblique evaporation. Alternatively, the evaporation may first be conducted on the whole area of the substrate, and then the patterning may be conducted by an etching of a conventional photolithography process. Any other method such as that in which only the evaporation is conducted or only a layer is used may be used in the example as far as it can form regions having different retardations.

EXAMPLE 2

The liquid crystal display device of the example is an active matrix type display device.

Figure 16:
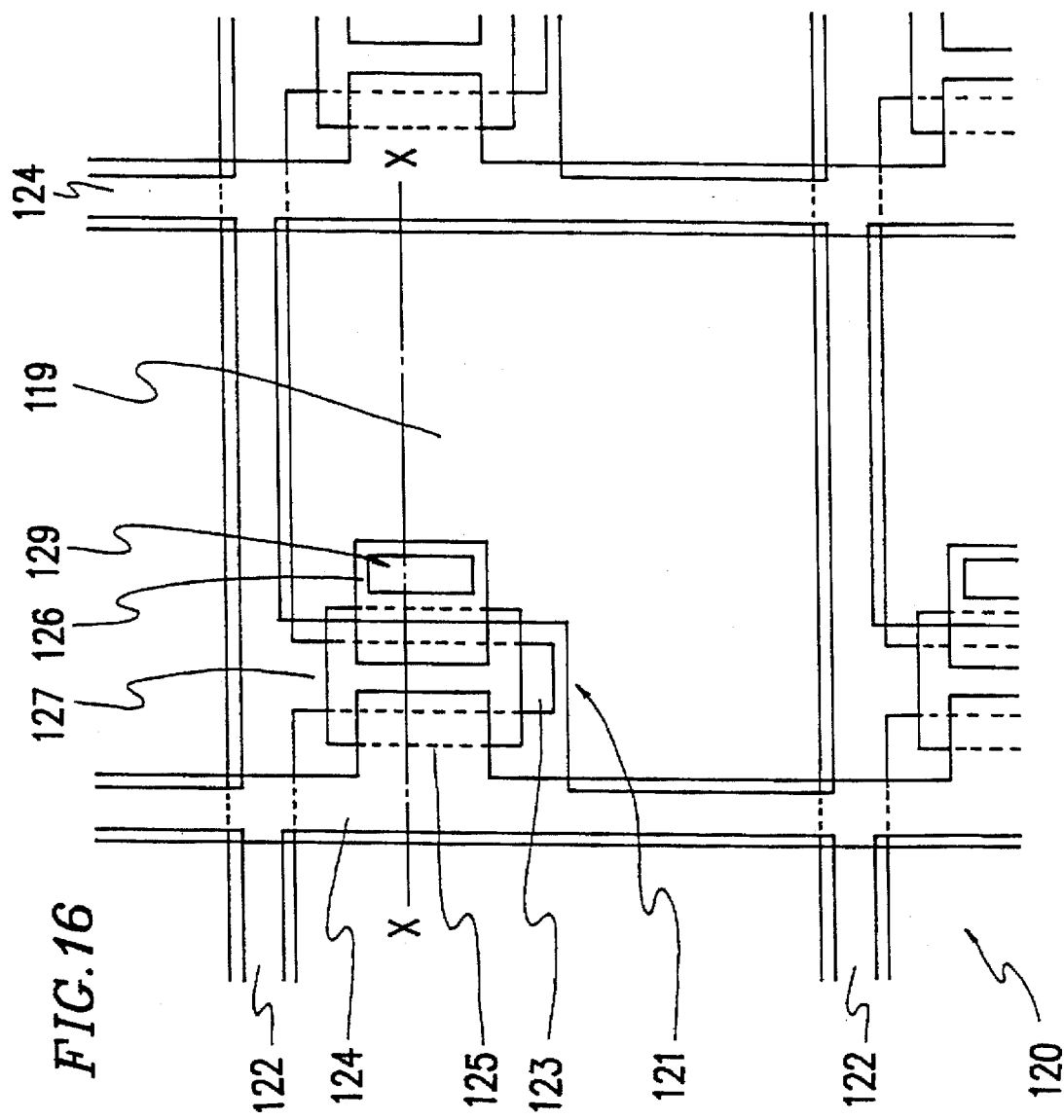
FIG. 16 is a plan view of a reflective active matrix substrate of liquid crystal display device of Example 2.
Figure 17:
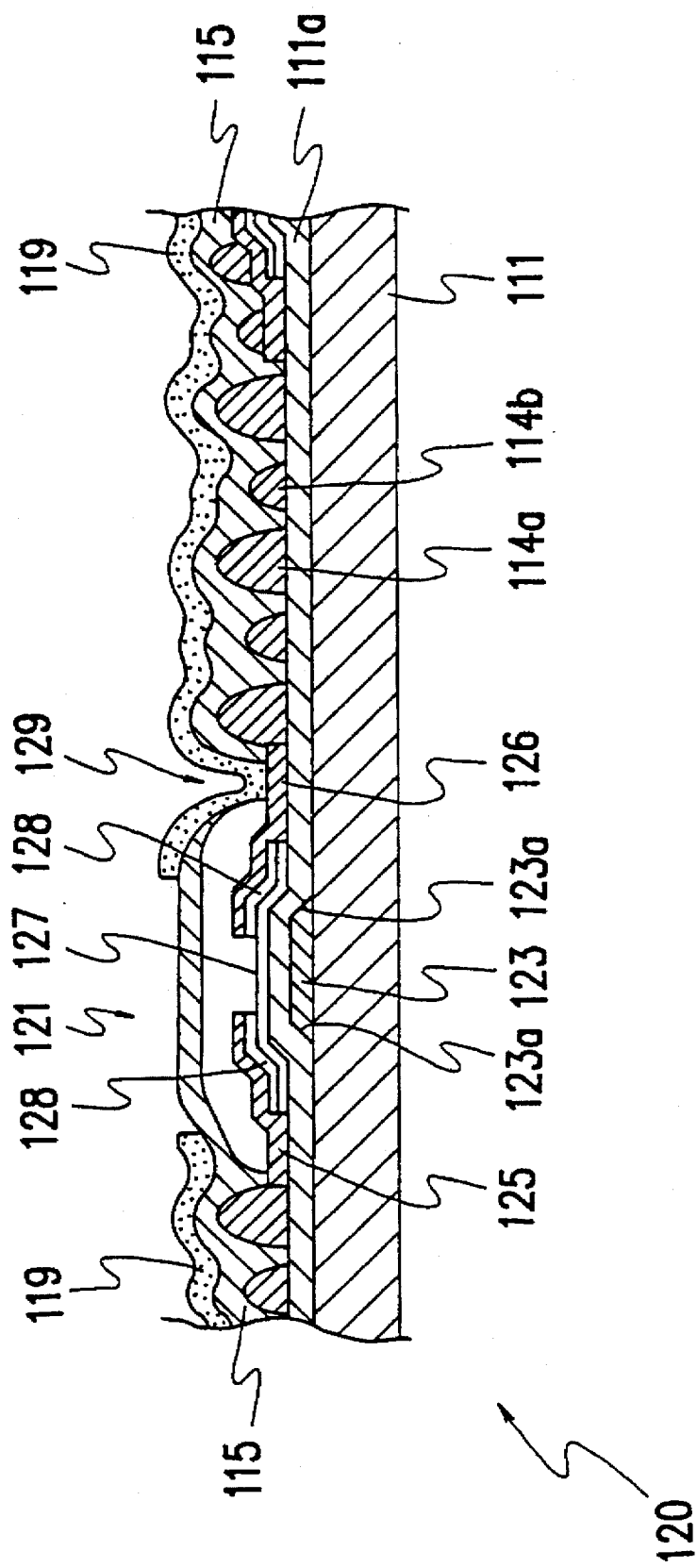
FIG. 17 is a cross-sectional view taken along a line X—X of FIG. 16.

FIG. 16 is a plan view showing an example of a reflective active matrix substrate 120. FIG. 17 is a cross-sectional view taken along a line X—X of FIG. 16. The reflective active matrix substrate 120 is used instead of the lower substrate 8 in Example 1. In the reflective active matrix substrate 120, a plurality of gate bus lines 122 (i.e., scanning lines) and a plurality of source bus lines 124 (i.e., signal lines) are provided on an insulating glass substrate 111 (i.e., a base substrate) so as to cross each other. In a rectangular region formed by each gate bus line 122 and each source bus line 124, a pixel electrode 119 having an optical reflection function is provided. At one corner of the rectangular region in which each pixel electrode 119 is formed, a gate electrode 123 is branched out from each gate bus line 122, and at the tip end portion of each gate electrode 123, a thin film transistor (TFT) 121 is formed as a switching element. The gate electrode 123 forms a part of the TFT 121.

Furthermore, at one corner of the rectangular region in which each pixel electrode 119 is formed, a source electrode 125 is branched out from each source bus line 124. The tip end portion of the source electrode 125 overlaps the gate electrode 123 in an insulating state. The source electrode 125 forms a part of the TFT 121. A drain electrode 126 of the TFT 121 is provided at a distance from the source electrode 125 and overlaps the gate electrode 123 in an insulated state. Each drain electrode 126 is electrically connected to each pixel electrode 119.

As shown in FIG. 17, the TFT 121 is provided above the gate electrode 123 formed on the glass substrate 111. The gate electrode 123 is covered with a gate insulating layer 111a which is formed over the entire surface of the glass substrate 111. On a part of the gate insulating layer 111a, a semiconductor layer 127 is formed so as to cover a region above the gate electrode 123. A pair of contact layers 128 are formed covering both ends of the semiconductor layer 127. The source electrode 125 is formed so as to cover one of the pair of contact layers 128 and the drain electrode 126 is formed so as to cover the other one of the pair of contact layers 128.

Below the pixel electrode 119 having the above-mentioned optical reflection function, projections 114a and 114b are alternately formed on the glass substrate 111. The height of the projections 114a is made larger than that of the projections 114b. A polymer resin layer 115 is formed so as to cover the projections 114a and 114b. The upper surface of the polymer resin layer 115 is in a wave shape because of the presence of the projections 114a and 114b. The polymer resin layer 115 is formed over almost the entire surface of the glass substrate 111 as well as below the pixel electrode 119. The pixel electrode 119 is formed on the polymer resin layer 115 with a surface in a continuous wave shape and is formed of, for example, Al which has an optical reflection function. The pixel electrode 119 is electrically connected to the drain electrode 126 via a contact hole 129.

The liquid crystal display device of the example is configured in the following manner. A liquid crystal of ZLI2459 (trade name) produced by Merck & Co., Inc. was used as the liquid crystal layer 17 in Example 1, the cell thickness was 5.5 μm, and the retardation was set to 605 nm. In the same method as that of Example 1, the retardation of the first optical phase compensation member 13 due to the oblique evaporation was set to 130 nm. Furthermore, a stretched film made of polycarbonate was used as the second optical phase compensation member 14, and the retardation of the stretched film was set to 130 nm. The angles according to the indication of FIG. 6 were set as follows: β=45°, γ₁=−45°, and γ₂=−45°.

Furthermore, the slower optic axis L1 of the first optical phase compensation member 13 is superposed on the slower optic axis L2 of the stretched film used as the second optical phase compensation member 14, and a region having a retardation of 260 nm was formed. The region a of FIG. 2 is a portion of the retardation of 260 nm, and the region B is a portion of the retardation of 130 nm. The twist angle φ was set to 0 deg.

Furthermore, a thin film transistor used as a switching element, or a nonlinear element having a MIM (metal-insulator-metal) structure was connected to the reflection layer 7. The other configurations are the same as those of FIG. 1. The alignment layers 9 and 11 were formed by using AL2061 (trade name) produced by Japan Synthetic Rubber Inc., and underwent a rubbing process to attain a homogeneous alignment.

Figure 8:
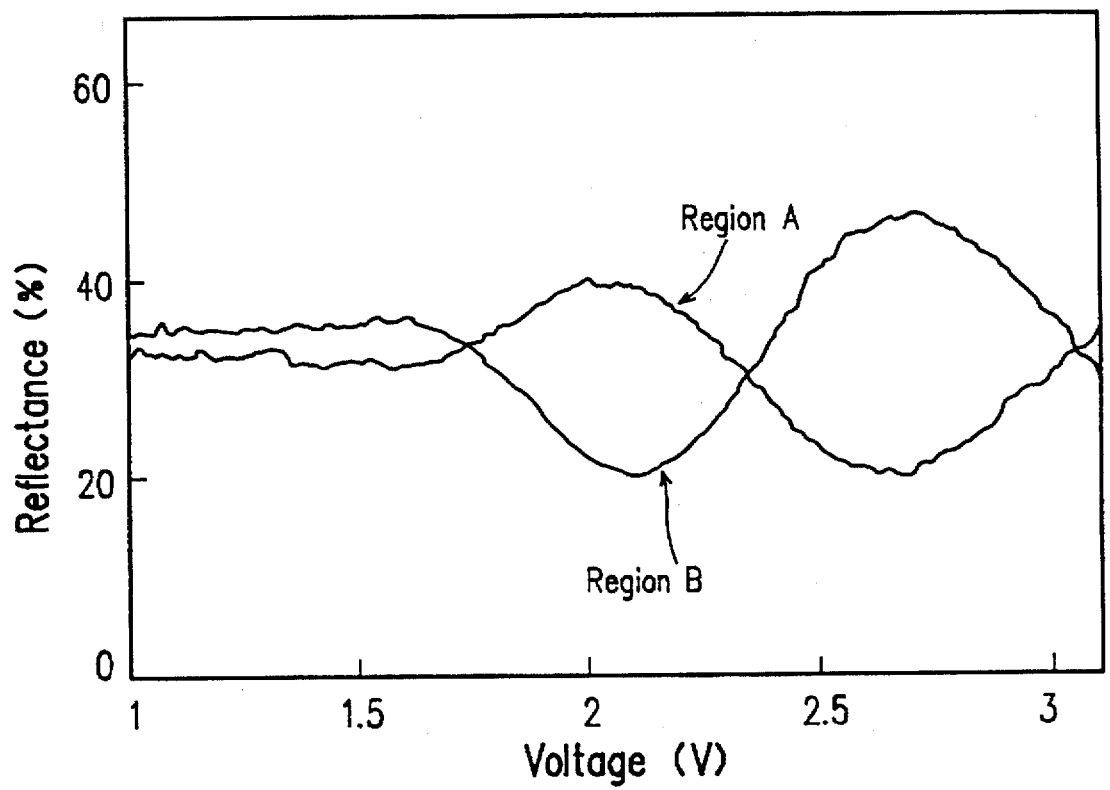
FIG. 8 is a graph showing the voltage-reflectance characteristics of a liquid crystal display device of Example 2.
Figure 9:
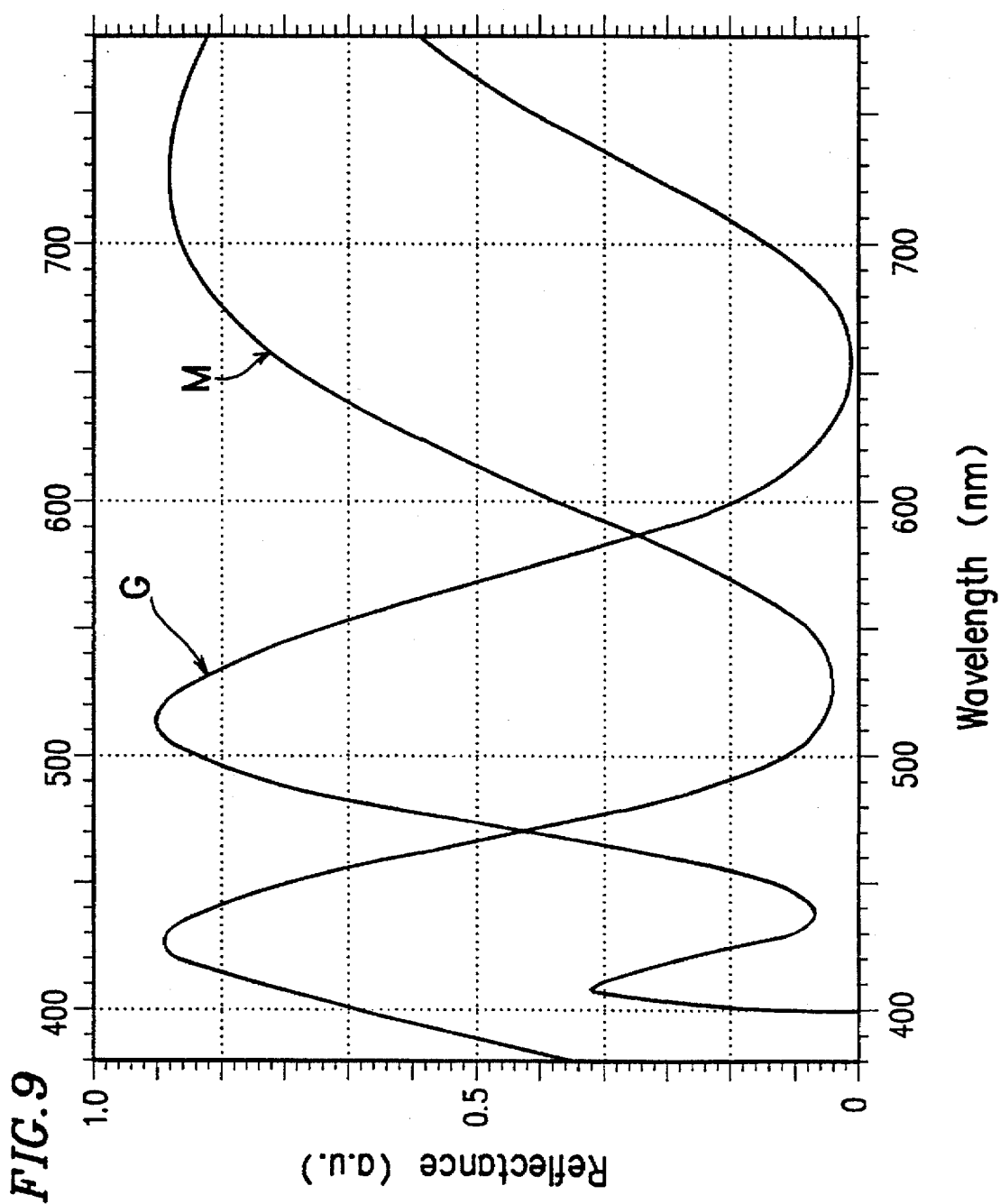
FIG. 9 is a graph showing the wavelength dependence of the reflected light intensity of the liquid crystal display device of Example 2 in which green and magenta are displayed.
Figure 10:
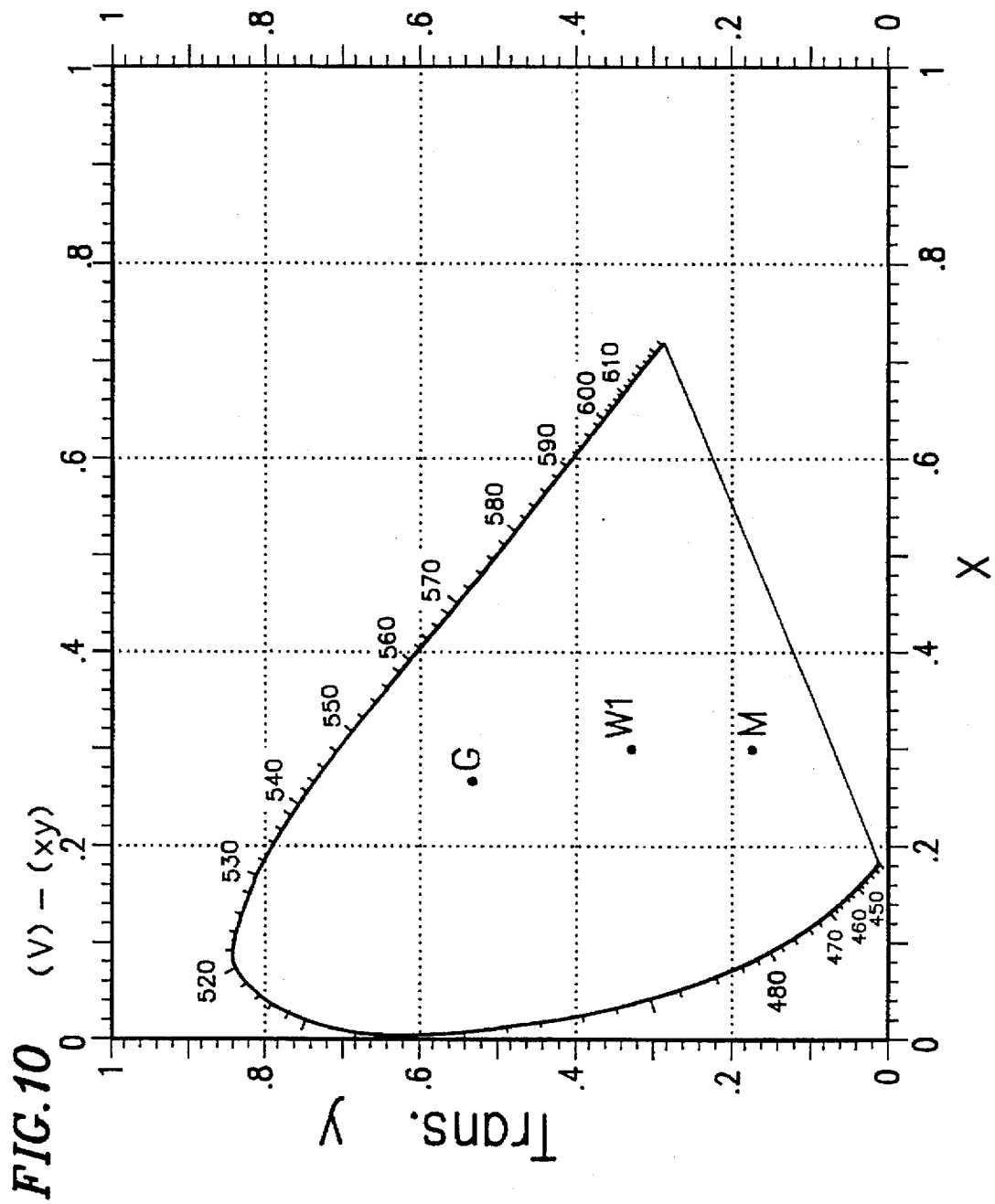
FIG. 10 is a chromaticity diagram of the liquid crystal display device of Example 2 in which green and magenta are displayed.

FIG. 8 is a graph showing the voltage-reflectance characteristics of the liquid crystal display device of Example 2. The measurements were conducted by the same method as that of Example 1. FIG. 9 is a graph showing the wavelength dependence of the reflectance obtained in the cases where green and magenta are shown. FIG. 10 shows a CIE chromaticity diagram of the device. In FIG. 10, point W1 indicates light of a white light source, points M and G indicate reflected light of magenta and that of green, respectively. It was confirmed that in the view point of color purity, there is no obstacle in practical use.

As an example, the device may be set so that, when no voltage is applied, the region A shows magenta and the region B shows green. Under this configuration, by adequately combining the regions A and B in accordance with a voltage to be applied, for example, color displays listed in Table 2 below are made available.

When the polarization axes of the two polarizers 15 are parallel to each other, complementary colors of the colors obtained in Example 1 are shown. It was confirmed also in this case that a satisfactory color display can be attained without using a color filter based on the same principle.

EXAMPLE 4

A still further example of the invention will be described. The liquid crystal display device of the example was configured in the following manner: A stretched film made of polycarbonate was used as the first optical phase compensation member 13 of the reflective liquid crystal display device described in conjunction with Example 1, and patterned by a dry etching technique using a conventional photoprocessing. Then, a stretched film made of polycarbonate and functioning as the second optical phase compensation member 14 was disposed on the member 13. The other configurations were the same as those of Example 1.

It was confirmed that also the liquid crystal display device can conduct a satisfactory color display without using a color filter based on the same principle.

In the example, a stretched film made of polycarbonate was used. The invention is not limited to this. Alternatively, a stretched film made of polyvinyl alcohol (PVA) or polymethyl methacrylate (PMMA) may be used and patterned.

TABLE 2

| Region A | White | Magenta | Magenta | White | Black | Magenta | Black |
|---|---|---|---|---|---|---|---|
| Region B | White | White | Black | Green | Green | Green | Black |
| Display | White | Bright Magenta | Dark Magenta | Bright Green | Dark Green | Light Black | Black |

In the example, a pixel is divided into two regions of magenta and green. The manner of division is not limited to this, and a combination of yellow and blue or cyan and red may be employed. It was confirmed that, when a pixel is divided into three regions, i.e., blue, red and green regions, reflected light showing more kinds of colors can be displayed. Under these settings, arbitrary colors can be shown by adjusting the retardation of the liquid crystal layer and that of the optical phase compensation plate.

In the liquid crystal display device of the example, the display hue can be modulated by a voltage using two pixels. Therefore, the reduction of resolution which is observed in a conventional system realized by combining RGB color filters is small, with the result that the brightness is almost doubled.

EXAMPLE 3

Figure 11:
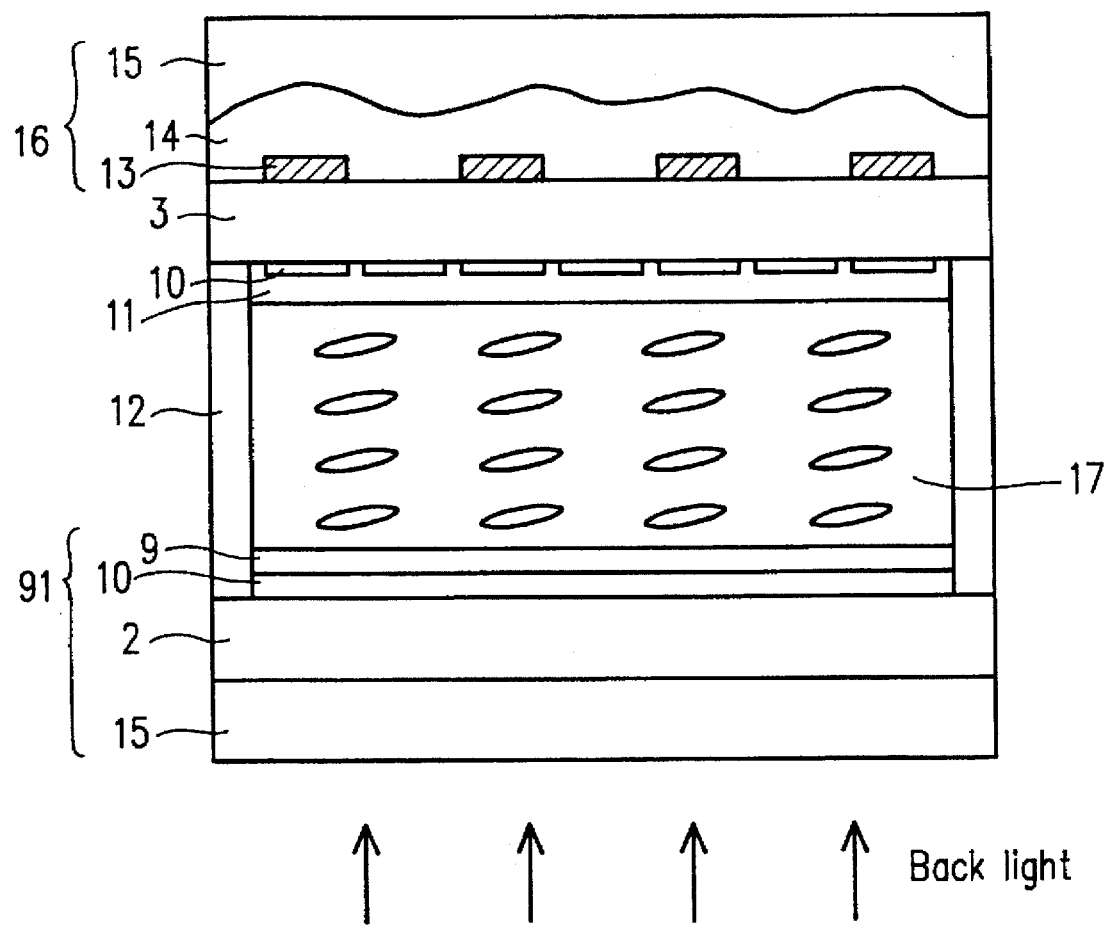
FIG. 11 is a section view of a liquid crystal display device of Example 3.
Figure 12:
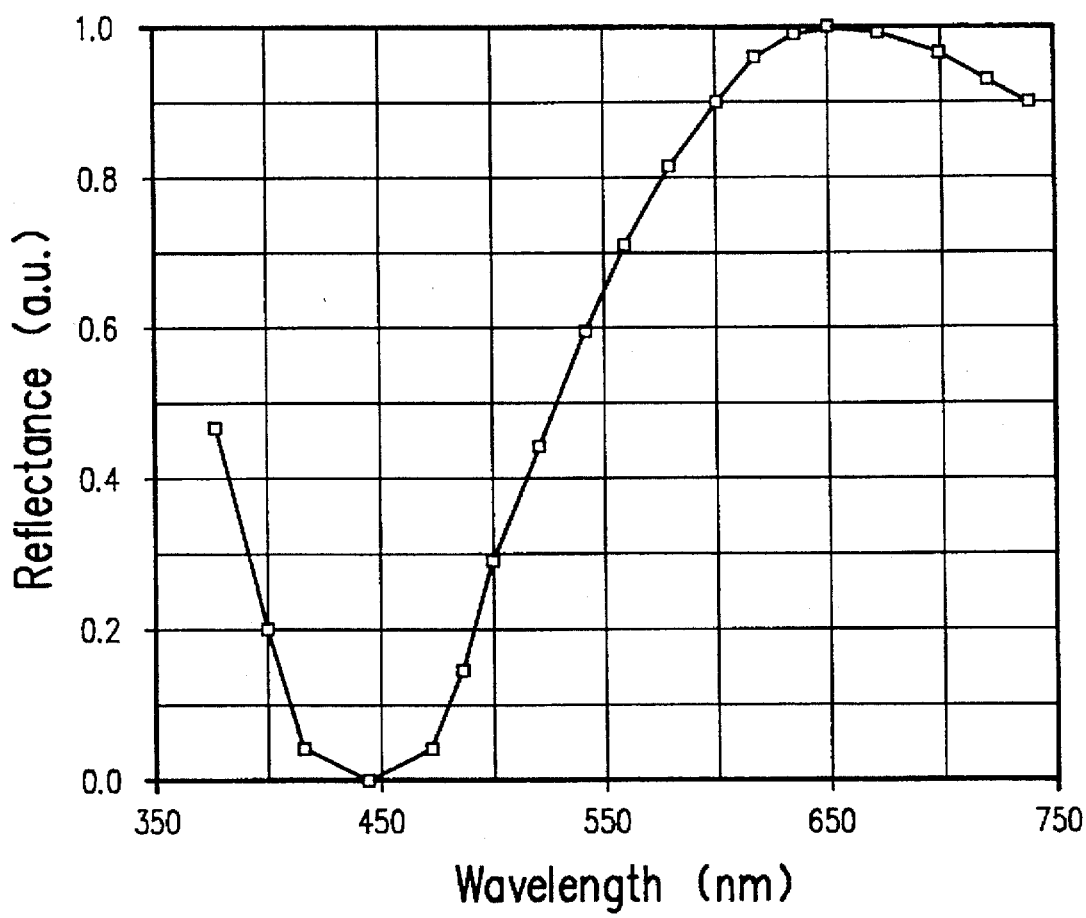
FIG. 12 is a graph showing the wavelength dependence of the reflected light intensity.
Figure 13:
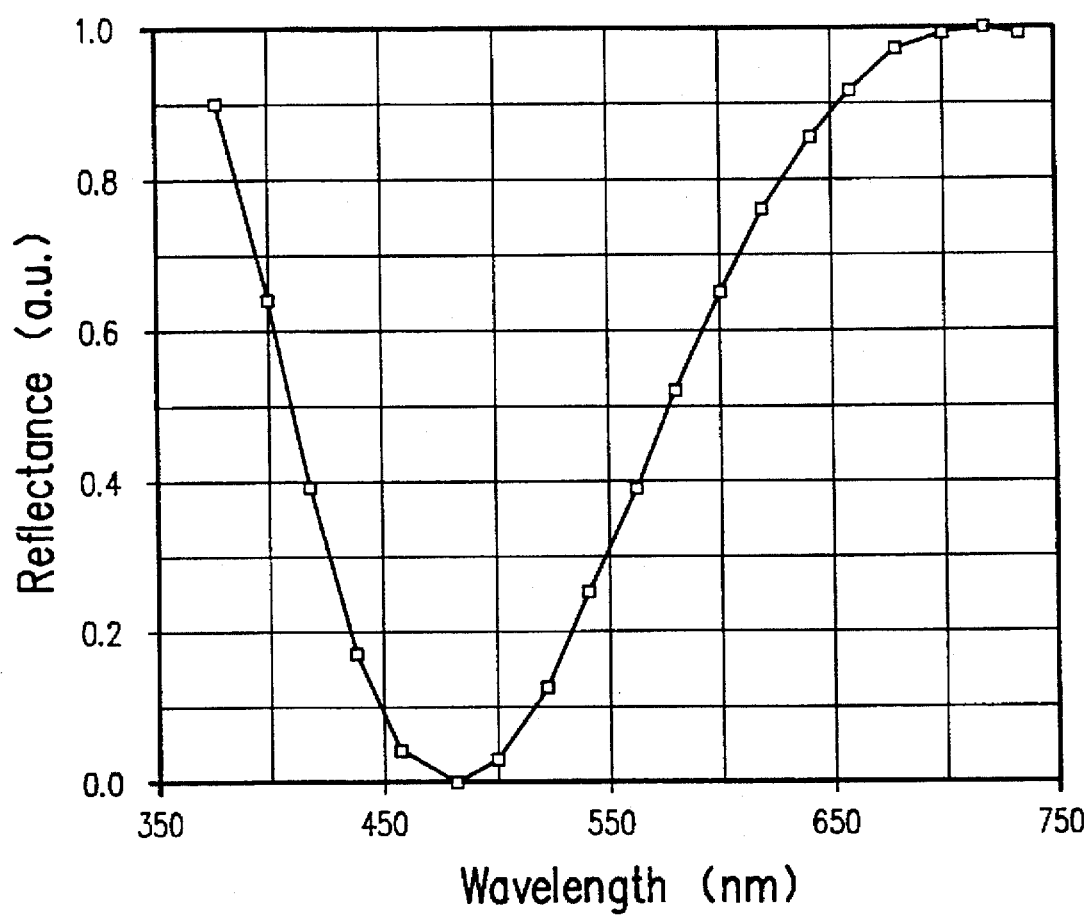
FIG. 13 is a graph showing the wavelength dependence of the reflected light intensity.
Figure 14:
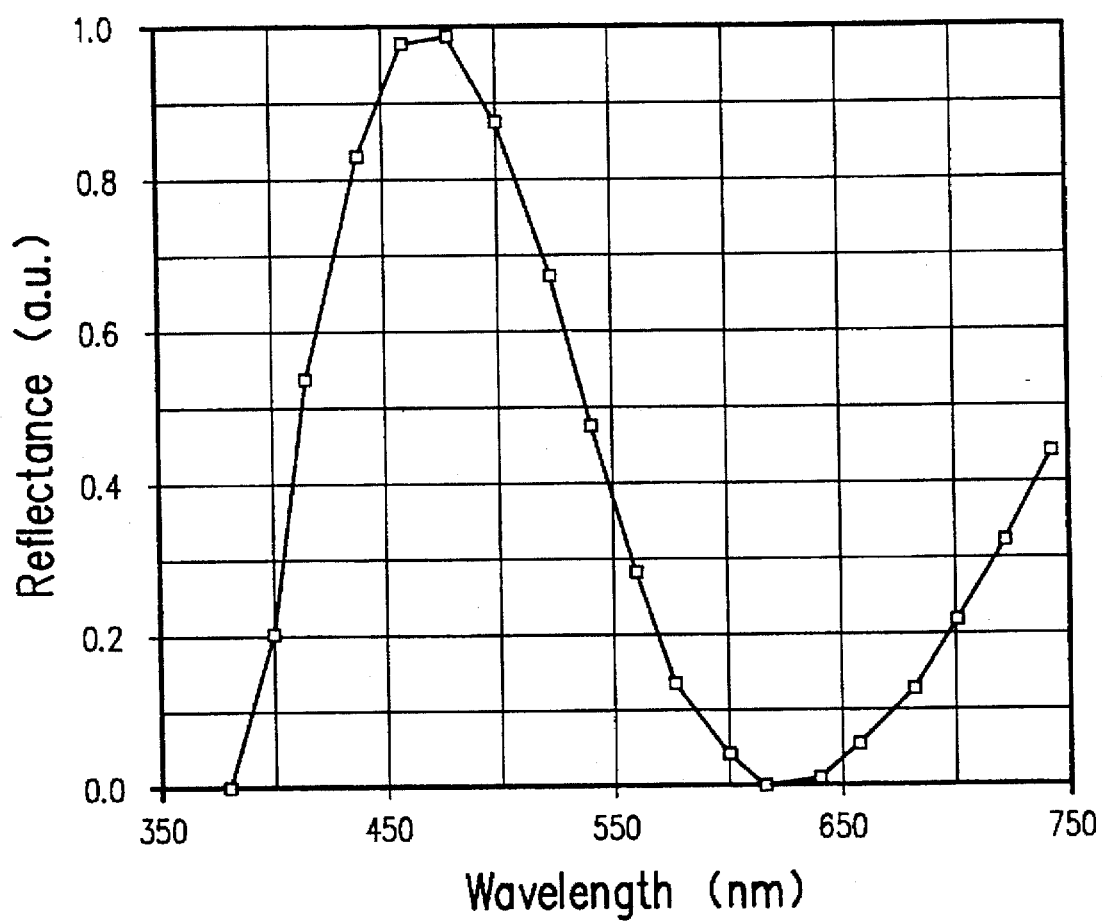
FIG. 14 is a graph showing the wavelength dependence of the reflected light intensity.
Figure 15:
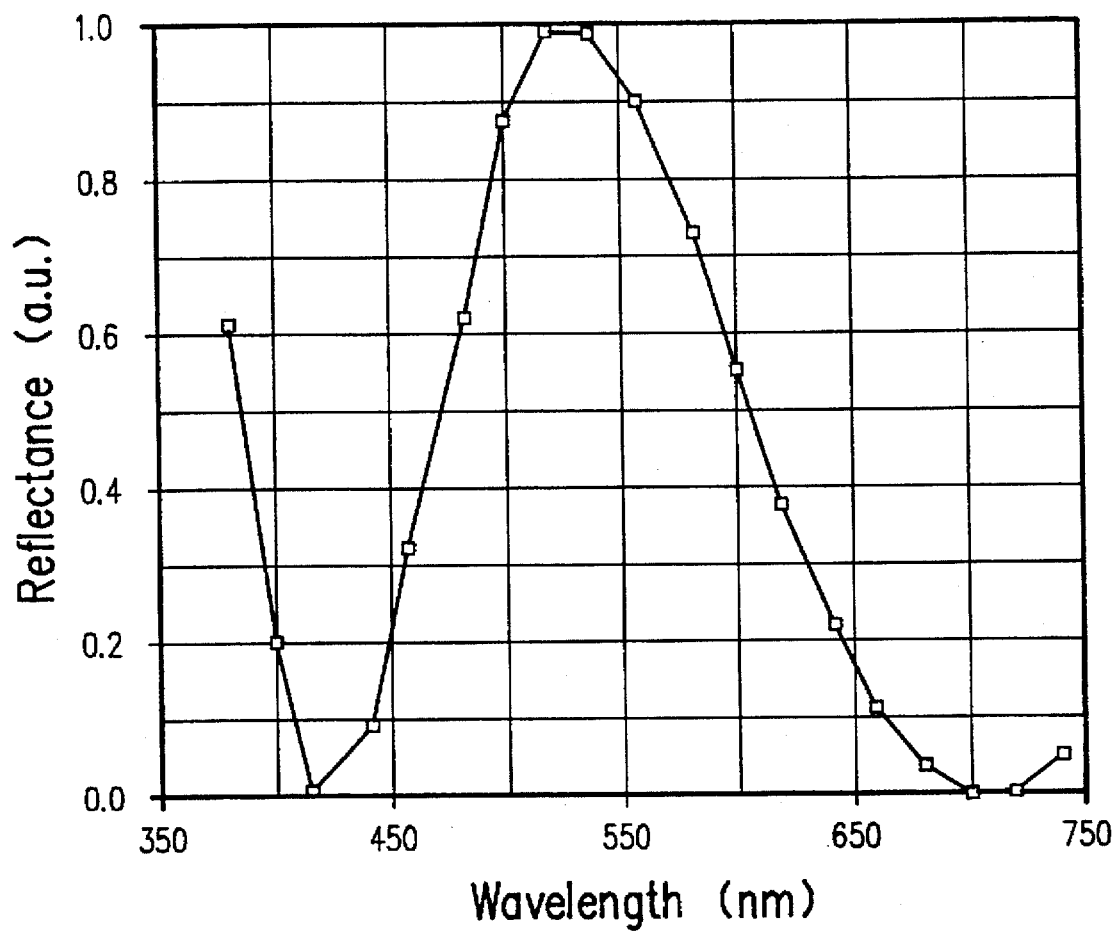
FIG. 15 is a graph showing the wavelength dependence of the reflected light intensity.

A further example of the invention will be described. FIG. 11 is a section view showing a liquid crystal display device of the example. In place of the lower substrate 8 of the reflective liquid crystal display device described in conjunction with Example 1, a transparent substrate 91 in which the transparent electrode 10 and the alignment layer 9 are formed on the glass substrate 2 is used. The polarizer 15 is disposed on the back of the transparent substrate 91. The liquid crystal layer 17 is sealed between the alignment layers 9 and 11.

In the liquid crystal display device, when the polarization axis of the polarizer 15 disposed at the back (the lower side in the figure) is made perpendicular to that of the polarizer 15 disposed at the front (the upper side in the figure), the same colors as those obtained in Example 1 are shown.

A stretched film having photosensitivity may be used. In this case, there is a merit that the process is simplified. It was confirmed that also in this case a satisfactory color display can be attained without using a color filter based on the same principle. Furthermore, it was confirmed that a patterning can be conducted in the same manner also by using a wet etching technique in place of a dry etching technique.

In Examples 1 to 4 described above, the liquid crystal layer in which liquid crystal molecules are oriented in parallel to the substrate or twisted by 240 deg. is used. The invention is not limited to these orientations of the liquid crystal molecules. The liquid crystal layer of which the twist angle is between 0 to 300 deg. may be used in the liquid crystal display device of the present invention. The liquid crystal layer in which the liquid crystal molecules on a substrate are oriented in a substantially perpendicular direction may be used. When a nematic liquid crystal having negative anisotropy of dielectric constant is used, for example, the liquid crystal layer in which the liquid crystal molecules at both substrates are perpendicularly oriented can be used in the invention. Liquid crystal layers having any orientation may be used in the present invention as far as the retardation of the liquid crystal layer can be controlled by an electric field.

A liquid crystal layer of retardation of 1.0 μm or less may be used in the invention. It was confirmed that in this case the viewing angle is wide and the color purity is high.

In Examples 1 to 4 described above, a stretched film made of polycarbonate is used as the second optical phase compensation member 14. The invention is not limited to this, and a stretched film of PVA, PMMA or the like may be used. The second optical phase compensation member 14 may be formed by oblique evaporation.

In Examples 1 to 4 described above, the optical phase compensation members have two kinds of retardations. The invention is not limited to this. Optical phase compensation members having three or more kinds of retardations may be employed in the present invention. The device according to the invention may be so configured that portions of three or more different retardations exist in one pixel. Alternatively, the device may be so configured that some portions of two or more different retardations exist in one pixel and the other portions exist in another pixel.

In Examples 1 to 3 described above, the first optical phase compensation member 13 is disposed outside the liquid crystal cell. The first optical phase compensation member 13 may be disposed inside the liquid crystal cell. Also in this case, the same effects can be attained.

In place of the glass substrate 2 used in Examples 1 to 4, an opaque substrate such as a silicon substrate may be used. It was confirmed that also in this case the same effects can be attained. In this case, there is an advantage that circuit elements can be integrated on the substrate.

As described above, according to the invention, light passing through the polarizers, the optical phase compensation members and the liquid crystal layer is emitted as elliptically polarized light to show a specific color, the hue of the emitted light can be controlled by adjusting $(\Delta n_1 d_1 - \Delta n_2 d_2)/\lambda$ in Eqs. (2) to (4) by means of an electric field applied to the liquid crystal layer. Therefore, emitted light can be formed so as to have hues of two more kinds in accordance with a pixel, whereby a multicolor display can be attained without using a color filter.

When the invention is applied to a reflective display device, particularly, a light reflection member can be formed inside a liquid crystal element so that the parallax is eliminated and a reflective color liquid crystal display device of high definition and high display quality can be realized. When the color liquid crystal display mode of the invention is used, the face on which a reflection layer is formed can be disposed in the side of a liquid crystal layer, and therefore the parallax is eliminated, thereby obtaining a satisfactory display image.

EXAMPLES 5–12

In the following examples, a reflective liquid crystal display device using a single polarizing plate will be described. An ECB (electrically controlled birefringence) mode using only one polarizing plate has been proposed as a reflective display mode capable of providing gray-scale display as well as bright display.

FIGS. 18A and 18B show the operation principle of the ECB mode. Referring to FIGS. 18A and 18B, a liquid crystal display device 201 includes a polarizing plate 202, a phase compensation plate 203, a liquid crystal layer 204, and a reflector 205. In the dark state shown in FIG. 18A, an apparent retardation $\Delta n.d$ obtained by combining the liquid crystal layer 204 and the phase compensation plate 203 satisfies the $\lambda/4$ condition. Thus, linearly polarized light incident on the polarizing plate 202 in a direction shown by an arrow A1 is changed to circularly polarized light with a rotational direction shown by an arrow A2 after passing through the phase compensation plate 203 and the liquid crystal layer 204. The light is then reflected from the reflector 205 and changed to circularly polarized light with a rotational direction shown by an arrow A3 which is reverse to the arrow A2. After returning through the liquid crystal layer 204 and the phase compensation plate 203, the light is changed to linearly polarized light of which polarization direction has been rotated by 90° from that of the incident linearly polarized light. The reflected linearly polarized light is thus blocked by the polarizing plate 202.

On the contrary, in the bright state shown in FIG. 18B, the apparent retardation $\Delta n.d$ is 0. Thus, the polarization of the incident linearly polarized light does not change after being reflected from the reflector 205, allowing the reflected light to pass through the polarizing plate 202. Display in the ECB mode is realized in this way.

The reflector used in the ECB mode is required to reflect linearly polarized light incident thereon in the bright state as linearly polarized light and circularly polarized light incident thereon in the dark state as circularly polarized light. Otherwise, good contrast will not be obtained, resulting in lowering the display quality.

In Examples 5 to 11 below are described reflective liquid crystal display devices which include a reflector capable of reflecting light incident thereon without changing the degree of polarization of the light, thereby providing significantly improved display quality, and methods for fabricating such liquid crystal display devices.

EXAMPLE 5

Figure 19A:
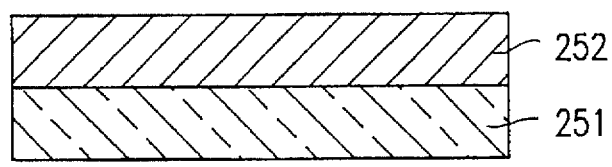
FIGS. 19A to 19F are sectional views showing the steps of fabricating a reflector in Example 5 according to the present invention.
Figure 19B:
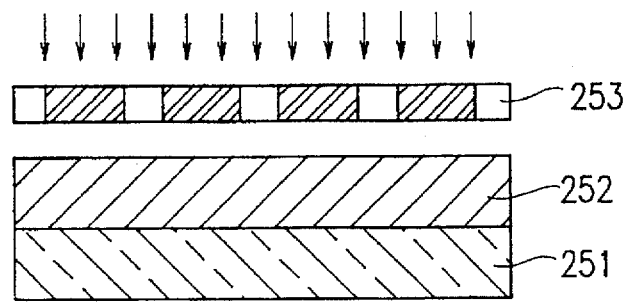
Figure 19C:
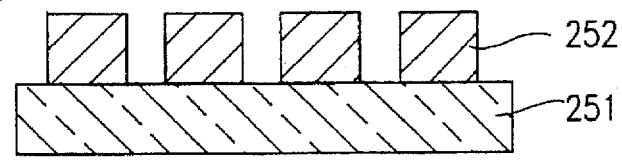

FIGS. 19A to 19F show a fabrication process of a reflector used for a reflective liquid crystal display device of Example 5 according to the present invention. As shown in FIG. 19A, a surface of a 1.1 mm thick glass substrate 251 (product name: 7059, Corning Inc.) is coated with a resist material (e.g., OFPR-800, Tokyo Ohka Kogyo Co., Ltd.) by spin coating at a rotation speed of preferably 500 to 3000 rpm, to form a resist layer 252. In this example, the resist material was applied at a rotation speed of 3000 rpm for 30 seconds to form the resist layer 252 having a thickness of 1.2 µm. The resultant structure is prebaked at 100° C. for 30 minutes. Then, a photomask 253 with a predetermined pattern is placed on the resist layer 252 and exposed to light (FIG. 19B). The resist layer 252 is developed with a developer (NMD-3, 2.3%, Tokyo Ohka Kogyo Co., Ltd.), forming fine projections on the glass substrate 251 (FIG. 19C).

Figure 19D:
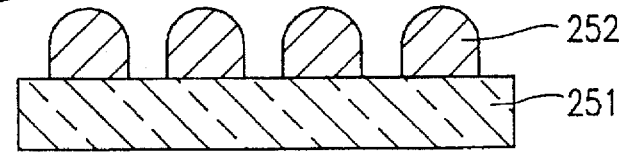
Figure 19E:
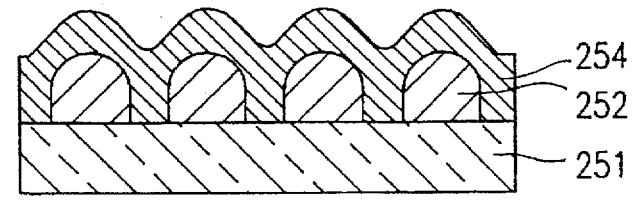
Figure 19F:
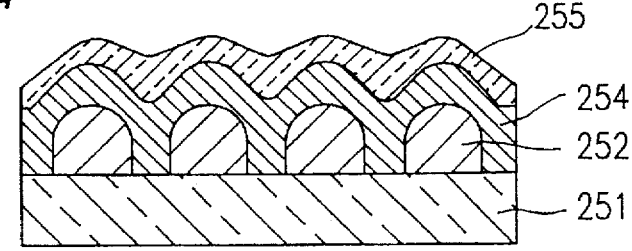

The projections on the glass substrate 251 are heat-treated preferably at 120° to 250° C., to allow the corners of the projections to be deformed by heat, forming smooth convex and concave portions (FIG. 19D). In this example, the heat treatment was performed at 180° C. for 30 minutes. Then, the glass substrate 251 with projections formed thereon is coated with a polyimide resin by spin coating at a rotation speed of preferably 920 to 3500 rpm for 20 seconds, to form an organic insulating layer (a polymer resin layer) 254. In this example, a polyimide resin was applied at a rotation speed of 2200 rpm for 20 seconds to form the organic insulating layer 254 of a thickness of 1 µm, thus forming a surface with smooth convex and concave portions (FIG. 19E). A metal thin layer 255 is then formed on the organic insulating layer 254 (FIG. 19F). The metal thin layer 255 may be made of Al, Ni, Cr, and Ag, and the thickness thereof is preferably 0.01 to 1.0 µm, more preferably 0.1 to 0.5 µm. In this example, the metal thin layer 255 was formed by depositing Al by vacuum deposition.

Some other types of reflectors were also fabricated under other conditions for the application of a resist material, the heat treatment, and the application of a polyimide resin than those described above.

Figure 20:
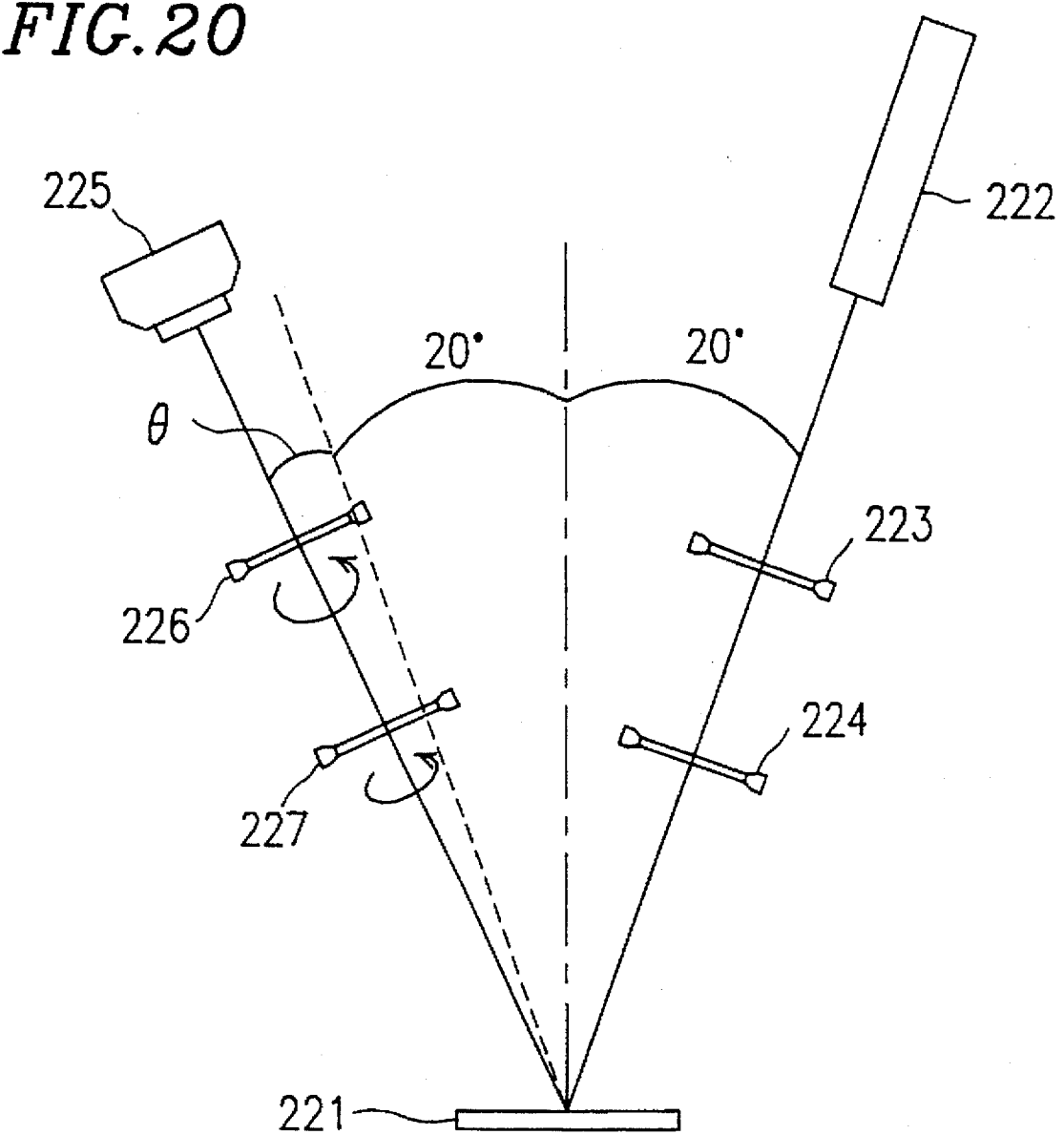
FIG. 20 shows a method for measuring Stokes parameters of light reflected from a reflector.

The Stokes parameters of polarized light reflected from the thus-obtained reflectors were measured as shown in FIG. 20.

Referring to FIG. 20, a light source 222 is placed at a position inclined by 20° from the normal of a reflector 221.

Light from the light source 222 is incident on the reflector 221 after being changed to circularly polarized light by a polarizing plate 223 and a ¼ wave plate 224. The regular reflection direction is set at 0°, and a power meter 225 is placed at a position inclined from the regular reflection direction by an angle φ (φ=30°). A polarizing plate 226 and a ¼ wave plate 227 are placed between the power meter 225 and the reflector 221. The Stokes parameters are measured by varying the directions of the transmission axis of the polarizing plate 226 and the optic axis of the ¼ wave plate 227. The Stokes parameters $S_0$, $S_1$, $S_2$, and $S_3$ are the four quantities represented by:

$$S_0 = <|E_x|^2> + <|E_y|^2> \quad (5)$$

$$S_1 = <|E_x|^2> - <|E_y|^2> \quad (6)$$

$$S_2 = <2E_x E_y \cos\delta> \quad (7)$$

$$S_3 = <2E_x E_y \sin\delta> \quad (8)$$

where $\delta = \phi_y - \phi_x$ $E_x$ and $E_y$ are the amplitudes of light wave vibrating in the X-axis and Y-axis directions, respectively. $\phi_x$ and $\phi_y$ are the phases of light wave vibrating in the X-axis and Y-axis directions, respectively. The Stokes parameters $S_0$, $S_1$, $S_2$, and $S_3$ respectively refer to the total light intensity, the excess in intensity of horizontal linearly polarized light, the excess in intensity of 45° linearly polarized light, and the excess in intensity of right-handed circularly polarized light. Typical examples of the polarization states are shown below:

$$\begin{array}{cccccc} \text{horizontal} & \text{vertical} & 45\text{ deg} & -45\text{ deg} & \text{right-handed} & \text{left-handed} \\ \begin{pmatrix}1\\1\\0\\0\end{pmatrix} & \begin{pmatrix}1\\-1\\0\\0\end{pmatrix} & \begin{pmatrix}1\\0\\1\\0\end{pmatrix} & \begin{pmatrix}1\\0\\-1\\0\end{pmatrix} & \begin{pmatrix}1\\0\\0\\1\end{pmatrix} & \begin{pmatrix}1\\0\\0\\-1\end{pmatrix} \end{array} \quad (9)$$

The excess in intensities of vertical linearly polarized light, −45° linearly polarized light, and left-handed circularly polarized light which are orthogonal to the horizontal linearly polarized light, the 45° linearly polarized light, and the right-handed circularly polarized light, respectively, are expressed as negative values of the Stokes parameters $S_2$, $S_3$, and $S_4$, respectively.

Completely polarized light satisfies the following relation represented by:

$$S_0^2 = S_1^2 + S_2^2 + S_3^2 \quad (10)$$

indicating that only three of the four parameters are independent. Partially polarized light satisfies the following relation represented by:

$$S_0^2 > S_1^2 + S_2^2 + S_3^2 \quad (11)$$

The degree of polarization is calculated as the ratio of the intensity of completely polarized light to the total intensity, represented by:

$$V = \frac{\sqrt{S_1^2 + S_2^2 + S_3^2}}{S_0} \quad (12)$$

The time-averaged amplitudes of natural light waves in x and y directions are equal and have no correlation with each other, directly resulting as:

$$\begin{pmatrix}1\\0\\0\\0\end{pmatrix} \quad (13)$$

Based on the above, the measuring method is described with reference to FIGS. 21 and 22A to 22D.

Figure 21:
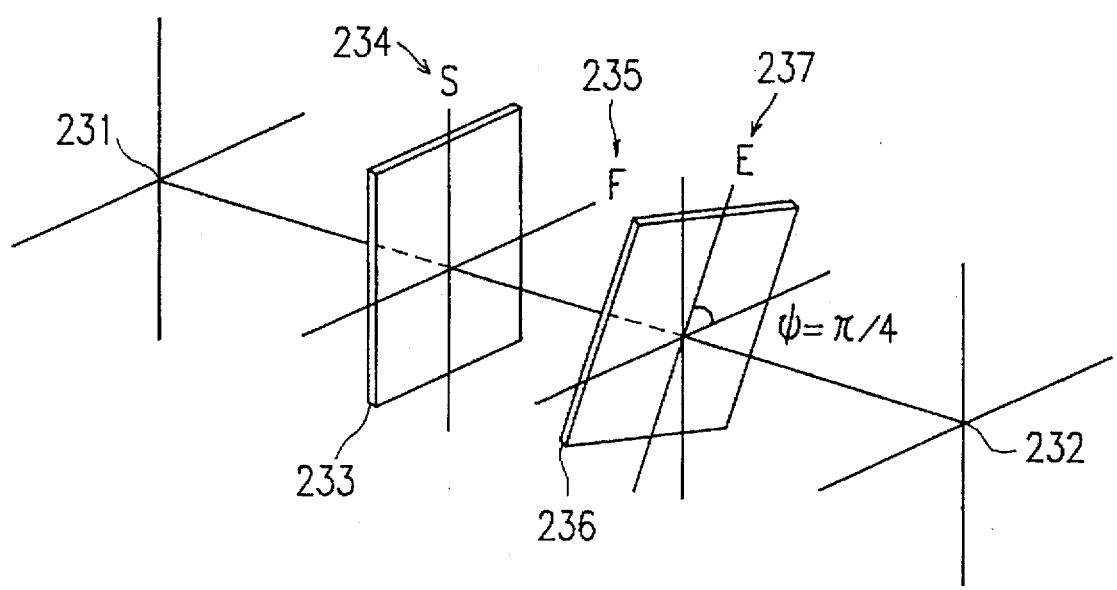
FIG. 21 shows a system for measuring Stokes parameters.
Figure 22A:
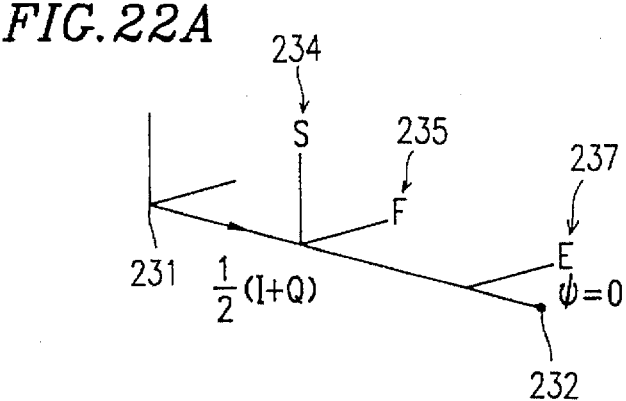
FIGS. 22A to 22D show the principles for measuring Stokes parameters.
Figure 22B:
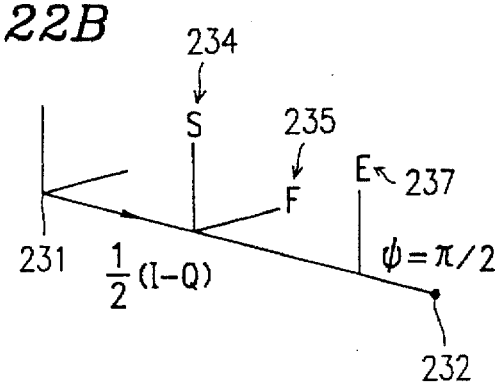
Figure 22C:
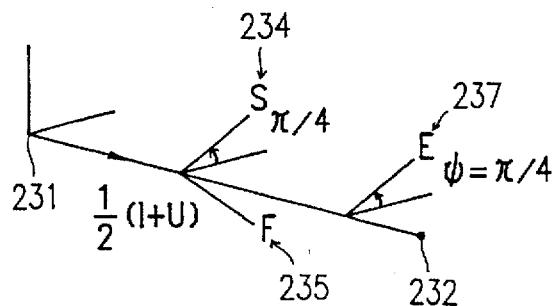
Figure 22D:
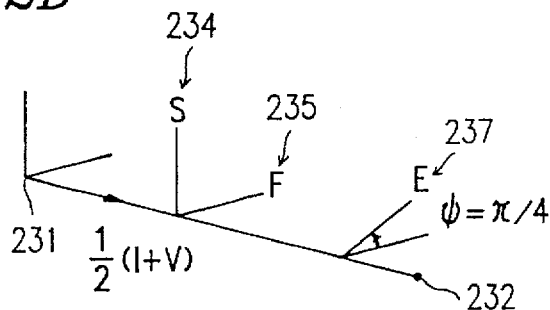

FIG. 21 shows a measuring system. The Stokes parameters $S_0$, $S_1$, $S_2$, and $S_3$, which are respectively denoted as I, Q, U, and V in FIGS. 22A to 22D, are not independently measured. But, the Stokes parameters are obtained by measuring light intensities obtained when the optic axis of the ¼ wave plate and the transmission axis of the polarizing plate are varied as shown in FIGS. 22A to 22D and solving simultaneous equations 14 to 17 below.

$$\tfrac{1}{2}(I+Q) = i(a) \quad (14)$$

$$\tfrac{1}{2}(I-Q) = i(b) \quad (15)$$

$$\tfrac{1}{2}(I+U) = i(c) \quad (16)$$

$$\tfrac{1}{2}(I+V) = i(d) \quad (17)$$

Functions i(a) to i(d) represent the light intensities measured when the polarizing plate and the phase compensation plate are positioned as shown in FIGS. 22A to 22D, respectively. Thus, the Stokes parameters I, Q, U, and V can be obtained by measuring the light intensities under the conditions shown in FIGS. 22A to 22D and solving simultaneous equations 14 to 17 above.

Next, a method for fabricating a reflective liquid crystal cell using the reflector fabricated in the above-described process will be described.

Figure 23:
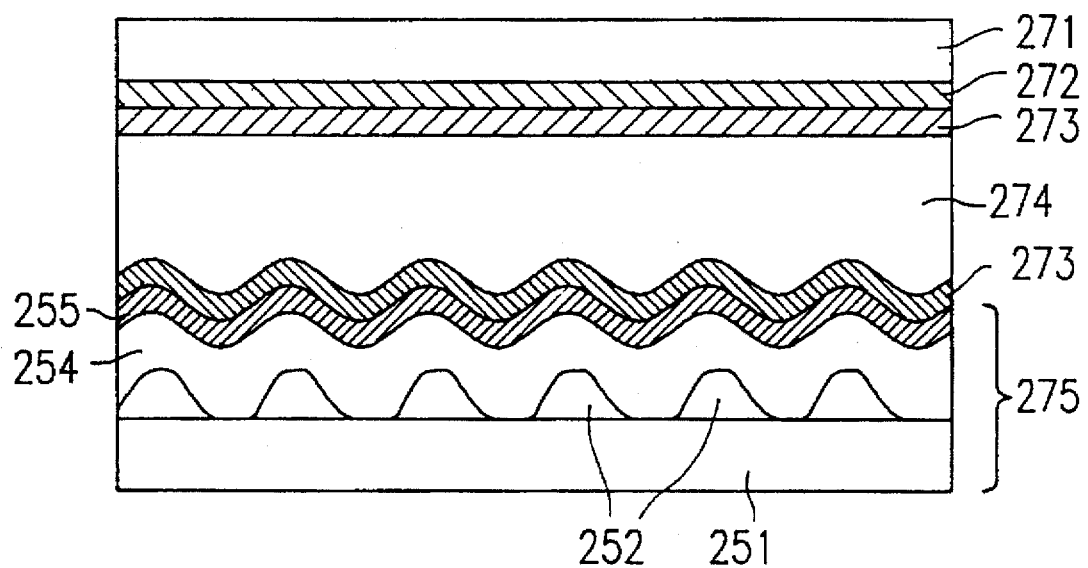
FIG. 23 is a sectional view of a reflective liquid crystal display device of Example 5 according to the present invention.

FIG. 23 is a sectional view of the reflective liquid crystal display device of Example 5 using a reflector 275 which includes the glass substrate 251, the resist layer 252, the organic insulating layer 254, and the metal thin layer 255 as described above. The reflector 275 and a glass substrate 271 with a transparent electrode 272 made of indium tin oxide (ITO) formed thereon are coated with a polyimide resin and baked at 200° C. for one hour, to form liquid crystal alignment layers 273. The alignment layers 273 are then rubbed for alignment of liquid crystal molecules. The reflector 275 and the glass substrate 271 are then attached together with 5 μm-dia. spacers dispersed therebetween so that a homogeneous cell can be obtained. A liquid crystal sealing layer (not shown) is formed around a space between the glass substrates 251 and 271 by screen-printing an adhesive sealant containing 5.5 μm-dia. spacers. After the formation of the liquid crystal sealing layer, a liquid crystal material is injected between the substrates 251 and 271 under vacuum so as to form a liquid crystal layer 274. In this example, ZLI2459 (trade name) produced by Merck & Co., Inc. was used as the liquid crystal material. The optical anisotropy (birefringence) Δn of the liquid crystal is 0.11, and the cell thickness d is about 5 μm. Thus, the retardation Δn.d of the liquid Crystal layer 274 is 550 nm.

Figure 24:
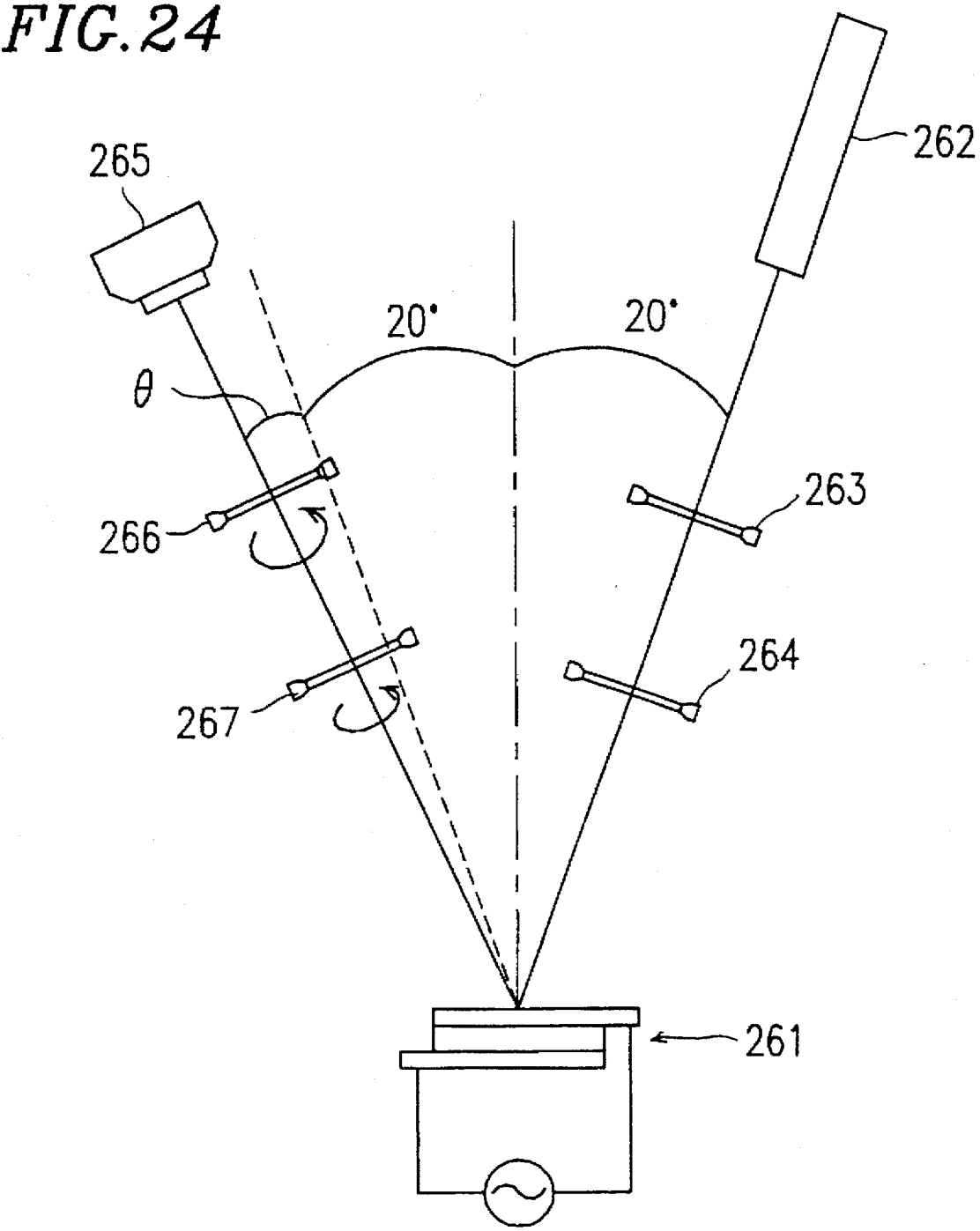
FIG. 24 shows a method for measuring the contrast of a reflective liquid crystal display device according to the present invention.

FIG. 24 illustrates a method for measuring the ratio of the reflectance (contrast ratio) of the thus-obtained reflective liquid crystal cell when it is applied with a voltage (ON state) to when it is applied with no voltage (OFF state). Referring to FIG. 24, light from a light source 262 is incident on a liquid crystal cell 261 at an angle of 20° from the normal of the liquid crystal cell 261 via a polarizing plate 263 and a phase compensation plate 264. The incident light passes through the liquid crystal layer of the liquid crystal cell 261 and is reflected from the reflector thereof. The reflected light passes through the liquid crystal layer, a phase compensation plate 267, and a polarizing plate 266 to enter a power meter 265, where the maximum (ON state) and the minimum (OFF state) of the reflected light are measured. The measurement angle θ is 30°.

Figure 25:
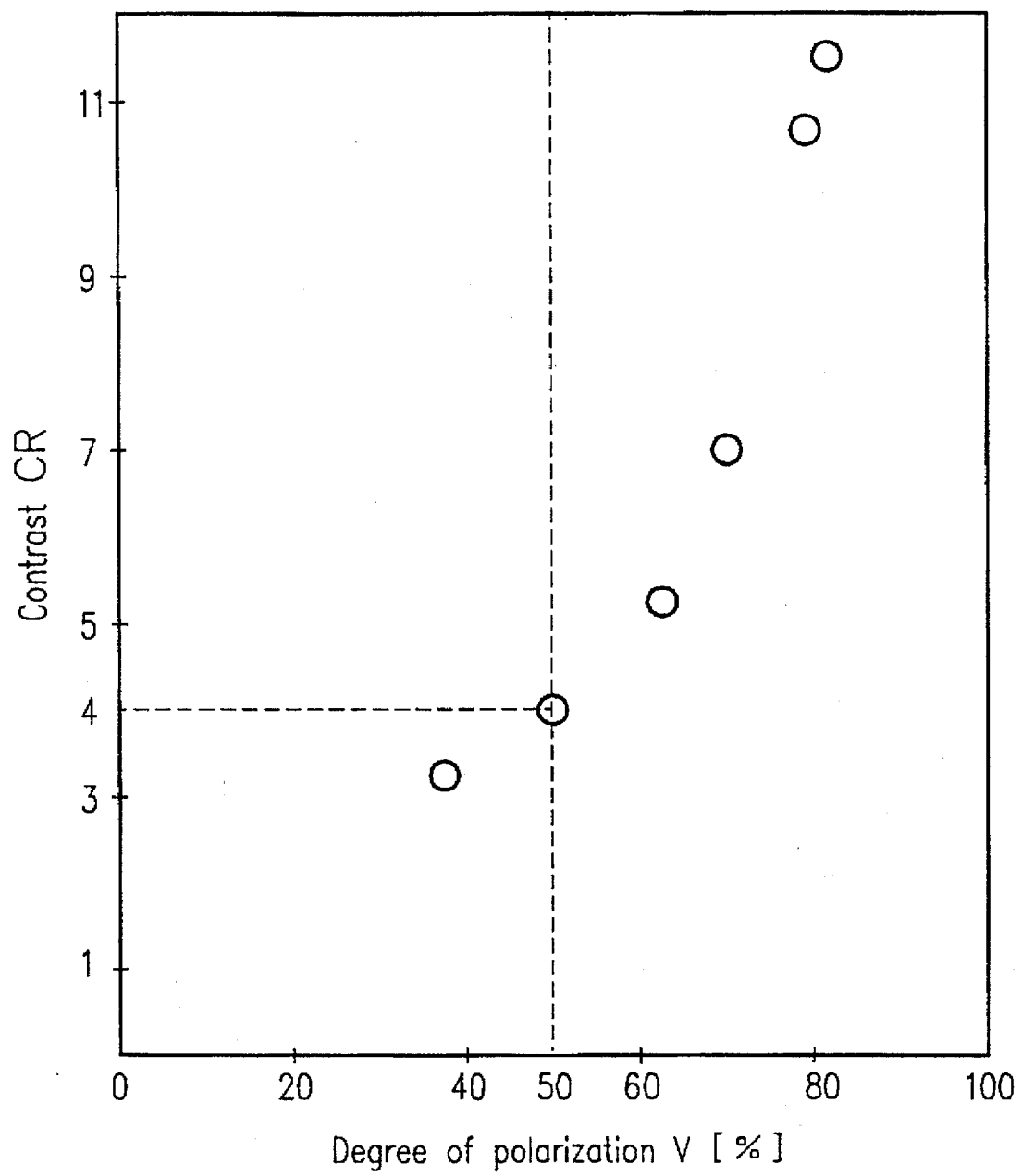
FIG. 25 shows the degree of polarization-contrast characteristic of a reflective liquid crystal display device according to the present invention.

FIG. 25 shows the degree of polarization of each of various types of reflectors, together with the contrast characteristic of an ECB mode reflective liquid crystal display device including the reflector and a single polarizing plate.

As described earlier, in the ECB display mode, the degree of polarization must be retained to improve the contrast. As is observed from FIG. 25, the contrast abruptly improves after the degree of polarization exceeds 50%. A reflective liquid crystal display device with a contrast less than 3 cannot be practically used due to low display quality. A degree of polarization of 50% or more is thus preferable to obtain a contrast of 4 or more. A contrast of 7 or more and a degree of polarization of 70% or more are more preferable.

EXAMPLE 6

Figure 26:
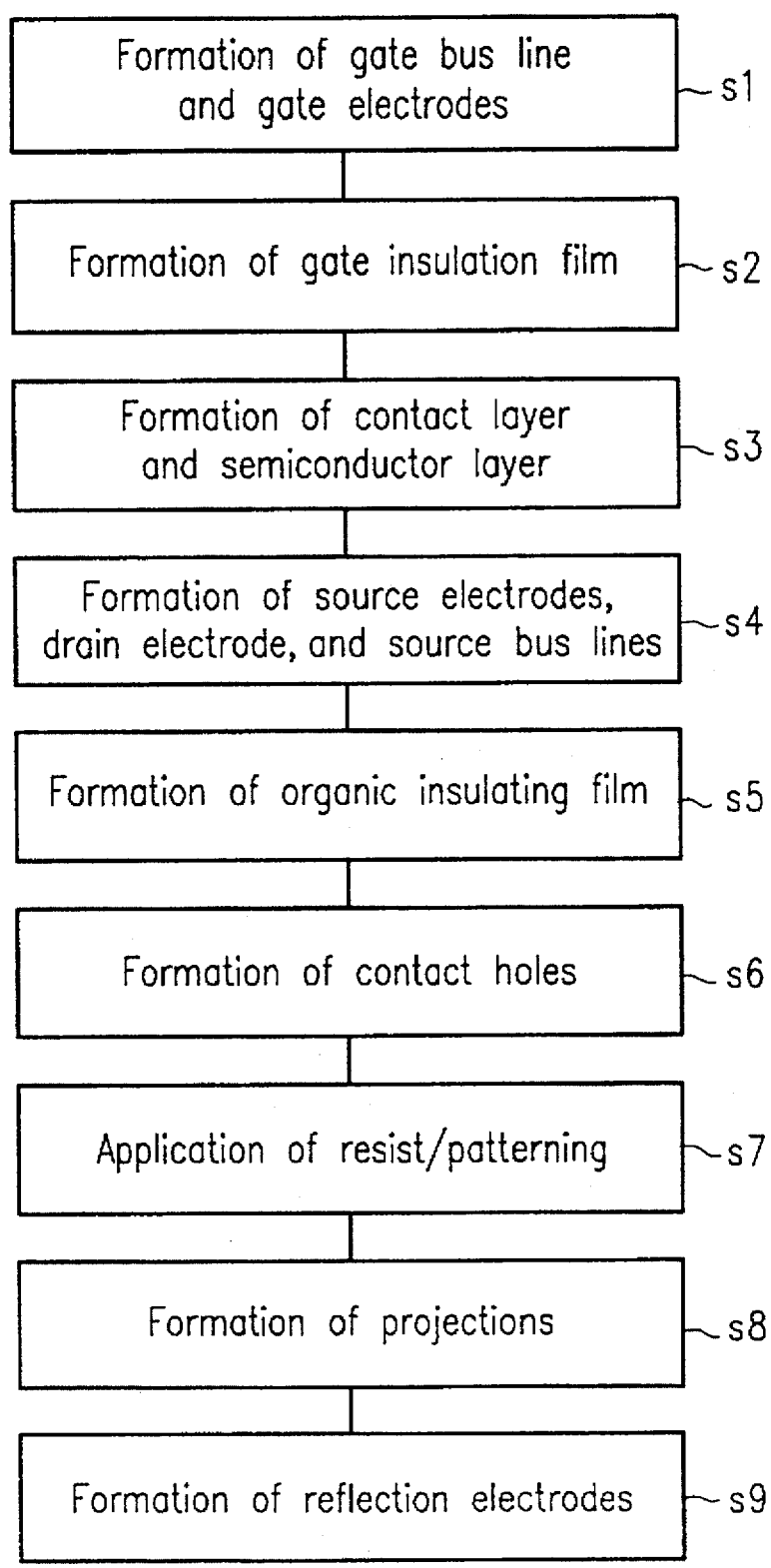
FIG. 26 is a flowchart showing a process of fabricating a reflective active matrix substrate of Example 6 according the present invention.

FIG. 26 is a flowchart showing a fabrication process of an active matrix substrate used in this example. First, a Ta metal layer with a thickness of 300 nm is formed on an insulating substrate made of glass by sputtering. The metal layer is patterned by photolithography and etching to form gate bus lines and gate electrodes. A $Ta_2O_5$ layer may also be formed on the metal layer to protect the gate bus lines and gate electrodes (Step S1). Then, an $SiN_x$ gate insulating layer with a thickness of 400 nm, an a-Si layer with a thickness of 100 nm which is to be a semiconductor layer, and an $n^+$-type a-Si layer with a thickness of 40 nm which is to be a contact layer are formed in this order by plasma chemical vapor deposition (CVD) (Steps S2 and S3). The $n^+$-type a-Si layer and the a-Si layer are then patterned to form the contact layer and the semiconductor layer (Step S3).

Thereafter, Mo is deposited on the entire top surface of the resultant substrate to a thickness of 200 nm by sputtering. The Mo metal layer is then patterned to form source electrodes, drain electrodes, and source bus lines (Step S4). Thus, TFTs are completed. Convex and concave portions are then formed on the surface of the substrate with the TFTs formed thereon using the method and the materials described in Example 5 (Steps S5 to S8). At these steps, the organic insulating layer is etched by photolithography to form contact holes through the organic insulating layer (Step S6). Aluminum layers are then formed on the entire surfaces having projections to obtain reflection electrodes (Step S9).

Figure 27:
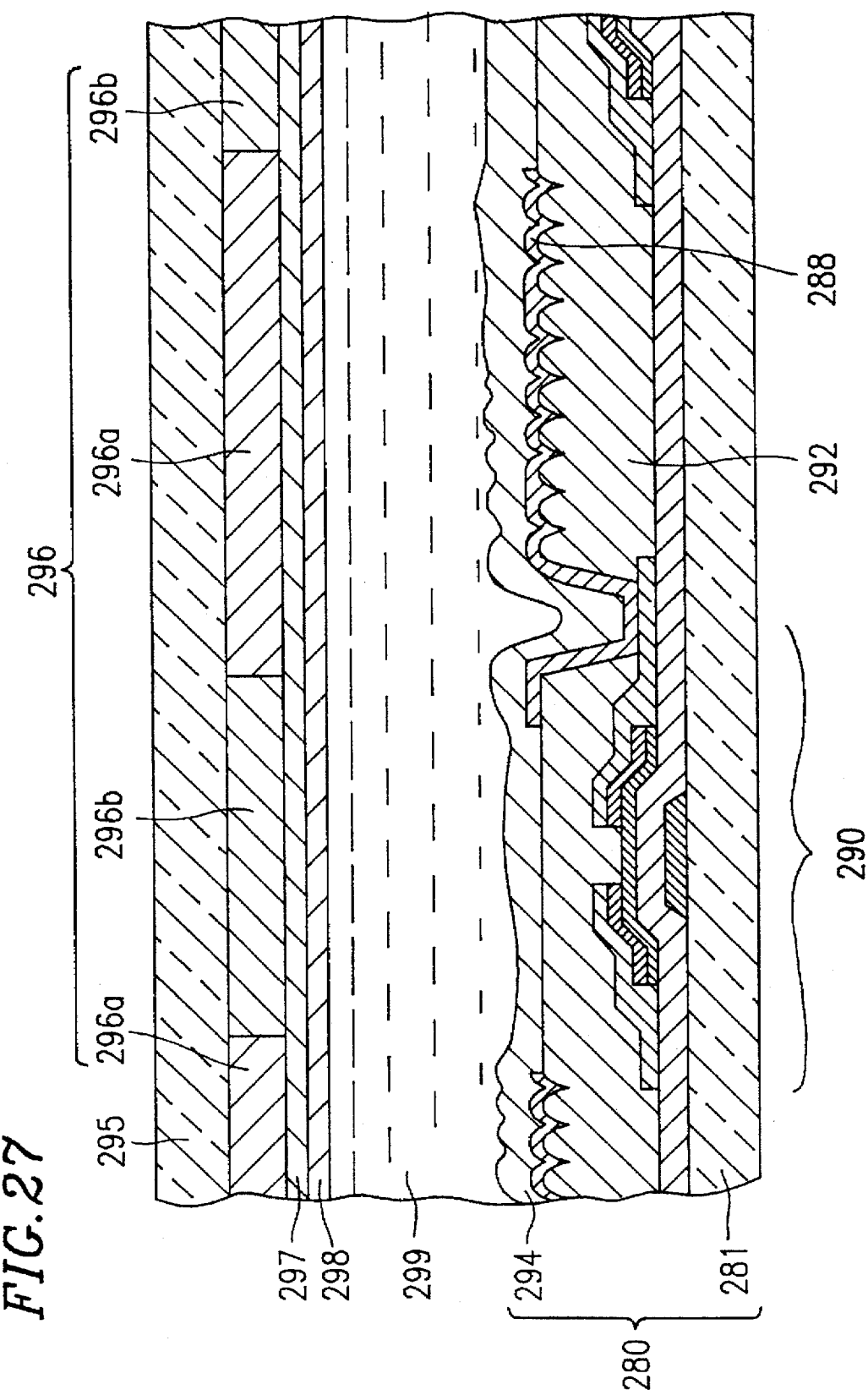
FIG. 27 is a sectional view of the reflective liquid crystal display device of Example 6 using the reflective active matrix substrate according to the present invention.

FIG. 27 is a sectional view of a reflective color liquid crystal display device of Example 6 including a reflective active matrix substrate 280 fabricated in the above-described process. The reflective active matrix substrate 280 includes a TFT 290 formed on a glass substrate 281 and a reflection electrode 288 formed on a resin layer 292 for forming projections. A transparent electrode 297 made of ITO is formed on the surfaces of complementary color filters 296 of magenta and green, for example, to a thickness of 100 nm. The complementary color filters 296 include light-transmitting portions 296a and light-blocking portions 296b. Liquid crystal alignment layers 294 and 298 are formed on the reflective active matrix substrate 280 and a complementary color filter substrate 295 with the complementary color filters 296 and the transparent electrode 297 formed thereon, respectively, and baked. These substrates are attached together, and a liquid crystal sealing layer (not shown) is formed around a space formed between the two substrates by screen printing an adhesive sealant containing 5 μm-dia. spacers. After the formation of the liquid crystal sealing layer, a liquid crystal material is injected between the substrates under vacuum so as to form a liquid crystal layer 299. The same liquid crystal material as that used in Example 5 is used in this example. Another combination of colors such as cyan and red, or blue and yellow, as well as RGB, may also be used for the color filters.

The degree of polarization-contrast characteristic of the thus-obtained reflective liquid crystal display device was measured as in Example 5. As a result, similar results to those shown in FIG. 25 were obtained.

According to the reflective liquid crystal display device of Example 6, the reflection electrodes 288 of the active matrix substrate 280 are formed on the side closer to the liquid crystal layer. This eliminates parallax and thus provides good quality display.

Though the glass substrate was used in this example, a non-transparent substrate such as an Si substrate may also be used to obtain the same effect. In the latter case, to be advantageous, circuits can be integrated on the substrate.

EXAMPLE 7

Figure 28A:
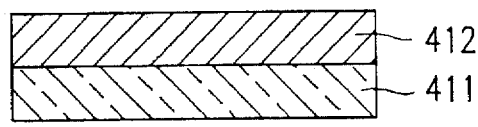
FIGS. 28A to 28H show the steps of fabricating another reflector in Example 7 according to the present invention.
Figure 28B:
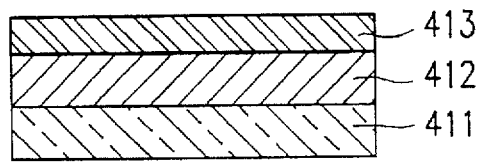
Figure 28C:
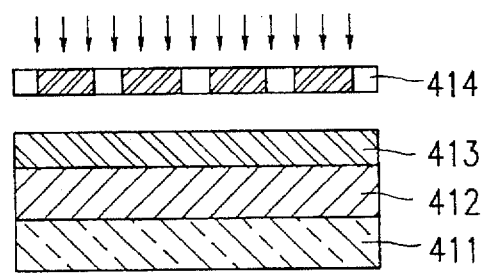
Figure 28D:
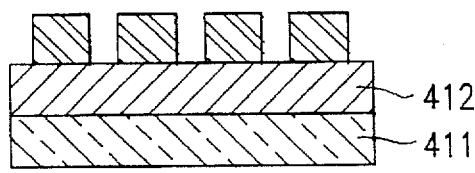
Figure 28E:
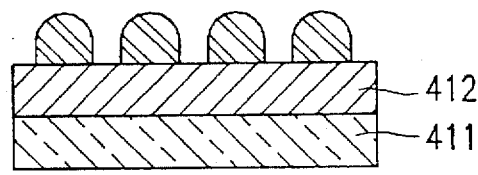

FIGS. 28A to 28H show a fabrication process of a reflector used for a reflective liquid crystal display device of Example 7 according to the present invention. As shown in FIG. 28A, the surface of an active matrix substrate 411 fabricated in the process described in Example 6 where TFTs are formed is coated with a polyimide resin by spin coating at a rotation speed of preferably 920 to 3500 rpm for 20 seconds, to form an organic insulating layer (a polymer resin layer) 412. The organic insulating layer 412 is then coated with a resist material (e.g., OFPR-800, Tokyo Ohka Kogyo Co. Ltd.) by spin coating at a rotation speed of preferably 500 to 3000 rpm, to form a resist layer 413 (FIG. 28B). In this example, the resist material was applied at a rotation speed of 3000 rpm for 30 seconds to form the resist layer 413 with a thickness of 1.2 μm. The resultant structure is prebaked at 100° C. for 30 minutes. Then, a photomask 414 with a predetermined pattern is placed on the resist layer 413 and exposed to light (FIG. 28C). The resist layer 413 is developed with a developer (NMD-3, 2.38%, Tokyo Ohyo Kagaku Co.), forming fine projections on the active matrix substrate 411 (FIG. 28D). The projections on the substrate 411 are heat-treated preferably at 120° to 250° C., to permit the projections to be rounded, forming smooth convex and concave portions (FIG. 28E). In this example, the heat treatment was performed at 180° C. for 30 minutes.

Figure 28F:
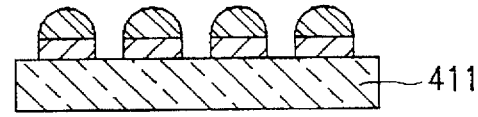
Figure 28G:
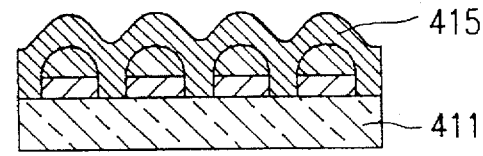
Figure 28H:
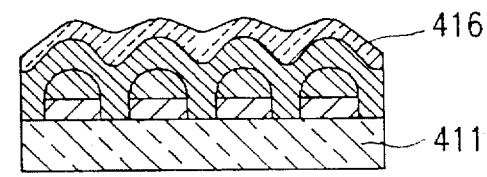

Thereafter, the resultant substrate is dry-etched to etch the organic insulating layer 412 into the shape shown in FIG. 28F, and then coated with a polyimide resin by spin coating at a rotation speed of preferably 920 to 3500 rpm for 20 seconds, to form an organic insulating layer (a polymer resin layer) 415 (FIG. 28G). In this example, the polyimide resin was applied at a rotation speed of 2200 rpm for 20 seconds to form the organic insulating layer 415 of a thickness of 1 μm, thus forming a surface with further smooth convex and concave portions. A metal thin layer 416 is then formed on the organic insulating layer 415 (FIG. 28H). The metal thin layer 416 may be made of Al, Ni, Cr, and Ag, and the thickness thereof is preferably 0.01 to 1.0 μm. In this example, the metal thin layer 416 was formed by depositing Al by vacuum deposition.

A reflective liquid crystal cell is then fabricated as in Example 6 using the thus-obtained active matrix substrate with the convex and concave portions formed thereon. The degree of polarization-contrast characteristic of the resultant reflective liquid crystal cell was measured. As a result, similar results to those shown in FIG. 25 were obtained.

EXAMPLE 8

Figure 29:
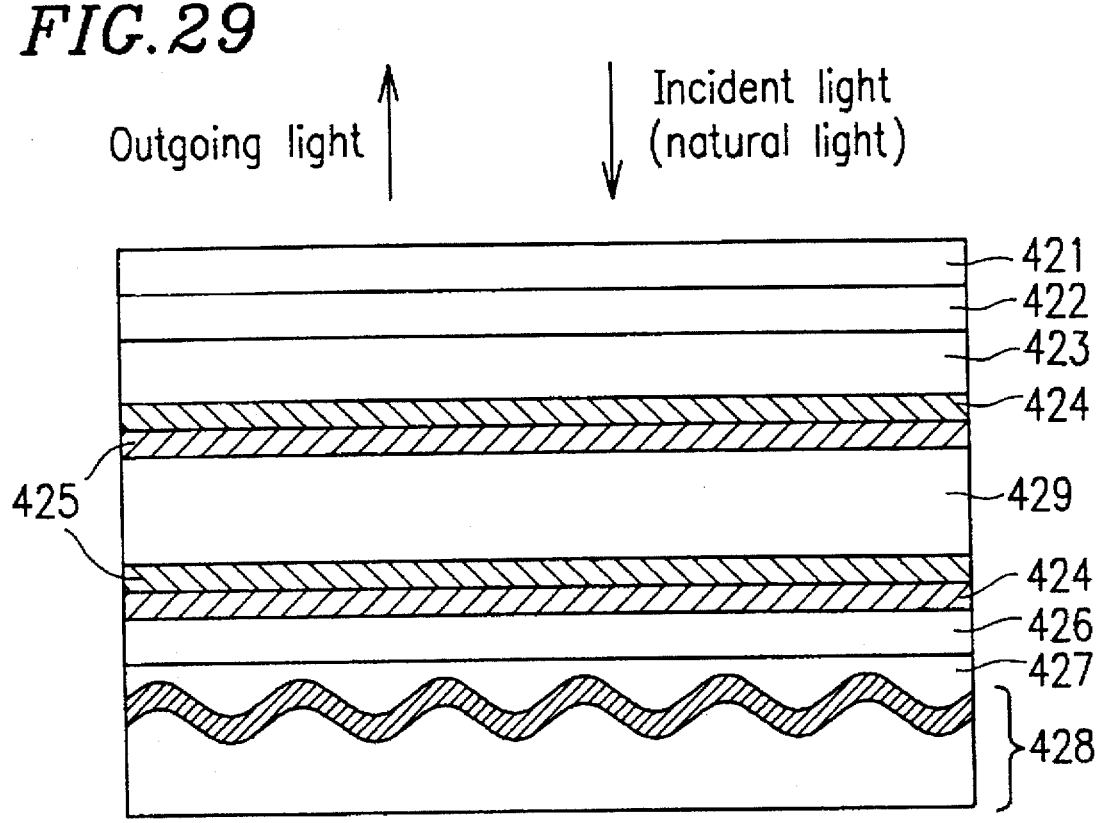
FIG. 29 is a sectional view of a reflective liquid crystal display device of Example 8 according to the present invention.

FIG. 29 shows a reflective liquid crystal display device of Example 8 according to the present invention. The reflective liquid crystal display device of this example is different from that of Example 5 shown in FIG. 23 in that a reflector 428 of this example is formed outside a pair of transparent substrates facing each other with a liquid crystal layer therebetween, unlike the reflector 275 in FIG. 23. The reflective liquid crystal display device of FIG. 29 includes a polarizing plate 421, a ¼ wave plate 422, glass substrates 423 and 426, transparent electrodes 424, alignment layers 425, a liquid crystal layer 429 and the reflector 428 attached to the glass substrate 426 through a transparent resin layer 427.

With this structure, parallax arises because the reflector is not in direct contact with the liquid crystal layer. However, when the contrast of the reflective liquid crystal display device of this example was measured by the method shown in FIG. 24, a degree of polarization-contrast characteristic similar to that in Example 5 was obtained.

EXAMPLE 9

Figure 30:
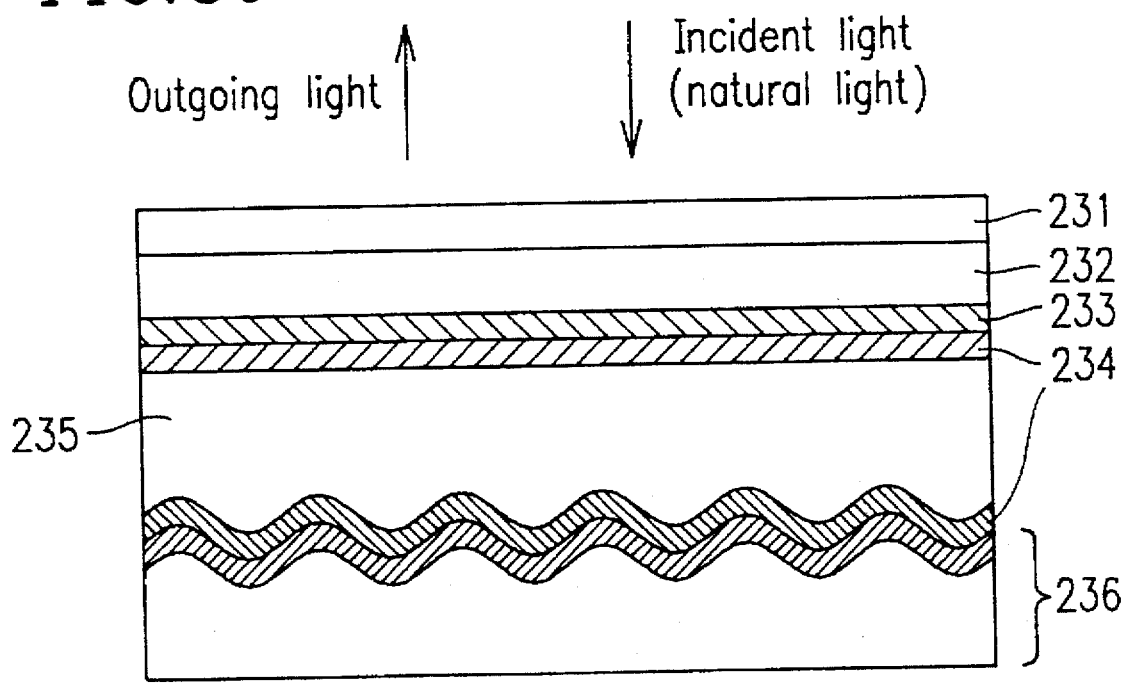
FIG. 30 is a sectional view of a reflective liquid crystal display device of Example 9 according to the present invention.

FIG. 30 is a sectional view of a reflective liquid crystal display device of Example 9 according to the present invention. The reflective liquid crystal display device of FIG. 30 includes a polarizing plate 231, a glass substrate 232, transparent electrodes 233, alignment layers 234, a liquid crystal layer 235 and a reflector 236.

The reflective liquid crystal display device of this example is different from that of Example 5 (the liquid crystal cell of FIG. 23 with the display mode using the measuring system shown in FIG. 24) in that the phase compensation plates 264 and 267 in FIG. 24 are not used in this example. Without a phase compensation plate, the twist angle of the liquid crystal layer, the angle of the polarizing plate, and the like are set so that circularly polarized light can be obtained only through the liquid crystal layer. The contrast of the thus-fabricated display device was measured. As a result, a degree of polarization-contrast characteristic similar to that in Example 5 was obtained. At the contrast measurement, a polarizing plate 231 shown in FIG. 30 was removed.

EXAMPLE 10

Figure 31:
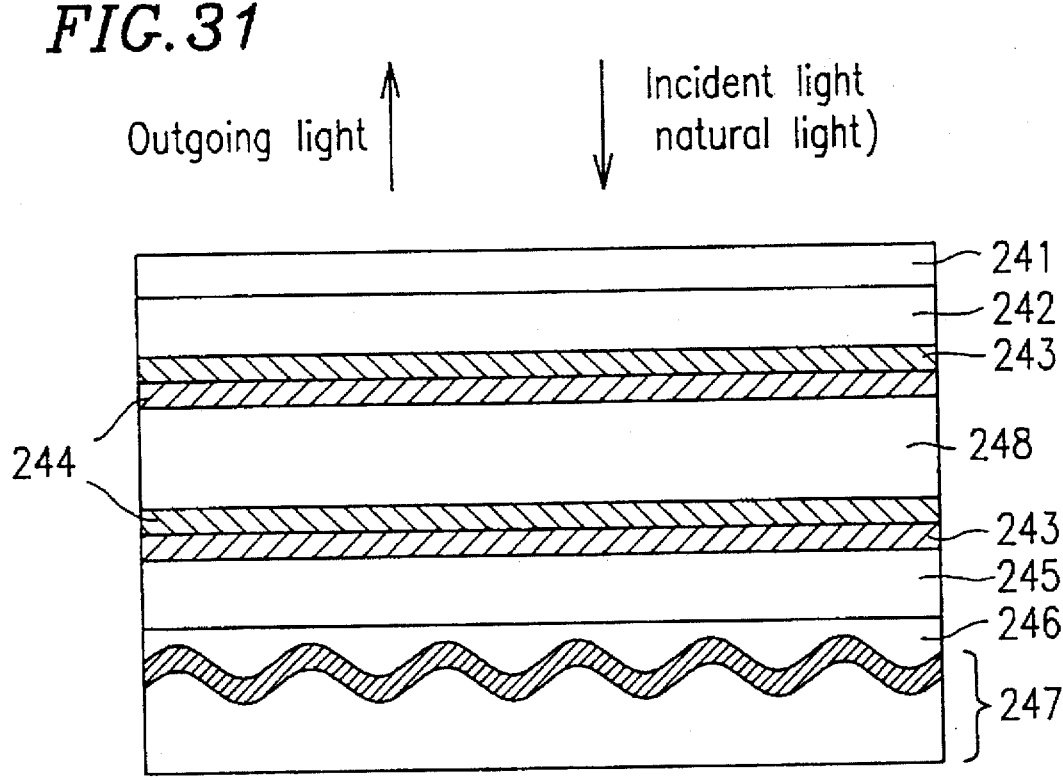
FIG. 31 is a sectional view of a reflective liquid crystal display device of Example 10 according to the present invention.

FIG. 31 is a sectional view of a liquid crystal display device of Example 10 according to the present invention. The reflective liquid crystal display device of FIG. 31 includes a polarizing plate 241, glass substrates 242 and 245, transparent electrodes 243, alignment layers 244, a liquid crystal layer 248 and the reflector 247 attached to the glass substrate 245 through a transparent resin layer 246.

The reflective liquid crystal display device of this example has a reflector formed outside a pair of substrates and is operated in the same display mode as that shown in Example 9. With this structure, parallax arises as in Example 8. However, when the contrast of the liquid crystal display device of this example was measured, a degree of polarization-contrast characteristic similar to that in Example 5 was obtained. At the contrast measurement, a polarizing plate 241 shown in FIG. 31 was removed.

EXAMPLE 11

In the above examples, the display mode using a single polarizing plate and a phase compensation plate where liquid crystal molecules are aligned in parallel was described. In Example 11, an STN (super twisted nematic) mode using a single polarizing plate and a phase compensation plate where a liquid crystal layer is twisted by about 240° will be described.

The reflector fabricated in Example 5 and a glass substrate with an ITO transparent electrode formed thereon are coated with a polyimide resin and baked at 200° C. for one hour, to form liquid crystal alignment layers. The alignment layers are then rubbed for alignment of liquid crystal molecules. The two substrates are attached together so that a liquid crystal layer to be interposed therebetween can be twisted by about 240°. A liquid crystal sealing layer is formed around a space between the two substrates by screen printing an adhesive sealant containing 6.5 μm-dia. spacers. After the formation of the liquid crystal sealing layer, a liquid crystal material is injected between the substrates under vacuum so as to form a liquid crystal layer having 240° twist orientation. In this example, ZLI2459 (trade name, produced by Merck & Co., Inc.) was used as the liquid crystal. The retardation of the liquid crystal layer is 650 nm, while the retardation of the phase compensation plate is 350 nm. The same polarizing plate as that used in Example 5 was used.

The transmission axis of the polarizing plate and the slower optic axis of the phase compensation plate are set so that an angle β formed by the transmission axis of the polarizing plate and the orientation direction of liquid crystal molecules present near the polarizing plate and an angle γ formed by the slower optic axis of the phase compensation plate and the orientation direction of liquid crystal molecules present near the phase .compensation plate can satisfy the relationship:

$$0.5\beta + 45°m + 7.5° \leq \gamma \leq 0.5\beta + 45°m + 27.5°$$

where m is an integer.

The contrast of the thus-fabricated display device was measured, and a degree of polarization-contrast characteristic similar to that in Example 5 was obtained. In the contrast measurement, the polarizing plate was removed.

In the above examples, the display modes using a single polarizing plate and a phase compensation plate where liquid crystal molecules are aligned in parallel or twisted were described. The reflective active matrix substrate and the method for fabricating the reflective liquid crystal display device according to the present invention can also be applied to other modes such as a birefringent display mode used for a ferroelectric liquid crystal display device with the same structure.

In the above examples, TFTs were used as the switching elements. The present invention can also be applied to an active matrix substrate using MIM (metal-insulator-metal) elements, diodes, varistors, and the like as the switching elements.

The reflectors were formed by patterning a photosensitive resin or by dry-etching in the above examples. Other methods such as sand-blasting and wet-etching can also be effectively employed.

The reflector for the reflective liquid crystal display device according to the present invention may be a dielectric mirror or an insulating thin layer for a notch-type filter using cholesteric liquid crystal. In the case of using a metal thin layer as in the above examples, the reflector can also serve as an electrode opposing the transparent electrode formed on the transparent counter substrate with the liquid crystal layer therebetween.

Thus, as described in Examples 5 to 11 above, the degree of polarization of the reflector of the reflective liquid crystal display device according to the present invention significantly improves. Incident linearly polarized light can be maintained as linearly polarized light after being reflected from the reflector. Similarly, incident overly polarized light can be maintained as overly polarized light of the same shape after being reflected from the reflector. As a result, reflective liquid crystal display device with excellent contrast can be realized.

EXAMPLE 12

In Example 12, a reflective liquid crystal display device with excellent contrast characteristic as well as paper-white property will be described.

In general, a reflective liquid crystal display device uses ambient light incident to a liquid crystal panel thereof. Accordingly, a reflector of the display device preferably has a high reflectance over a wide range of the reflection surface. Using a metal layer having a mirror surface, however, the reflectance is high only in the regular reflection direction. This causes such problems that the operator's face is reflected on the display screen and that the screen is very dark when viewed from directions other than the regular reflection direction.

A standard white board made of MgO powders is known to be a reflector excellent in the paper-white property. Such a standard white board is, however, so diffusive that it causes multiple reflection when combined with a liquid crystal layer. Light is confined within the liquid crystal layer, resulting in dark display screen and low contrast.

The ECB mode liquid crystal display devices of the above Examples 5–11 can achieve high contrast as described above. However, they may be inferior in the paper-white property, since the display characteristics of the ECB mode liquid crystal display devices are not optimized.
(Basic structure of ECB mode reflective liquid crystal display device)

Figure 32:
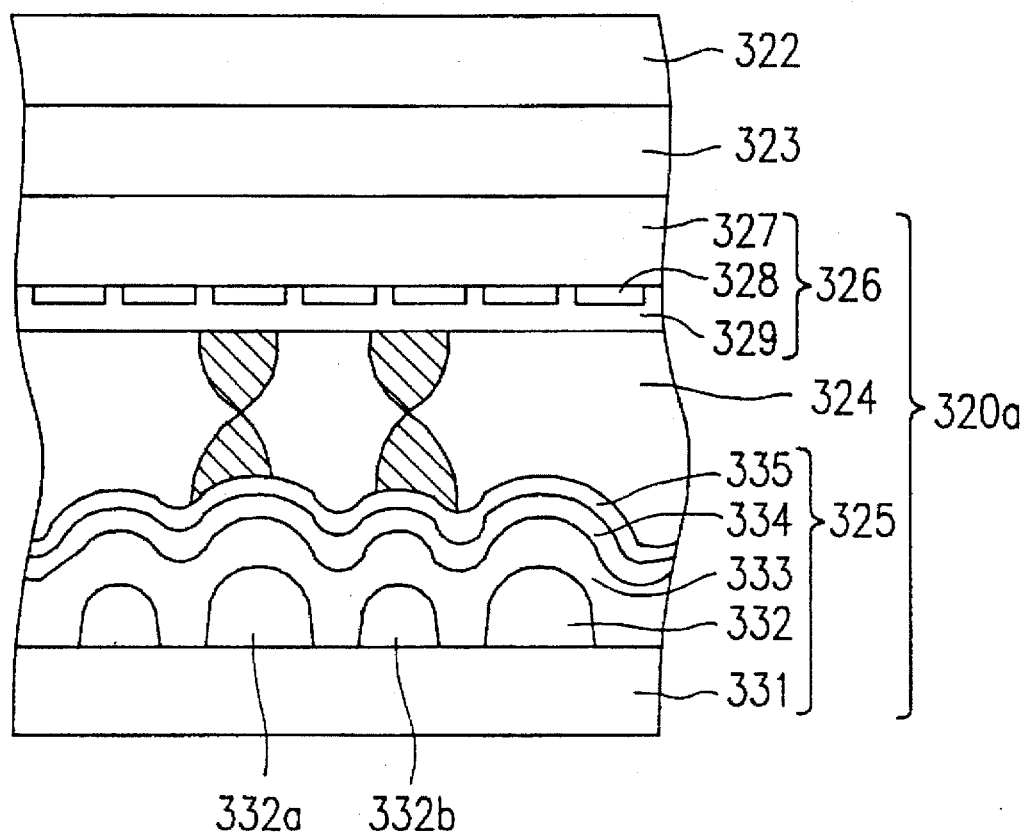
FIG. 32 is a sectional view of an ECB mode reflective liquid crystal display device of Example 12 according to the present invention.

FIG. 32 is a sectional view of an ECB mode reflective liquid crystal display device 320 of Example 12. In this example, an STN type liquid crystal display device driven by a simple matrix method will be described. The reflective liquid crystal display device 320 includes a polarizing plate 322, a phase compensation plate 323, and a liquid crystal cell 320a formed in this order from the light incident side. The liquid crystal cell 320a includes an upper substrate 326, a lower substrate (reflection substrate) 325, and a liquid crystal layer 324 interposed therebetween. The upper substrate 326 includes a transparent substrate 327 and a transparent electrode 328 and an alignment layer 329 formed in this order on the surface of the transparent substrate 327 facing the liquid crystal layer 324. The lower substrate 325 includes a transparent substrate 331 and a plurality of projections 332, a polymer resin layer 333 covering the projections 332, a reflection layer 334, and an alignment layer 335 formed in this order on the surface of the transparent substrate 331 facing the liquid crystal layer 324. The projections 332 include large projections 332a and small projections 332b which are different in height from each other.

In this example, the reflection layer 334 is made of Al which also serves as an electrode. The reflection layer 334 and the transparent electrode 328 are both in a striped shape. The stripes of the reflection layer 334 and the transparent electrode 328 are arranged to cross each other with the liquid crystal layer 324 therebetween, forming pixels in a matrix. A liquid crystal material for STN (e.g., ZLI4427 produced by Merck & Co., Inc.) is used for the liquid crystal layer 324.

The polarizing plate 322, the phase compensation plate 323, the liquid crystal layer 324, and the reflection layer 334 respectively have functions of the polarizing plate 202, the phase compensation plate 203, the liquid crystal layer 204, and the reflector 205 of FIGS. 18A and 18B. The phase compensation plate 323 may be omitted by using liquid crystal of which retardation varies in the range of $\lambda/4$ to 0 for the liquid crystal layer 324. The existence of the phase compensation plate 323, however, reduces the dispersion of reflected light depending on the wavelength, allowing for a display with high color purity. The phase compensation plate 323 has another advantage of compensating the viewing angle—dependence of display caused by the orientation of liquid crystal molecules of the liquid crystal layer 324, allowing for a display with a wide angle of visibility.

Metal materials other than Al can also be used for the reflection layer 334. When a non-conductive reflection layer is formed, a transparent electrode may be additionally formed on the top surface of the reflection layer. The liquid crystal layer is not limited to the STN type, but various types of liquid crystal of which retardation varies upon application of an electric field can be used.

The lower substrate 325 has basically the same structure as the reflector shown in FIG. 3, and can be fabricated in the process described with reference to FIGS. 5A to 5E. The diameters D1 and D2 of the bottoms of the large projections 332a and the small projections 332b, respectively, and the distance between the projections 332 are made different from one another. The diameters D1 and D2 are preferably in the range of about 3 µm to about 20 µm. If the diameters are smaller than about 3 µm, photolithographic processing is difficult. If they are larger than about 20 µm, the height of the projections becomes so high that it affects the cell thickness (thickness of the liquid crystal layer). The distance D3 is set so that the occupation percentage of the area of flat portions on the top surface of the transparent substrate 331 where no projections 332 are formed in the total area of the surface of the transparent substrate 331 (hereinafter, such a percentage is simply referred to as the occupation of flat portions), which is to be described later, is within an appropriate range. For example, an occupation of flat portions of about 70% can be obtained by setting the distance D3 at about one-third the diameter D1 or D2. The diameters of the projections become larger by about 10 to 20% in the heat treatment process. Thus, the lower limit of D3 should be smaller than a lower limit determined by photolithography. It is therefore about 1.5 µm.

The projections with two different heights can be formed by use of the photomask 22 having light shielding portions of two different sizes in a single photolithographic step as shown in FIG. 5B. Alternatively, they may be formed by use of two photomasks each having light shielding portions of one size different from that of the other photomask in two photolithographic steps. In this example, the reflection substrate (lower substrate) was fabricated by setting D1 at about 10 µm, D2 at about 8 µm, and D3 at about 2 µm.

Figure 34A:
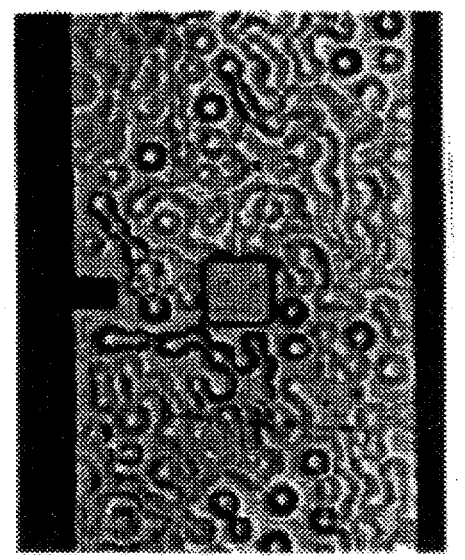
FIG. 34A is a picture of a reflection surface of a reflection substrate taken with an optical microscope.
Figure 35A:
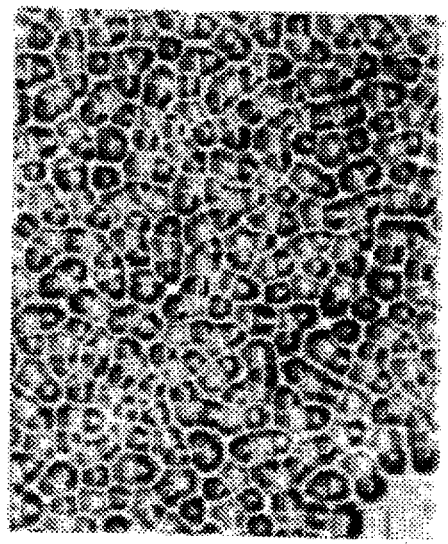
FIG. 35A is a picture of a reflection surface of another reflection substrate taken with an optical microscope.

FIG. 34A shows a microscopic picture of the surface of a reflection substrate 360 fabricated in the process shown in FIGS. 5A to 5E. FIG. 35A shows a microscopic picture of the surface of a reflection substrate 370 fabricated using two photomasks having about 10 µm-dia. circular light shielding portions and about 5 µm-dia. circular light shielding portions in two photolithographic steps.

Then, using the thus-fabricated lower substrate 325 and the upper substrate 326 fabricated in a known process, the reflective liquid crystal display device of this example is fabricated as described in Example 5.

Since the reflective liquid crystal display device of this example has the reflection layer 334, the surface configuration of which is controlled as described later in detail, excellent paper-white property and contrast can be exhibited.

Now, the reflection substrate (lower substrate) of this example will be described in detail.

(Area of flat portions of reflection substrate)

Various types of reflection substrates with different surface configurations were fabricated in the above-described process. Reflective liquid crystal display devices were fabricated using the thus-obtained reflection substrates and evaluated for the contrast and the paper-white property.

The aforementioned occupation of flat portions on the surface of the reflection substrate was used as an indicator of the surface configuration of the reflection substrate. As described earlier, a reflector having a mirror surface is high in contrast in the regular reflection direction but inferior in the paper-white property. On the contrary, a standard white board is superior in the paper-white property but dark and low in contrast. The inventors presumed that the above difference in the reflection characteristics between the mirror reflector and the standard white board might be caused by the difference in the surface configuration therebetween, and that the difference in the surface configuration could be represented by the occupation of flat portions on the surface of the reflection substrate in the total surface area. The occupation of flat portions is 100% for the mirror reflector and 0% for the standard white board.

Figure 33A:
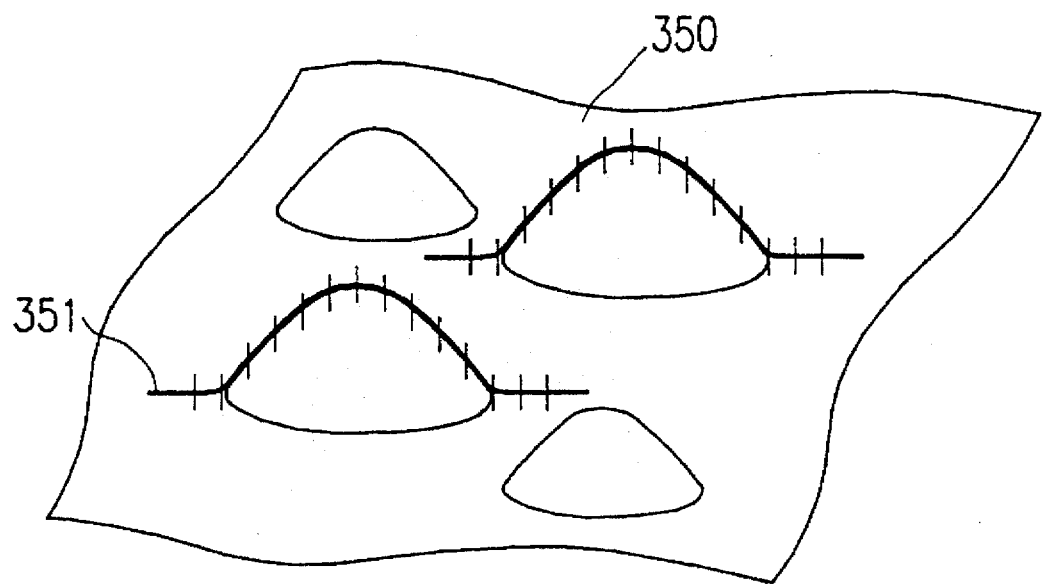
FIGS. 33A and 33B show a method for calculating the occupation of flat portions of a reflection substrate, where FIG. 33A schematically shows the surface configuration of the reflection substrate
Figure 33B:
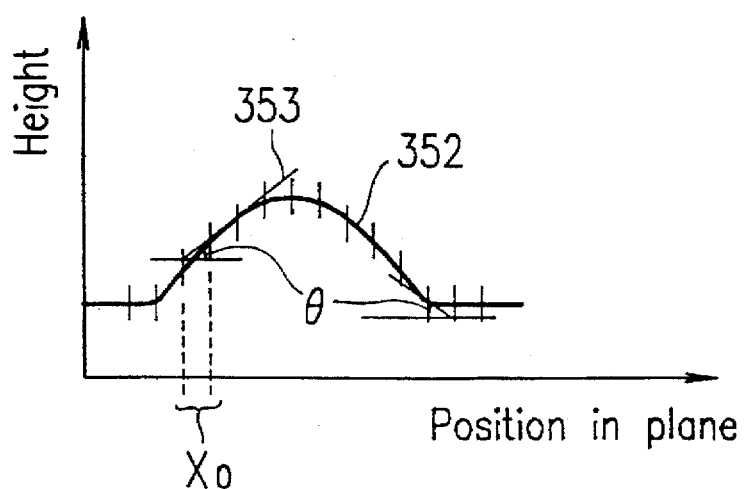

Referring to FIGS. 33A and 33B, the method for measuring the occupation of flat portions on the reflection substrate will be described. FIG. 33A schematically shows the surface configuration of a reflection substrate 350. FIG. 33B shows a tilt angle θ obtained from a surface profile. The following observation and measurement are conducted in the state where the reflection layer made of Al is exposed on the top surface of the reflection substrate.

The surface of the reflection substrate 350 is observed with an interference microscope. The surface is scanned so that the center of the viewing field of the microscope runs along scanning lines 351 shown in FIG. 33A passing through the apexes of projections on the surface. In this way, a surface profile 352 shown in FIG. 33B is obtained. The x-axis and y-axis of FIG. 33B represent the position in the plane of the substrate and the height of the surface having projections, respectively. A tangent line 353 is then drawn for the curved surface profile 352, and an angle formed by the tangent line 353 and the plane of the substrate (plane defined by the two-dimensional expanse of the reflection substrate) is defined as the tilt angle θ. The tangent line is drawn for the surface profile every predetermined distance $X_0$ in the plane of the substrate, measuring the tilt angle θ for each tangent line. Points where the tilt angle θ is less than 2° are defined as the flat portions. Typically, the tilt angle θ is measured every about 0.1 μm ($X_0$=about 0.1 μm), i.e., at about 100 points for one projection. This measurement of the tilt angle θ may be conducted for the surface profiles covering one entire pixel or only a portion thereof having a typical profile by appropriately selecting. Since the above-described fabrication process of the reflection substrate allows for the formation of projections with good reproducibility, it is not necessary to measure an entire pixel, but only a sampled portion of a pixel having a typical surface profile may be measured. From the results obtained by the above measurement of the tilt angle θ, the occupation of flat portions is calculated by dividing the number of measurement points where the tilt angle θ is less than 2° by the total number of measurement points.

Figure 34B:
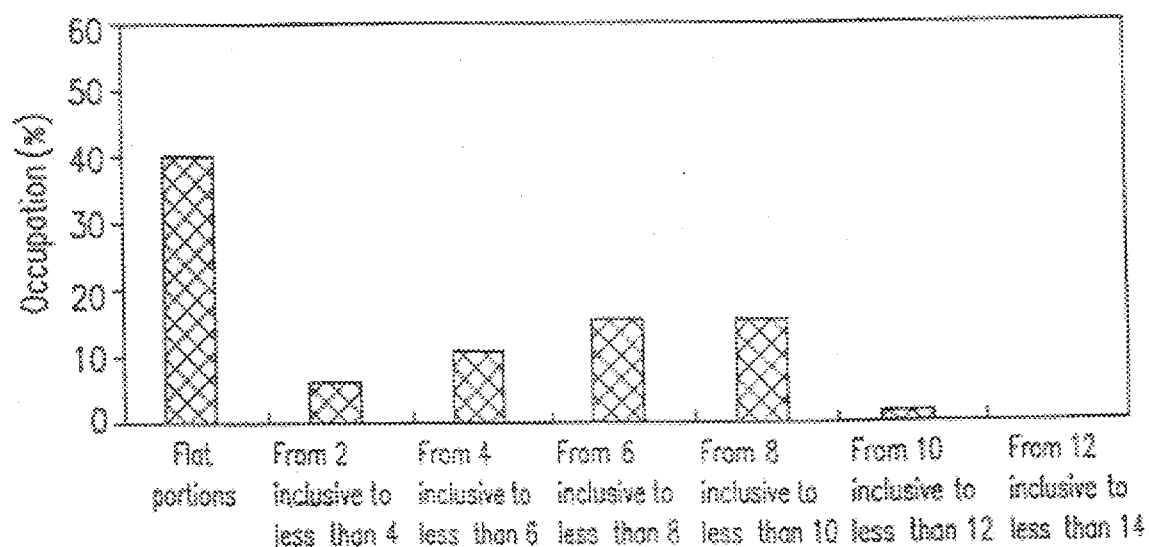
FIG. 34B is a histogram showing the measurement results of surface profiles of the reflection substrate.
Figure 35B:
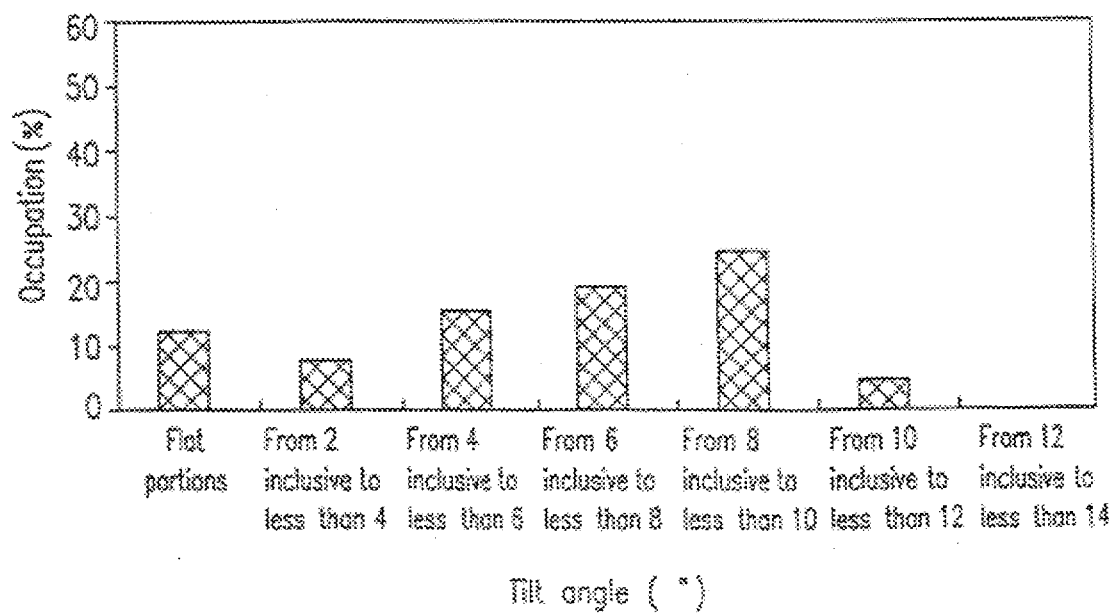
FIG. 35B is a histogram showing the measurement results of surface profiles of the reflection substrate.

FIGS. 34A and 35A are pictures of the reflection surfaces of the reflection substrates 360 and 370 described above, respectively, taken with an optical microscope. FIGS. 34B and 35B are histograms showing the results of the evaluation of the surface profiles of the respective reflection substrates 360 and 370. The occupation of flat portions (gray portions in FIG. 34A) for the reflection substrate 360 was about 40%, while the occupation of flat portions (white portions in FIG. 35A) for the reflection substrate 370 was about 12%. Each of these microscopic pictures corresponds to a portion of a pixel having a size of 166 μm×256 μm.

The reflective liquid crystal display device 320 was fabricated using each of various reflection substrates obtained as described above, and the paper-white property and the contrast were evaluated, of which results are shown in Table 3 below and FIG. 36, respectively. The paper-white property was evaluated by visual observation in a room where a plurality of fluorescent lamps were lit on. The contrast was measured with a power meter when light was incident vertically.

TABLE 3

| Occupation of flat portions (%) | 20 | 40 | 50 | 60 | 80 |
|---|---|---|---|---|---|
| Paper-white property | ⊙ | o | o | Δ | x |

⊙ white (paper-white)
o appears white (paper-white)
Δ whitish (paper-white)
x metallic (mirror-like), reflecting the operator's face As is apparent from Table 3, the paper-white property lowers as the occupation of flat portions increases. When the occupation of flat portions is 80% or more, the operator's face is reflected on the display screen, and the screen appears dark as a whole. The occupation of flat portions should therefore be less than 80%, preferably less than 60%.

Figure 36:
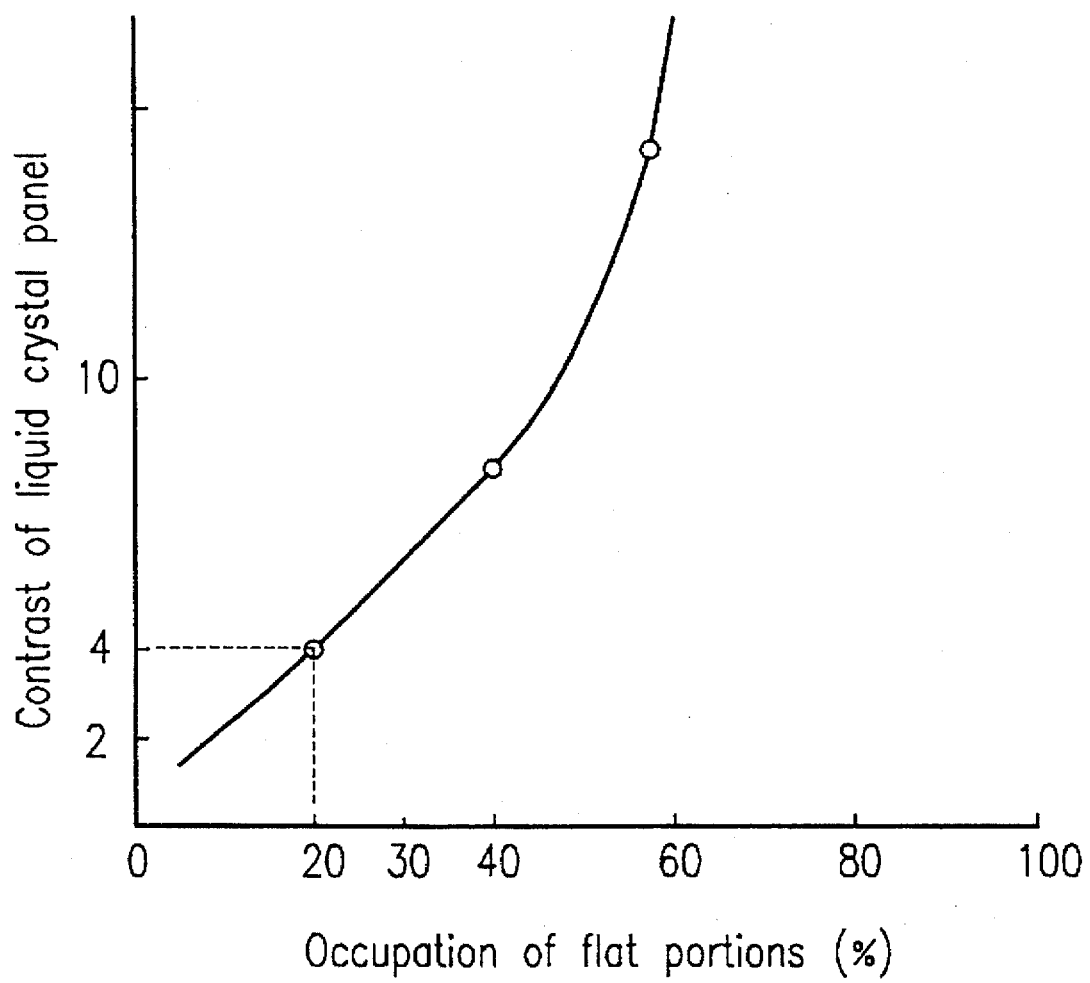
FIG. 36 is a graph showing the relationship between the occupation of flat portions and the contrast of a reflective liquid crystal display device.

On the contrary, as is apparent from FIG. 36, the contrast tends to increase as the occupation of flat portions increases. In general, a reflective liquid crystal display device can effect a display when the contrast is 2 or more. It can be practically used when the contrast is 3 or more. As is seen from FIG. 36, contrast 4 is obtained when the reflection substrate with an occupation of flat portions of 20% which is proved to be excellent in the paper-white property is used. As a result, it is concluded that a reflective liquid crystal display device using a reflection substrate with an occupation of flat portions in the range of 20 to 60% is not only excellent in the paper-white property but also provides high quality display with a contrast of 4 or more.

(Relationship between height of projections and retardation)

An ECB mode color display device using interference colors has a problem that the reflectance and the color reproducibility (color purity) decrease due to a variation of the retardation of a liquid crystal layer. To overcome this trouble, the inventors have examined conditions for attaining a display with high contrast and color purity by using a reflection substrate with projections as follows.

Figure 37A:
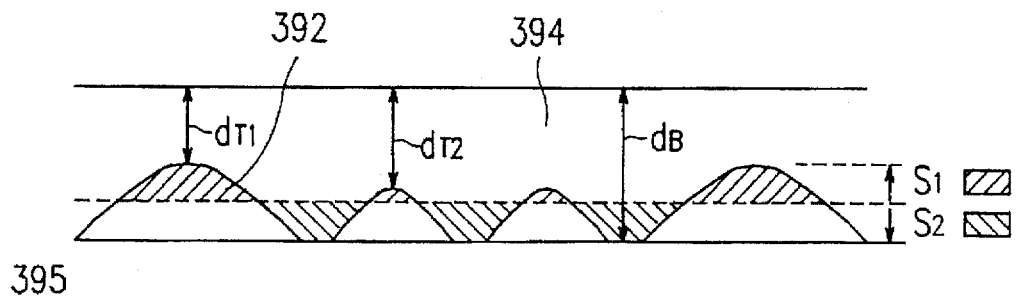
FIGS. 37A to 37C schematically show various reflective liquid crystal display devices.
Figure 37B:
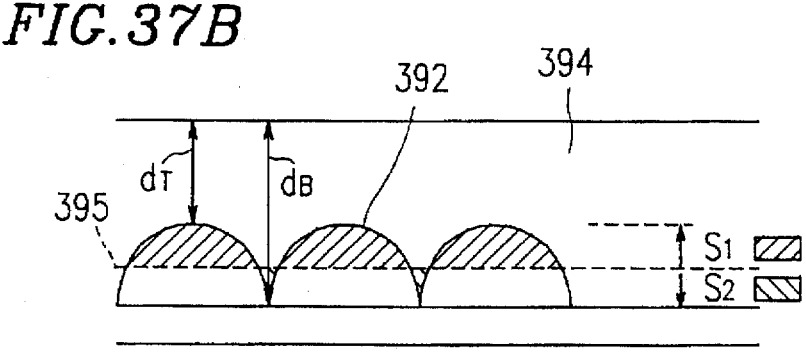
Figure 37C:
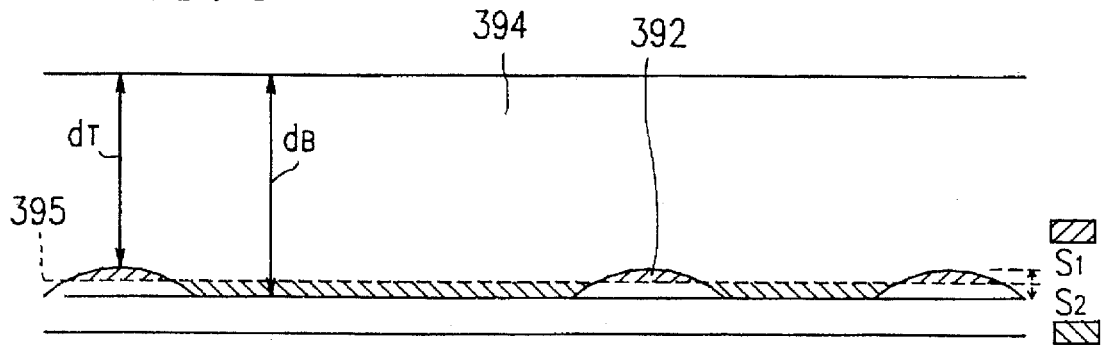
Figure 38:
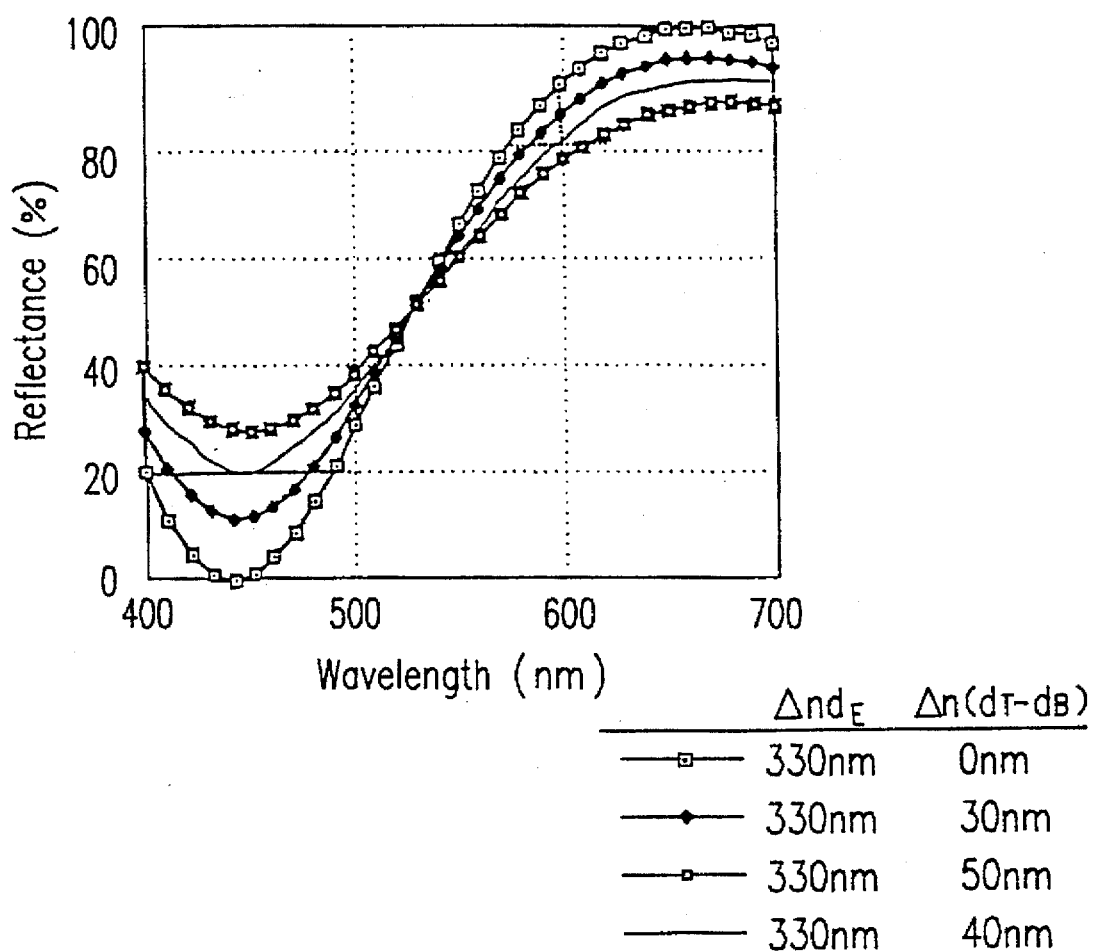
FIG. 38 is a graph showing the relationship between the effective retardation of a liquid crystal layer and the reflectance.
Figure 39:
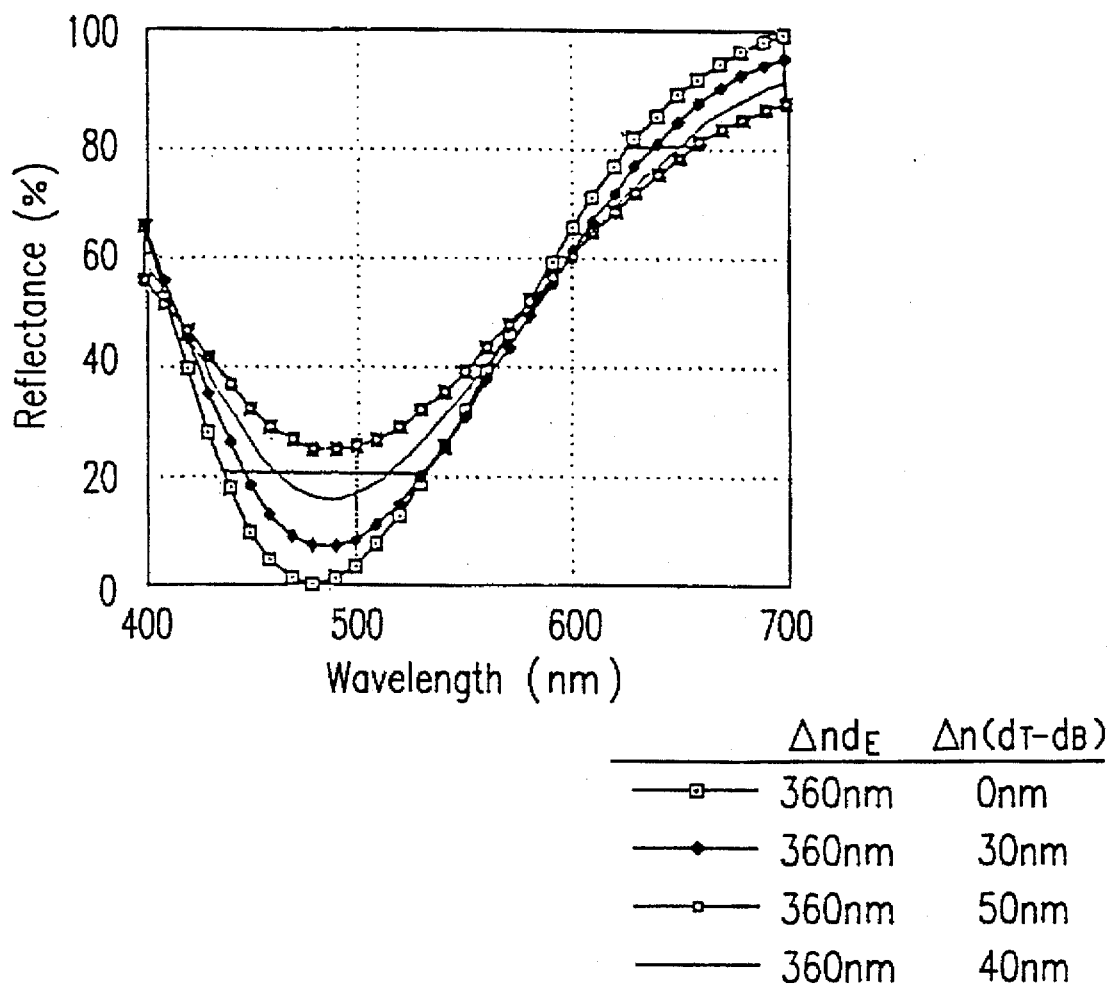
FIG. 39 is a graph showing the relationship between the effective retardation of a liquid crystal layer and the reflectance.
Figure 40:
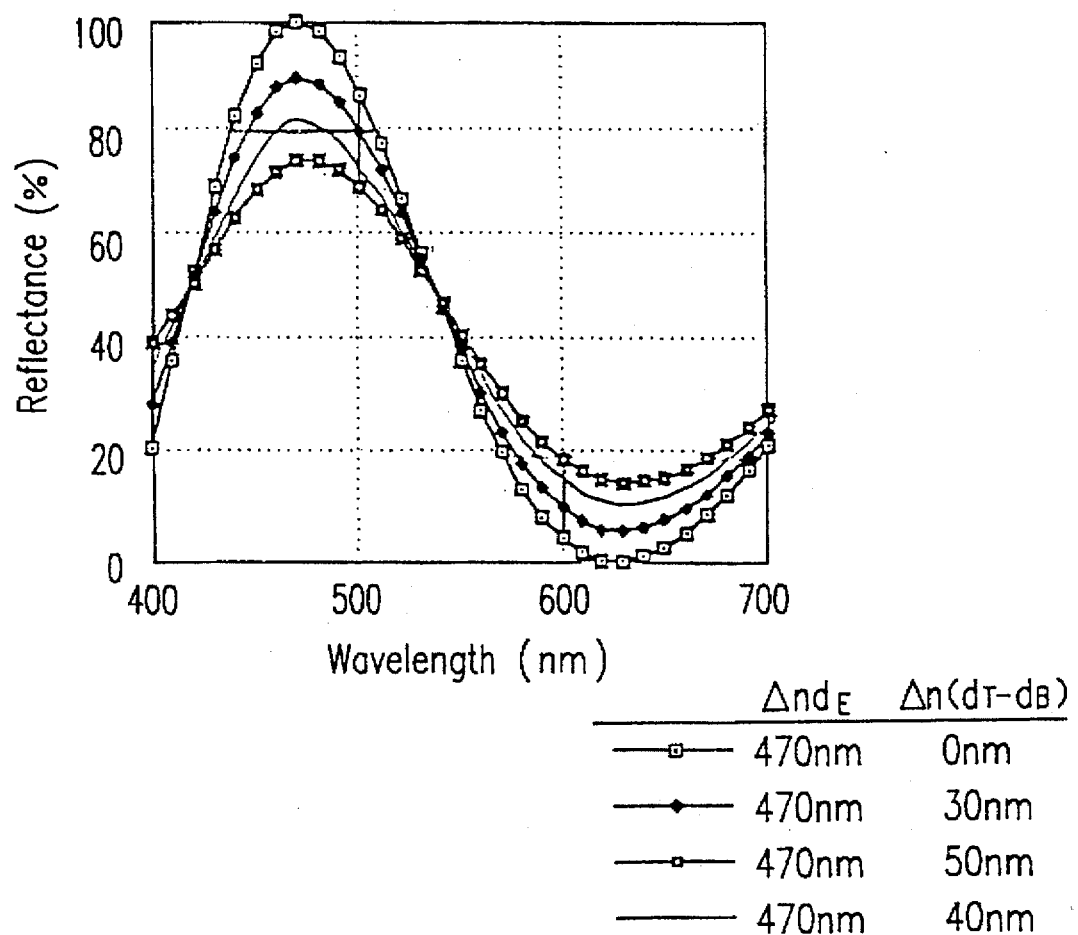
FIG. 40 is a graph showing the relationship between the effective retardation of a liquid crystal layer and the reflectance.
Figure 41:
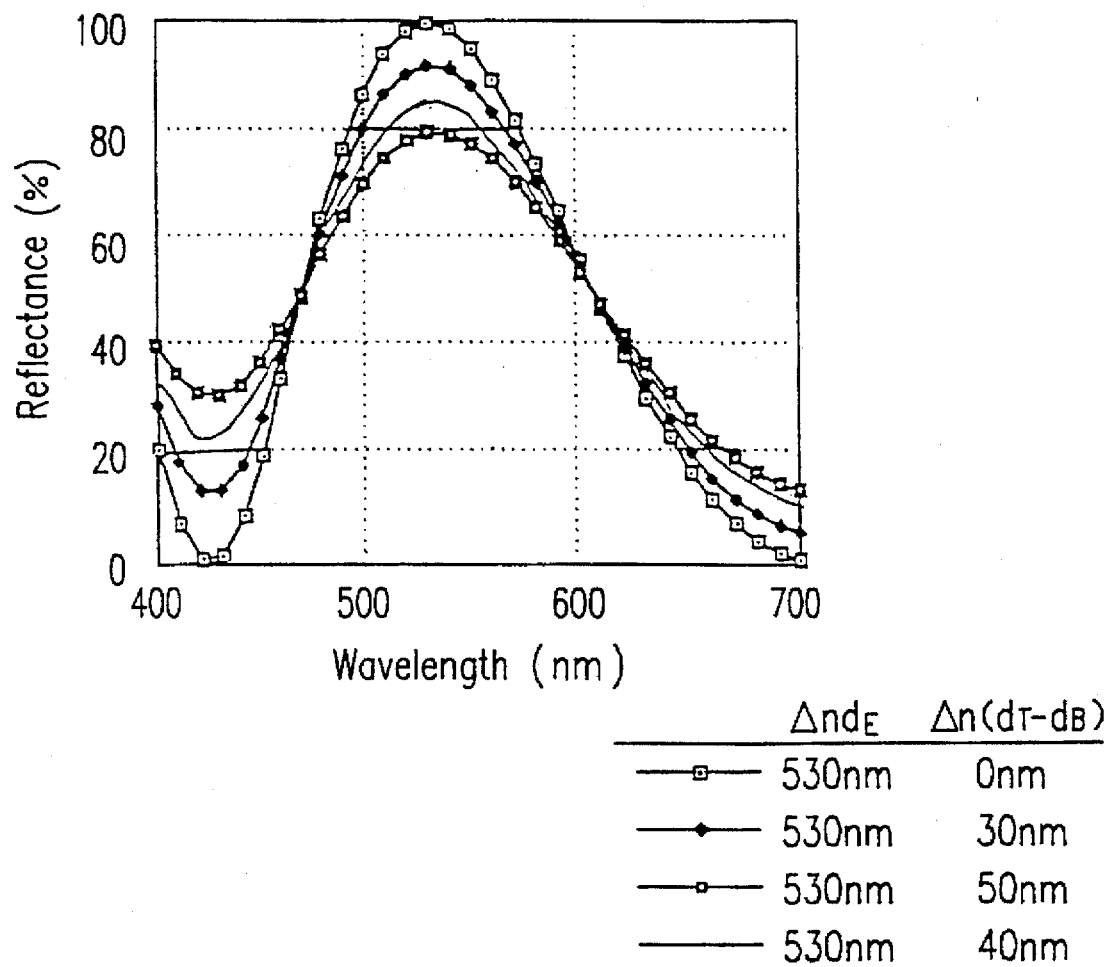
FIG. 41 is a graph showing the relationship between the effective retardation of a liquid crystal layer and the reflectance.

FIGS. 37A, 37B, and 37C schematically show reflective liquid crystal display devices, where only a surface profile 392 of a reflection substrate and a liquid crystal layer 394 are shown. The surface profile 392 can be measured with an interference microscope as described above. Since the surface profile 392 of each reflection substrate has projections, the thickness of the liquid crystal layer 394 is not uniform, having a minimum value $d_T$ (corresponding to the apexes of the projections of the reflection substrate) and a maximum value $d_B$ (corresponding to the flat portions of the reflection substrate). When the surface profile 392 has two kinds of projections with different heights, forming two minimum thicknesses $d_{T1}$ and $d_{T2}$ as shown in FIG. 37A, the minimum of these values is determined as the minimum value $d_T$. The effective retardation of the liquid crystal layer 394 with such a non-uniform thickness and the reflectance of a reflective liquid crystal display device using such a reflection substrate are measured in the following manner.

An auxiliary line 395 is drawn along the middle of the projections (where the thickness of the liquid crystal layer 394 is $(d_T+d_B)/2$ where $d_T$ and $d_B$ are the minimum value and the maximum value of the thickness of the liquid crystal layer 394, respectively). The area of the portions of the projections located above the auxiliary line 395 is denoted by S1, while the area of the liquid crystal layer 394 located below the auxiliary line 395 is denoted by S2. The reflectance R of the reflective liquid crystal display device is then represented by equation (18) below:

$$R = \{S_1/(S_1+S_2)\}*A^2\{(\cos\pi(\Delta n d_T/\lambda))^2 - (\sin\pi(\Delta n d_T/\lambda))^2\}^2$$
$$+ \{S_2/(S_1+S_2)\}*A^2\{(\cos\pi(\Delta n d_B/\lambda))^2 - (\sin\pi(\Delta n d_B/\lambda))^2\}^2 \quad (18)$$

where A denotes an amplitude of light, $\lambda$ is a wavelength of light, and $\Delta n$ is the birefringence of liquid crystal molecules.

The effective retardation $\Delta n d_E$ of the liquid crystal layer is represented by equation below:

$$\Delta n d_E = \{S_1/(S_1+S_2)\}\Delta n d_T + \{S_2/(S_1+S_2)\}\Delta n d_B \quad (19)$$

The retardation variation $\Delta n(d_T-d_B)$ caused by the height difference between the top and bottom the projections is represented by equation (20) below (corresponding to the difference between the two terms of the right side of equation (19)):

$$\Delta n(d_T-d_B) = \{S_1/(S_1+S_2)\}\Delta n d_T - \{S_2/(S_1+S_2)\}\Delta n d_B \quad (20)$$

where the value of $(d_T-d_B)$ is an absolute value regardless whether it is positive or negative, unless otherwise specified.

The above methods for measuring the reflectance and the retardation can be applied not only to the reflection substrate shown in FIG. 37A, but also to the reflection substrates shown in FIG. 37B and 37C where the projections are formed more densely and thinly, respectively. The shape of the surface profile of the reflection substrate is not limited to those shown in FIGS. 37A to 37C, but the reflection and retardation can also be measured for reflection substrates having other shapes of surface profiles such as a rectangular shape as shown in FIG. 4C.

Various reflection substrates with different heights of projections were fabricated in the process shown in FIGS. 4A to 4F, and an ECB mode reflective liquid crystal display device with the structure shown in FIG. 32 was fabricated using each of the reflection substrates. The relationships between the effective retardation $\Delta n d_E$ calculated from equation (19) and the reflectance for the resultant ECB mode reflective liquid crystal display devices are shown in FIGS. 38 to 41. The x-axis and the y-axis of the graphs of FIGS. 38 to 41 represent the wavelength of reflected light from the reflective liquid crystal display device and the reflectance of the reflective liquid crystal display device, respectively. FIGS. 38 to 41 show the results obtained when the effective retardation $\Delta n d_E$ of the liquid crystal layer represented by equation (19) are 330 nm, 360 nm, 470 nm, and 530 nm, respectively. Each graph includes the results when the variations in the retardation $\Delta n(d_T-d_B)$ caused by the height difference between the top and bottom of the projections are 0 nm (corresponding to the case of a mirror reflector), 30 nm, 40 nm, and 50 nm. As is apparent from these graphs, the occurrence of wave-length-dependence of the reflectance (interference colors) due to the retardation variation of the liquid crystal layer can be utilized to achieve an ECB mode color display device.

As is apparent from these graphs, in the all cases where the effective retardation $\Delta n d_E$ of the liquid crystal layer are 330 nm, 360 nm, 470 nm, and 530 nm, when the retardation variation $\Delta n(d_T-d_B)$ caused by the height difference between the top and bottom of the projections increases, the maximum transmittance (crest) lowers while the minimum transmittance (bottom) rises. This indicates that as the height difference increases, the contrast reduces. Further, as the height difference increases, the sharpness of the wavelength-dependence of the reflectance lowers, decreasing the color purity of reflected light.

Figure 42:
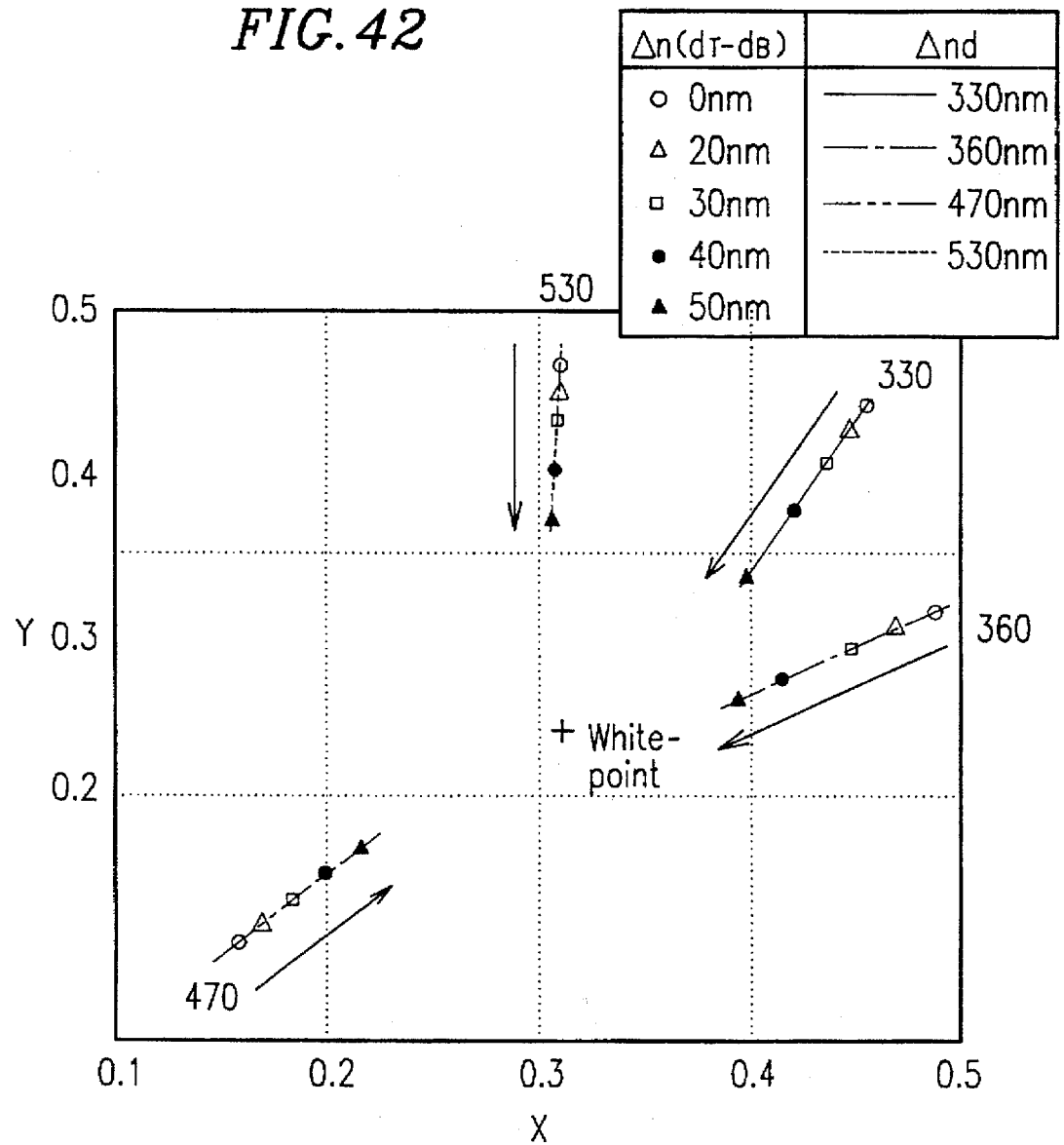
FIG. 42 is a chromaticity diagram showing the wavelength-dependence of reflected light from reflection substrates with different heights.

The relationships between the retardation variation $\Delta n(d_T-d_B)$ caused by the height difference and the wavelength-dependence of reflected light for the cases shown in FIGS. 38 to 41 are combined in FIG. 42. In this case, retardation variations $\Delta n(d_T-d_B)$ of 10 nm and 20 nm are additionally shown. FIG. 42 is a chromaticity diagram showing the wavelength-dependence of reflected light depending on the retardation variation $\Delta n(d_T-d_B)$ caused by the height difference between the top and bottom of the projections in the cases where the effective retardation of the liquid crystal layer are 330 nm, 360 nm, 470 nm, and 530 nm. It is observed from FIG. 42 that in the all wavelength bands (330 nm, 360 nm, 470 nm, and 530 nm) as the height difference increases, the chromaticity of reflected light is closer to a white-point (where no wavelength dependence occurs) located at the center of the chromaticity diagram. This indicates that as the height difference increases, the color purity decreases, lowering the color reproducibility in color display using interference colors.

Figure 43:
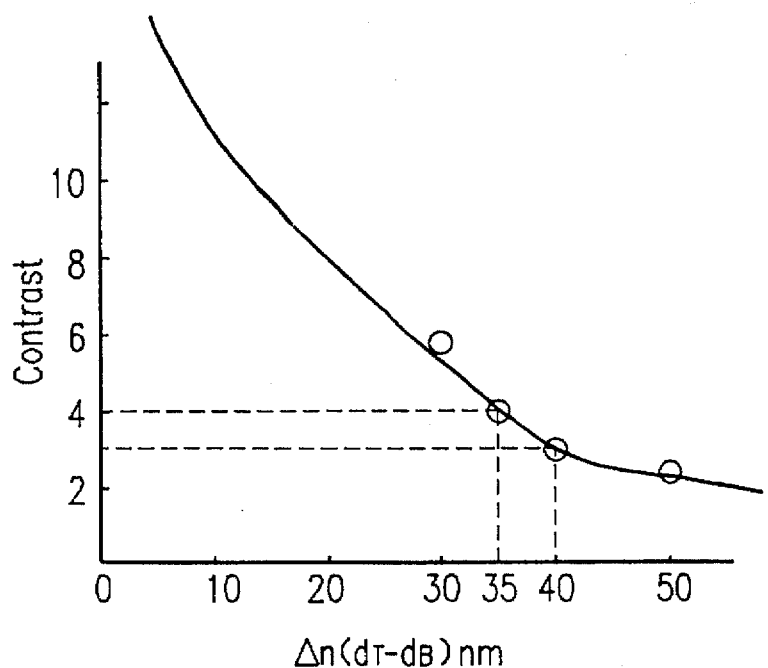
FIG. 43 is a graph showing the relationship between the height difference of the reflection substrate and the contrast.

FIG. 43 shows the relationship between the retardation variation $\Delta n(d_T-d_B)$ caused by the height difference between the top and bottom of the projections and the contrast. As is apparent from FIG. 43, the contrast lowers as the height difference increases. It is observed from FIG. 43 that the retardation variation $\Delta n(d_T-d_B)$ caused by the height difference is required to be 40 nm or less to obtain contrast 3 which is the minimum for practical use, and that contrast 4 or more can be obtained when the retardation variation $\Delta n(d_T-d_B)$ is 35 nm or less. As for the color purity, when the retardation variation $\Delta n(d_T-d_B)$ is 40 nm or less, a color purity durable for practical use can be obtained. When it is 35 nm or less, display with higher color purity can be obtained.

(Relationship between height of projections and threshold characteristic)

In the ECB mode liquid crystal display device of this example, as the twist angle of the liquid crystal layer increases, the threshold of the voltage-reflectance characteristic becomes sharp. In a liquid crystal display device with a sharp threshold characteristic, the variation in the thickness of the liquid crystal layer causes a variation in the threshold voltage, lowering the display quality.

Figure 44:
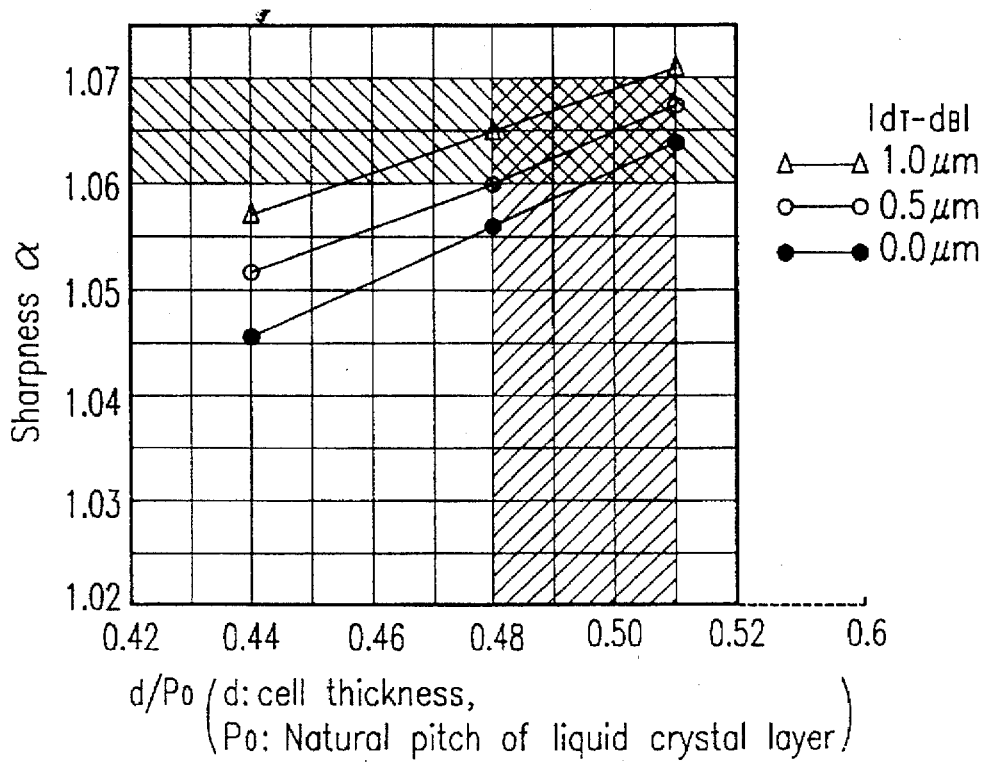
FIG. 44 shows the relationship between the ratio ($d/P_0$) of the cell gap d to the natural pitch $P_0$ of liquid crystal material and the sharpness $\alpha$ of the threshold characteristic.

In order to avoid this problem, the inventors have examined conditions for applying the present invention to an STN type liquid crystal display device including a largely-twisted liquid crystal layer. STN type 240°-twisted liquid crystal display devices using reflection substrates with a height difference $|d_T-d_B|$ of 0 μm, 0.5 μm, and 1 μm were fabricated. FIG. 44 shows the evaluation results of the relationship between the ratio of a cell gap d (thickness of the liquid crystal layer) to a natural pitch $P_0$ of the liquid crystal material $(d/P_0)$ and the sharpness $\alpha$ of the threshold characteristic. The sharpness α is defined as the ratio of a voltage value $V_{90}$ for obtaining a relative reflectance of 90% to a voltage value $V_{10}$ for obtaining a relative reflectance of 10% ($V_{90}/V_{10}$).

In the case where the reflective liquid crystal display device is applied to a portable information terminal, the device is required to be driven by the simple matrix method at a duty ratio of 1/240. Therefore, the sharpness α of the threshold characteristic is preferably lower than the boundary region shown by leftward slanting lines (the range of about 1.06 to about 1.07). At the same time, in order to obtain stable orientation of liquid crystal molecules, the ratio $d/P_0$ is preferably lower than the boundary region shown by rightward slanting lines (the range of about 0.48 to about 0.51). This is because when the ratio $d/P_0$ exceeds about 0.6, the 240°-twisted orientation of liquid crystal molecules becomes unstable, allowing stripe domains to be easily generated and thereby lowering the display quality. When the ratio $d/P_0$ is smaller than about 0.42, 60°-twisted orientation tends to be easily formed. For these reasons, in consideration of stable orientation of liquid crystal molecules, the ratio $d/P_0$ is preferably in the range of about 0.48 to about 0.51 though the cell thickness may be slightly varied.

As is apparent from FIG. 44, when the height difference $|d_T - d_B|$ increases, the sharpness lowers (moves upward in FIG. 44). Accordingly, in order to achieve both improved sharpness of the threshold characteristic and stable orientation of liquid crystal molecules, the height difference between the top and bottom of the projections is preferably about 1 µm or less, more preferably about 0.5 µm or less. Incidentally, the problems of generation of stripe domains and 60°-twisted orientation of liquid crystal molecules were not observed for any of the STN type liquid crystal display devices with the height differences of 1.0 µm, 0.5 µm, and 0.0 µm shown in FIG. 44.

The deterioration of display quality due to the threshold characteristic becomes significant in STN type liquid crystal display devices with a large twist angle. It is not especially significant in parallel alignment mode liquid crystal display devices.

Thus, according to Example 12 of the present invention, a reflective liquid crystal display device with an excellent paper-white property and a high contrast can be provided. A reflective liquid crystal display device with a high color purity and a sharp threshold characteristic can also be provided. These reflective liquid crystal display devices can be applied to various electronic apparatuses including portable information terminals.

The reflective liquid crystal display devices using single polarizing plate according to Examples 5–12 of the present invention can be combined with the color display device according to Examples 1–4 of the present invention to obtain a reflective color liquid crystal device.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A reflective liquid crystal display device including a first substrate and a second substrate, a liquid crystal layer interposed between the first and second substrates, a polarizing plate, and a reflection layer;

wherein the polarizing plate and the reflection layer are located on opposite sides of the liquid crystal layer, and further wherein a surface of the reflection layer reflecting light has projections, and flat portions, the flat portions being areas where a tilt angle of a tangent line drawn against a profile of the surface with the projections is less than 2°, in the flat portions occupying in a 20% to 60% of the total surface area of the surface.

2. A reflective liquid crystal display device according to claim 1, wherein the liquid crystal layer is driven in an ECB mode.

3. A reflective liquid crystal display device according to claim 1, wherein a retardation variation of the liquid crystal layer due to the projections is 40 nm or less.

4. A reflective liquid crystal display device according to claim 1, wherein the difference in the thickness of the liquid crystal layer due to the projections is 1 µm or less.

5. A reflective liquid crystal display device according to claim 1, wherein the light reflection layer is selected so that a degree of polarization V of light reflected from the light reflection layer, represented by:

$$V = \frac{\sqrt{S_1^2 + S_2^2 + S_3^2}}{S_0}$$

where $S_0$, $S_1$, $S_2$, and $S_3$ are Stokes parameters referring respectively to a total light intensity, an excess in intensity of horizontal linearly polarized light, an excess in intensity of 45° linearly polarized light, and an excess in intensity of right-handed circularly polarized light, is at least 50% or more.

6. A reflective liquid crystal display device according to claim 1, further including electrodes attached to the first and second substrates for applying an electric field to the liquid crystal layer to control a retardation of the liquid crystal layer, wherein the first substrate positioned between the polarizer and the liquid crystal layer comprises an optical phase compensation means which includes a first region having a first retardation and a second region having a second retardation different from the first retardation, whereby a color of emitted light from each of the first and the second regions is selected to be a specific one, in accordance with the retardations of the optical phase compensation means and the retardation of the liquid crystal layer.

7. A reflective liquid crystal display device according to claim 6, wherein each of a plurality of pixels, which is a smallest area of the device for conducting a color display, includes a portion of one of the first and the second regions.

8. A reflective liquid crystal display device according to claim 6, wherein each of a plurality of pixels, which is a smallest area of the device for conducting a color display, includes each portion of the first and the second regions.

9. A reflective liquid crystal display device according to claim 8, wherein the optical phase compensation means further comprises a third region having a third retardation, and each of the plurality of pixels includes a portion of at least one of the first, the second and the third regions.

10. A reflective liquid crystal display device according to claim 6, wherein the optical phase compensation means includes at least two optical phase compensation members, at least one of the optical phase compensation members overlapping another of the optical compensation members so as to form the first and the second regions.

11. A reflective liquid crystal display device according to claim 6, wherein the retardation of the liquid crystal layer is equal to or less than 1.0 µm.

12. A reflective liquid crystal display device according to claim 6, wherein the reflecting means functions as one of the electrodes for applying an electric field to the liquid crystal layer.

13. A reflector for reflecting light, wherein a surface of the reflector reflecting light has projections and flat portions, the flat portions being areas of the surface where a tilt angle of a tangent line drawn against a profile of the surface with the projections is less than 2°, the flat portions occupying 20% to 60% of the total surface area of the surface.

14. A reflector according to claim 13, wherein the difference in the height of the projections is 1 µm or less.

15. A reflector according to claim 13, wherein the light reflection layer is selected so that a degree of polarization V of light reflected from the light reflection layer, represented by:

$$V = \frac{\sqrt{S_1^2 + S_2^2 + S_3^2}}{S_0}$$

where $S_0$, $S_1$, $S_2$, and $S_3$ are Stokes parameters referring respectively to a total light intensity, an excess in intensity of horizontal linearly polarized light, an excess in intensity of 45° linearly polarized light, and an excess in intensity of right-handed circularly polarized light, is at least 50% or more.

* * * * *